US010708589B2

(12) United States Patent
Mishurovskiy et al.

(10) Patent No.: US 10,708,589 B2
(45) Date of Patent: Jul. 7, 2020

(54) VIDEO ENCODING AND DECODING METHOD AND APPARATUS INVOLVING BOUNDARY FILTERING

(71) Applicant: SAMSUNG ELECTRONICS CO., LTD., Suwon-si (KR)

(72) Inventors: Mikhail Mishurovskiy, Moscow (RU); Jin-young Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 240 days.

(21) Appl. No.: 15/127,249

(22) PCT Filed: Mar. 19, 2015

(86) PCT No.: PCT/KR2015/002664
§ 371 (c)(1),
(2) Date: Sep. 19, 2016

(87) PCT Pub. No.: WO2015/142070
PCT Pub. Date: Sep. 24, 2015

(65) Prior Publication Data

US 2018/0176560 A1 Jun. 21, 2018

Related U.S. Application Data

(60) Provisional application No. 61/955,365, filed on Mar. 19, 2014.

(51) Int. Cl.
*H04N 19/117* (2014.01)
*H04N 19/176* (2014.01)
*H04N 19/80* (2014.01)
*H04N 19/167* (2014.01)
*H04N 19/82* (2014.01)

(52) U.S. Cl.
CPC ......... *H04N 19/117* (2014.11); *H04N 19/167* (2014.11); *H04N 19/176* (2014.11); *H04N 19/80* (2014.11); *H04N 19/82* (2014.11)

(58) Field of Classification Search
CPC ..... H04N 19/117; H04N 19/176; H04N 19/80
See application file for complete search history.

(56) References Cited

U.S. PATENT DOCUMENTS 8,625,682 B2 1/2014 Guleryuz
8,649,431 B2 2/2014 Cheon et al.
(Continued)

FOREIGN PATENT DOCUMENTS

EP 1 938 616 B1 6/2011
KR 10-2009-0095014 A 9/2009
(Continued)

OTHER PUBLICATIONS

Fabian Jager et al; CE:3 Results on Depth-Based Block Partitioning (DBBP); Joint Collaborative Team on 3D Video Coding Extensions of ITU-T SG 16 WP 3 and ISO/IEC JTC 1/SC 29/WG 11; Jan. 11-Jan. 17, 2013; Document: JCT3V-G0106; 12 pgs. total.
(Continued)

*Primary Examiner* — Zhubing Ren
(74) *Attorney, Agent, or Firm* — Sughrue Mion, PLLC

(57) ABSTRACT

Provided are a video encoding apparatus, a video encoding method, a video decoding apparatus, and a video decoding method capable of filtering a boundary of partitions within a block.

18 Claims, 34 Drawing Sheets

(56) References Cited

U.S. PATENT DOCUMENTS

| | | | | |
|---|---|---|---|---|
| 9,264,718 | B2 | 2/2016 | Oh et al. | |
| 9,344,716 | B2 | 5/2016 | Seregin et al. | |
| 2010/0158103 | A1 * | 6/2010 | Ye | H04N 19/176 375/240.02 |
| 2010/0208827 | A1 | 8/2010 | Divorra Escoda et al. | |
| 2011/0170610 | A1 | 7/2011 | Min et al. | |
| 2011/0249748 | A1 | 10/2011 | Zan et al. | |
| 2011/0293006 | A1 | 12/2011 | Guleryuz | |
| 2012/0128070 | A1 | 5/2012 | Kim et al. | |
| 2012/0170645 | A1 * | 7/2012 | Chien | H04N 19/46 375/240.02 |
| 2012/0328029 | A1 * | 12/2012 | Sadafale | H04N 19/176 375/240.29 |
| 2013/0034165 | A1 * | 2/2013 | Sasai | H04N 19/176 375/240.16 |

FOREIGN PATENT DOCUMENTS

| | | | |
|---|---|---|---|
| KR | 10-2012-0032456 | A | 4/2012 |
| KR | 10-2012-0092533 | A | 8/2012 |
| KR | 10-2013-0131424 | A | 12/2013 |
| WO | 2013/012479 | A1 | 1/2013 |

OTHER PUBLICATIONS

Il-Koo Kim et al; "High Efficiency Video Coding (HEVC) Test Model 12 (HM12) Encoder Description"; Joint Collaborative Team on Video Coding (JCT-VC) of ITU-T SG16 WP3 and ISO/IEC JTC1/SC29/WG11; Jul. 25-Aug. 2, 2013; Document: JCTVC-N1002; 39 pgs. total.

Communication dated Jun. 10, 2015 issued by the International Searching Authority in counterpart International Application No. PCT/KR2015/002664 (PCT/ISA/210/220/237).

* cited by examiner

FIG. 6A

| |
|---|
| coding_unit( x0, y0, log2CbSize ) { |
| ... |
| if( slice_type != I ) |
| **cu_skip_flag[x0][y0]** |
| ... |
| if( cu_skip_flag[x0][y0] ) |
| if( cu_skip_flag[x0][y0]) |
| else { |
| ... |
| if( CuPredMode[x0][y0] != MODE_INTRA && PartMode ! = PART_2Nx2N) |
| **cu_pus_flag[x0][y0]** |
| ... |
| } |
| } |

600

FIG. 6B if PartMode == PART_2NxN:
(xBI, yBI) = ( 0, (nCbSL >> 1) −1), BLen = nCbSL, BoundaryType = 1 if PartMode == PART_Nx2N:
(xBI, yBI) = ( (nCbSL >> 1) −1, 0), BLen = nCbSL , BoundaryType = 0 if PartMode is equal to PART_2NxnU:
(xBI, yBI) = ( 0, (nCbSL >> 2) −1), BLen = nCbSL , BoundaryType = 1 if PartMode == PART_2NxnD:
(xBI, yBI) = (0, (nCbSL >> 1) + (nCbSL >> 2) − 1), BLen= nCbSL, BoundaryType = 1 if PartMode == PART_nLx2N:
(xBI, yBI) = ( (nCbSL >> 2) −1, 0), BLen = nCbSL , BoundaryType = 0 if PartMode == PART_nRx2N:
(xBI, yBI) = ( (nCbSL >> 1) + (nCbSL >> 2) − 1 , 0), BLen = nCbSL , BoundaryType = 0 if PartMode is equal to PART_NxN:
1) (xBI, yBI) = ((nCbSL >> 1) − 1, 0), BLen = nCbSL , BoundaryType = 0;
2) (xBI, yBI) = (0, (nCbSL >> 1) − 1), BLen = nCbSL , BoundaryType = 1;

FIG. 6C

```
610c:
PU Boundary Filterng process
Inputs to this process are:
- ( xCb, yCb )
- (xBl, yBl)
- Blen
- BoundaryType
- predSamplesL

Outputs of this process are:
-predSamplesL

620c:
The PUS filtering process includes the following ordered steps:
621c: 1) If BoundaryType is equal to 1 then XStep = 1 and YStep = 0; else Xstep = 0 and YStep = 1;
      2) If BoundaryType is equal to 0 then XAStep = 1 and YAStep = 0; else XAstep = 0 and YAStep = 1;
3) modification of samples of TempPel as follows
622c: for j = -1 ··· 2:
        if (j == -1 || j == 2) then
623c:   W0 = 2; W1=12; W2 = 2;
        else
        W0 = 4; W1=8; W2 = 4;
624c:   for i = 0···Blen - 1 :
        xOffset = i * Xstep
        yOffset = i * YStep
        a = predSamplesL[xCb + xBl +(j-1)*XAStep + xOffset, yCb + yBl +(j-1)*YAStep+yOffset]
        b = predSamplesL[xCb + xBl + j*XAStep+ xOffset, yCb + yBl + j*YAStep+yOffset]
        c = predSamplesL[xCb + xBl+ (j+1)*XAStep + xOffset, yCb + yBl+(j+1)*YAStep+yOffset]
625c:   if (Max(a, Max(b, c)) == Min(a, Min(b, c))
        TempPel[j+1,i] = b
        else
        MinVl = b - 20
        MaxVl = b + 20
        TempPel[j+1, i] = Clip3(MinVl, MaxVl, (W0 * a + W1 * b + W2 * c + 8) >> 4);
626c: 4) Copy samples of TempPel array to predSamplesL
for j = -1 ··· 2:
for i = 0···Blen - 1 :
xOffset = i * Xstep
        yOffset = i * YStep
        predSamplesL[xCb + xBl + j*XAStep+ xOffset, yCb + yBl + j*YAStep+yOffset] = TempPel[j+1, i]
```

CODING UNIT (1710)

VIDEO ENCODING AND DECODING METHOD AND APPARATUS INVOLVING BOUNDARY FILTERING

TECHNICAL FIELD

The present invention relates to video encoding and decoding methods and apparatuses and, more particularly, to video encoding and decoding methods and apparatuses for filtering pixels adjacent to a boundary of partitions within a block.

BACKGROUND ART

In video compression methods such as MPEG-1, MPEG-2, MPEG-4 H.264/MPEG-4 Advanced Video Coding (AVC), an image is split into blocks of a predetermined size and then residual data of each block is obtained by using inter prediction or intra prediction. The residual data is compressed through transformation, quantization, scanning, run length coding, and entropy coding. In entropy coding, syntax elements, e.g., information such as a transformation coefficient and a prediction mode, are entropy-encoded and output in a bitstream. A decoder extracts the syntax elements by parsing the bitstream, and reconstructs the image based on the extracted syntax elements.

DETAILED DESCRIPTION OF THE INVENTION

Technical Problem

The present invention provides methods and apparatuses capable of increasing encoding and decoding efficiency by filtering a boundary within a block.

Technical Solution

According to an aspect of the present invention, a video decoding method includes obtaining at least one partition from a block of an image, filtering at least one of a predicted value of a pixel adjacent to a boundary between two or more partitions, and a residual value of the pixel, if the block includes the partitions, and reconstructing a value of the pixel by using at least one of the filtered predicted value and the filtered residual value.

The block may be a coding unit obtained from the image based on coding unit split information obtained from a bitstream. The partitions may include a first prediction unit and a second prediction unit obtained by splitting at least one of a height and a width of the coding unit, based on a partition mode obtained from the bitstream. The boundary may be a boundary between the first and second prediction units.

The video decoding method may further include obtaining at least one transformation unit from the coding unit based on transformation unit split information obtained from the bitstream, and the first and second prediction units may be included in the transformation unit.

The pixel may be included in the first prediction unit, and the filtering may be performed by using a predicted value of a neighboring pixel included in the second prediction unit and adjacent to the pixel.

The video decoding method may further include obtaining a filtering flag indicating whether to filter the predicted value, from a bitstream.

The filtering flag may be obtained when the block is in an inter prediction mode or in an intra prediction mode.

The boundary may have a linear shape or a nonlinear shape.

The video decoding method may further include determining at least one of intensity of the filtering and a size of the filtering based on at least one of a distance from the pixel to the boundary, the predicted value, the residual value, a predicted value of at least one neighboring pixel adjacent to the pixel, motion information of the partitions, and mode information of the partitions.

The video decoding method may further include determining intensity of the filtering based on information indicating whether the residual value of the pixel is present.

The reconstructing of the value of the pixel may include reconstructing the value of the pixel by using the filtered predicted value and the residual value of the pixel.

According to another aspect of the present invention, a video decoding apparatus includes a partitioner configured to obtain at least one partition from a block of an image, a filter configured to filter at least one of a predicted value of a pixel adjacent to a boundary between two or more partitions, and a residual value of the pixel, if the block includes the partitions, and a reconstructor configured to reconstruct a value of the pixel by using at least one of the filtered predicted value and the filtered residual value.

According to another aspect of the present invention, a video encoding method includes obtaining at least one partition from a block of an image, filtering at least one of a predicted value of a pixel adjacent to a boundary between two or more partitions, and a residual value of the pixel, if the block includes the partitions, and encoding the residual value by using the filtered predicted value and a value of the pixel if the predicted value is filtered, and encoding the filtered residual value if the residual value is filtered.

The block may be a coding unit split from the image based on coding unit split information, and the partitions may include a first prediction unit and a second prediction unit obtained by splitting at least one of a height and a width of the coding unit, based on a partition mode. The boundary is a boundary between the first and second prediction units.

The video encoding method may further include obtaining at least one transformation unit from the coding unit based on transformation unit split information, and the first and second prediction units may be included in the transformation unit.

The pixel may be included in the first prediction unit, and the filtering may be performed by using a predicted value of a neighboring pixel included in the second prediction unit and adjacent to the pixel.

The video encoding method may further include generating a filtering flag indicating whether to filter the predicted value.

The filtering flag may be generated when the block is in an inter prediction mode or in an intra prediction mode.

The boundary may have a linear shape or a nonlinear shape.

The video encoding method may further include determining at least one of intensity of the filtering and a size of the filtering based on at least one of a distance from the pixel to the boundary, the predicted value, the residual value, a predicted value of at least one neighboring pixel adjacent to the pixel, motion information of the partitions, and mode information of the partitions.

The video encoding method may further include determining intensity of the filtering based on information indicating whether the residual value is present.

According to another aspect of the present invention, a video encoding apparatus includes a partitioner configured to obtain at least one partition from a block of an image, a filter configured to filter at least one of a predicted value of a pixel adjacent to a boundary between two or more partitions, and a residual value of the pixel, if the block includes the partitions, and an encoder configured to encode the residual value by using the filtered predicted value and a value of the pixel if the predicted value is filtered, and encode the filtered residual value if the residual value is filtered.

DESCRIPTION OF THE DRAWINGS

FIG. 6A is a diagram for describing an operation of obtaining a filtering flag, according to an embodiment.

FIGS. 6B and 6C are diagrams for describing pseudo code for filtering a boundary of partitions within a block, according to an embodiment.

MODE OF THE INVENTION

Hereinafter, video encoding/decoding methods and apparatuses involving boundary filtering according to embodiments are provided with reference to FIGS. 1A through 6C.

Figure 7:
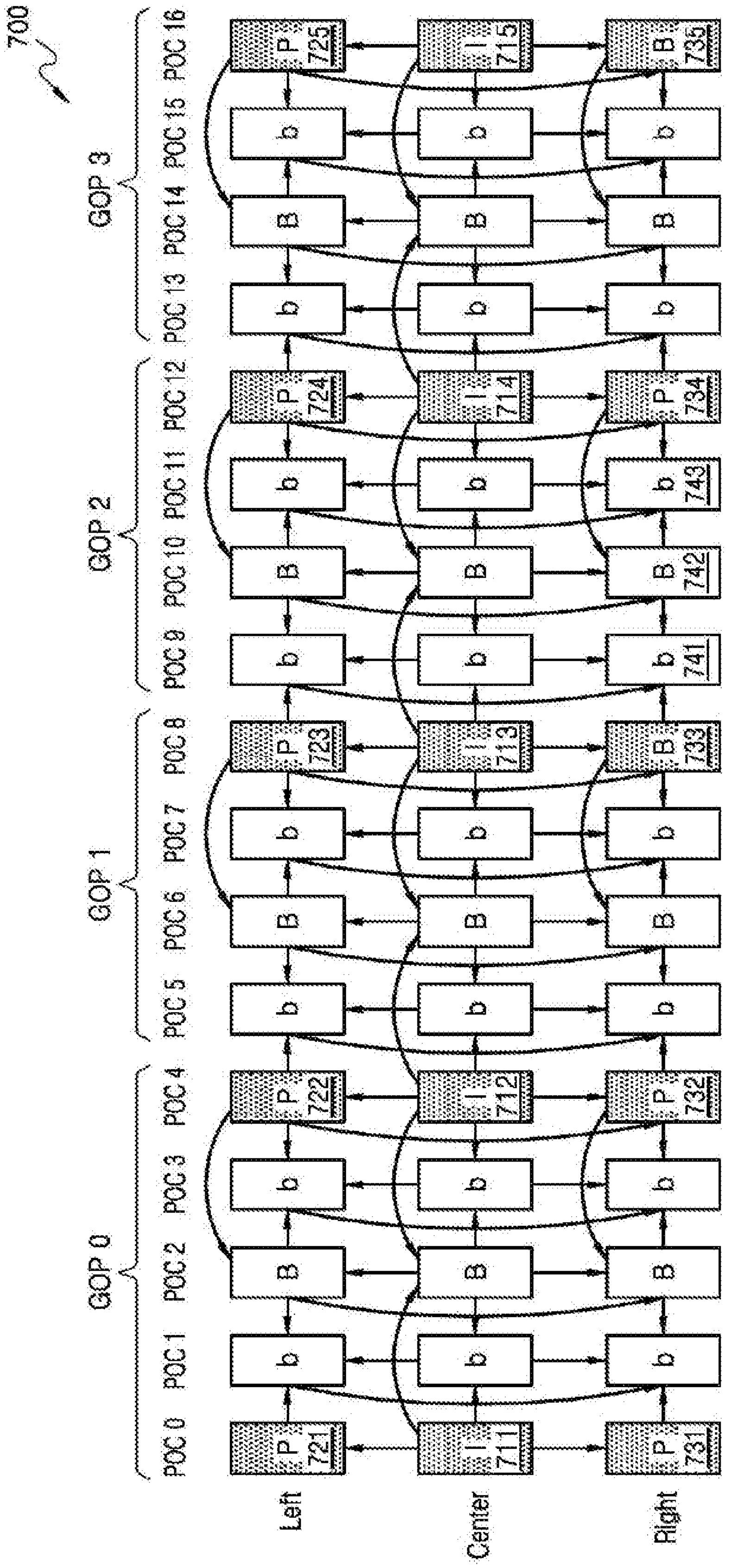
FIG. 7 illustrates an inter-layer prediction structure according to an embodiment.

In addition, with reference to FIG. 7, an interlayer prediction structure is provided. In addition, a video encoding method and a video decoding method based on coding units having a tree structure which are applicable to the above-mentioned video encoding and decoding techniques according to embodiments will be described with reference to FIGS. 8 through 20. Furthermore, examples to which the above-mentioned video encoding and decoding methods are applicable according to embodiments will be described with reference to FIGS. 21 through 27.

Hereinafter, the term 'image' may refer to a still image of a video, or a moving image, i.e., the video itself.

Hereinafter, the term 'sample' may refer to data assigned to an image sampling location and data to be processed. For example, pixels of an image in a spatial domain may be samples.

In general, when a block of an image is split into a plurality of partitions and encoding operations such as prediction and transformation are performed per partition, a boundary between the partitions within the block may reduce encoding and decoding efficiency. For example, the boundary of the partitions within the block may influence energy compactness property in a transformation process. Specifically, when a coding unit is split into a plurality of prediction units serving as the basis of prediction coding, a boundary of the prediction units may cause a high-frequency component of a residual signal. The high-frequency component of the residual signal may reduce efficiency of a transformation process.

A description is now given of encoding and decoding methods and apparatuses capable of removing discontinuity between partitions and improving encoding and decoding performance by filtering pixels adjacent to a boundary between partitions within a block. For example, the encoding and decoding methods and apparatuses according to embodiments may filter predicted values of the pixels adjacent to the boundary of the partitions within the block. As another example, the encoding and decoding methods and apparatuses according to embodiments may filter residual values of the pixels adjacent to the boundary of the partitions within the block.

Figure 1A:
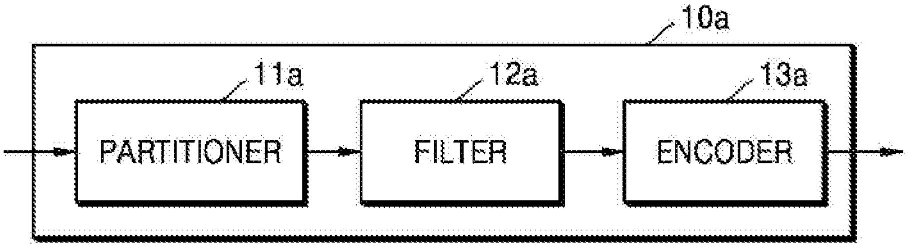
FIG. 1A is a block diagram of a video encoding apparatus 10*a* with boundary filtering, according to an embodiment.

FIG. 1A is a block diagram of a video encoding apparatus 10*a* with boundary filtering, according to an embodiment.

The video encoding apparatus 10*a* according to an embodiment may include a partitioner 11*a*, a filter 11*a*, and an encoder 13*a*. The video encoding apparatus 10*a* according to an embodiment may further include a central processor (not shown) for controlling the partitioner 11*a*, the filter 12*a*, and the encoder 13*a*. Alternatively, the partitioner 11*a*, the filter 12*a*, and the encoder 13*a* may be controlled by individual processors (not shown) and the processors may interactively operate to control the video encoding apparatus 10*a*. Otherwise, the partitioner 11*a*, the filter 12*a*, and the encoder 13*a* may be controlled by an external processor (not shown) of the video encoding apparatus 10*a*.

The video encoding apparatus 10*a* may further include one or more data storages (not shown) for storing input and output data of the partitioner 11*a*, the filter 12*a*, and the encoder 13*a*. The video encoding apparatus 10*a* may include a memory controller (not shown) for controlling data input and output to and from the data storages.

To output a video encoding result, the video encoding apparatus 10*a* may perform video encoding operations including filtering in association with an internal or external video encoding processor. The internal video encoding processor of the video encoding apparatus 10*a* may implement the video encoding operations as a separate processor. Alternatively, the video encoding apparatus 10*a*, a central processing unit, or a graphic processing unit may include a video encoding module to implement basic video encoding operations.

The partitioner 11*a* may obtain at least one partition from a block of an image. For example, the partitioner 11*a* may obtain one partition having the same size as the block of the image. As another example, the partitioner 11*a* may split the block of the image into a plurality of partitions.

Herein, the 'block' may refer to a largest coding unit or a coding unit split from the image to be encoded or decoded.

Specifically, the block may be a largest coding unit split from the image based on size information of a coding unit for determining the maximum size of the coding unit. The largest coding unit including coding units having a tree structure may be variously named as a coding tree unit, a coding block tree, a block tree, a root block tree, a coding tree, a coding root, or a tree trunk.

Alternatively, the block may be a coding unit split from the largest coding unit based on coding unit split information indicating whether the coding unit is split.

The block may have a square shape, a rectangular shape, or an arbitrary geometric shape, and is not limited to a certain-sized data unit.

For example, the partition may include a prediction unit, a transformation unit, or the like among coding units having a tree structure.

Specifically, the partition may be a prediction unit split from a coding unit of a lowermost depth, i.e., a coding unit which is no more splittable. For example, the partitions may include the coding unit of the lowermost depth, and a first prediction unit and a second prediction unit obtained by splitting at least one of the height and width of the coding unit of the lowermost depth, based on a partition mode. The prediction unit is a data unit split from the coding unit of the lowermost depth, and may have the same size as the coding unit of the lowermost depth.

The partition mode may indicate at least one prediction unit split from the coding unit. For example, if the partition mode indicates 2N×N, the partitioner 11*a* may split a 2N×2N coding unit of a lowermost depth into two 2N×N prediction units. Encoding and decoding methods based on coding units having a tree structure will be described in detail below with reference to FIGS. 8 to 20.

The partition may have a square shape, a rectangular shape, or an arbitrary geometric shape, and is not limited to a certain-sized data unit.

The partitioner 11*a* may obtain an object partition and a background partition, or a foreground partition and a background partition by splitting the block of the image. For example, the partitioner 11*a* may obtain an object and a background partition by splitting a block of a 3D image by using depth information. As another example, the partitioner 11*a* may obtain an object and a background partition by splitting a block of a 3D image by using a segmentation mask.

When the block includes two or more partitions, the filter 12*a* may filter at least one of a predicted value and a residual value of a pixel adjacent to a boundary between the partitions. For example, when the partitions include a first prediction unit and a second prediction unit, the filter 12*a* may filter at least one of a predicted value and a residual value of a pixel adjacent to a boundary between the first and second prediction units.

The boundary between the partitions may have a linear shape or a nonlinear shape. When the partitioner 11*a* splits the block into square or rectangular partitions, the boundary of the partitions may be a straight line. For example, when the partitioner 11*a* splits a 2N×2N coding unit of a lowermost depth into four N×N prediction units, the boundaries of the partitions may be straight lines of horizontal and vertical directions.

As another example, when the partitioner 11*a* splits the block into arbitrary partitions, the boundary of the partitions may be a straight line, a curve, or a combination thereof. As another example, when the partitioner 11*a* splits the block into an object and a background partition by using depth information, the boundary of the partitions may be provided along the outline of the object.

The pixel adjacent to the boundary of the partitions may refer to a pixel having at least one corner contacting the boundary of the partitions. Since decoding and encoding methods and apparatuses may perform prediction coding, transformation, or inverse-transformation in partition units, when prediction or transformation properties are set differently per partition unit, pixels adjacent to the boundary of the partitions may cause a high-frequency component of a residual signal. Accordingly, the filter 12*a* may suppress a high-frequency component of a residual signal and increase decoding and encoding efficiency by filtering at least one pixel adjacent to the boundary of the partitions.

The filter 12*a* may filter a pixel close to the boundary of the partitions as well as the pixel adjacent to the boundary of the partitions. That is, the filter 12*a* may filter a pixel located within a predetermined distance from the boundary of the partitions. For example, the filter 12*a* may filter a pixel spaced apart from the boundary of the partitions by a 1-pixel length.

After prediction is performed on the block and before the predicted value is subtracted from an original value to obtain the residual value of the block, the filter 12*a* may perform filtering on the predicted value.

Alternatively, after prediction is performed on the block and before the predicted value is added to the residual value to reconstruct a pixel value of the block, the filter 12*a* may perform filtering on the predicted value.

For example, it is assumed that the partitioner 11*a* splits a coding unit (block) of a lowermost depth into a first prediction unit (partition) and a second prediction unit (partition).

The encoding apparatus 10*a* may generate a first predicted block and a second predicted block by performing intra prediction on an intra-mode coding unit of a current picture per prediction unit, and performing inter prediction on an inter-mode coding unit of the current picture per prediction unit by using the current picture and a reference picture obtained from a reconstructed picture buffer.

For example, the encoding apparatus 10*a* may generate a predicted block by setting a prediction direction per prediction unit in the intra-mode coding unit of the current picture, and performing intra prediction based on the set prediction direction. Herein, intra prediction may be performed per at least one transformation unit split from the coding unit.

As another example, the encoding apparatus 10*a* may find an optimal block from reference pictures by performing motion estimation on the inter-mode coding unit of the current picture per prediction unit. In addition, the encoding apparatus 10*a* may generate a predicted block based on motion information (e.g., a motion vector or a reference picture index) obtained through motion estimation. That is, the encoding apparatus 10*a* may perform motion compensation per prediction unit.

The filter 12*a* may filter a predicted value of a pixel included in the first prediction unit and adjacent to a boundary of the first and second prediction units, by using a predicted value of a neighboring pixel included in the second prediction unit and adjacent to the pixel to be filtered.

The filter 12*a* may adaptively perform filtering based on properties of the pixel to be filtered, and the neighboring pixel. For example, the filter 12*a* may determine at least one of the intensity of filtering and the size of filtering based on at least one of the distance from the pixel to be filtered to the boundary between the partitions, the predicted value of the pixel to be filtered, the residual value of the pixel to be filtered, a predicted value of at least one neighboring pixel adjacent to the pixel to be filtered, motion information of the partitions, and mode information of the partitions. For example, the motion information of the partitions may include a motion vector, a reference picture index, or the like. The mode information of the partitions may include, for example, merge mode information indicating whether to merge partition units. An operation of filtering pixels by the filter 12*a* will be described in detail below with reference to FIG. 4.

The encoding apparatus 10*a* may perform intra or inter prediction and then filter the predicted value of the pixel located at the boundary of the predicted blocks. The encoding apparatus 10*a* may remove a high-frequency component of a residual signal and improve decoding and encoding performance by removing discontinuity between the prediction units after prediction is performed on the block and before the residual value of the block is obtained or before a pixel value of the block is reconstructed.

When the predicted value of the pixel adjacent to the boundary of the partitions is filtered, the encoder 13*a* may encode the residual value of the pixel by using the filtered predicted value and the value of the pixel. Specifically, the encoder 13*a* may obtain the residual value of the pixel by subtracting the filtered predicted value from the original value of the pixel, and may encode the residual value by transforming and quantizing the residual value.

The encoder 13*a* may remove a high-frequency component caused by discontinuity of the partitions and improve decoding and encoding performance by obtaining the residual value by using the filtered predicted value. In addition, the encoder 13*a* may not encode the residual value of a current block. For example, the encoder 13*a* may configure the current block to be reconstructed by using only the predicted value. The encoding apparatus 10*a* may generate a flag indicating whether the current block includes the residual value, and output the same in a bitstream.

When the block includes two or more partitions, the filter 12*a* may filter the residual value of the pixel adjacent to the boundary between the partitions. When the filter 12*a* filters the residual value of the pixel adjacent to the boundary between the partitions, the encoder 13*a* may encode the filtered residual value.

Specifically, the encoding apparatus 10*a* may remove discontinuity between transformation units or prediction units and improve decoding and encoding performance by filtering the residual value before the residual value is transformed and quantized.

Figure 1B:
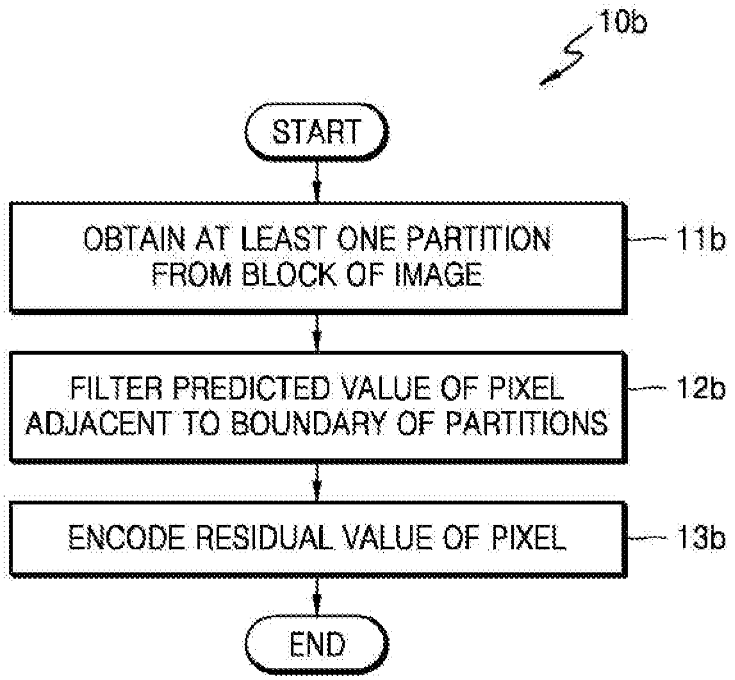
FIG. 1B is a flowchart of a video encoding method 10*b* with boundary filtering, according to an embodiment.

FIG. 1B is a flowchart of a video encoding method 10*b* with boundary filtering, according to an embodiment.

The encoding method 10*b* of FIG. 1B includes time-series operations performed by the encoding apparatus 10*a* of FIG. 1A. Accordingly, the above descriptions of the operations of the encoding apparatus 10*a* of FIG. 1A may be equally applied to the encoding method 10*b* of FIG. 1B.

In operation 11*b*, at least one partition may be obtained from a block of an image. The block may refer to a largest coding unit or a coding unit split from the image to be encoded or decoded. The partition may include a prediction unit, a transformation unit, or the like among coding units having a tree structure. Each of the block and the partition may have a square shape, a rectangular shape, or an arbitrary geometric shape, and is not limited to a certain-sized data unit.

In operation 12*b*, at least one of a predicted value and a residual value of a pixel adjacent to a boundary of partitions may be filtered. The boundary between the partitions may have a linear shape or a nonlinear shape. For example, when the block is split into square or rectangular partitions in operation 11*b*, the boundary of the partitions may be a straight line. As another example, when the block is split into arbitrary partitions, the boundary of the partitions may be a straight line, a curve, or a combination thereof. As another example, when the block is split into an object and a background partition based on depth information, the boundary of the partitions may be provided along the outline of the object.

The pixel adjacent to the boundary of the partitions may refer to a pixel having at least one corner contacting the boundary of the partitions.

Figure 1C:
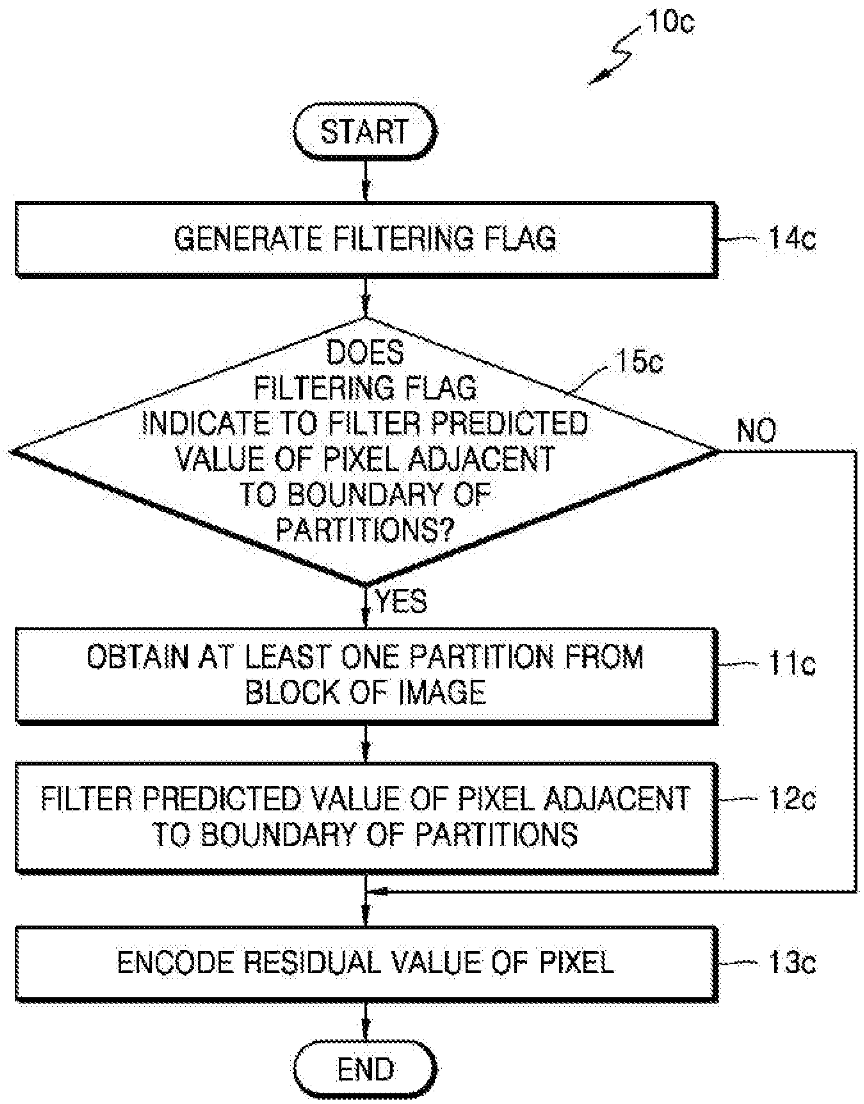
FIG. 1C is a flowchart of a video encoding method 10*c* with boundary filtering, according to another embodiment.

When the predicted value of the pixel adjacent to the boundary of the partitions is filtered in operation 12*b*, in operation 13*b*, a residual value of the pixel may be encoded by using the filtered predicted value. When the residual value of the pixel adjacent to the boundary of the partitions is filtered in operation 12*b*, in operation 13*b*, the filtered residual value may be encoded. A high-frequency component of a residual signal may be suppressed and decoding and encoding efficiency may be increased by filtering at least one pixel adjacent to the boundary of the partitions. In this case, the residual value of a current block may not be encoded and operation 13*b* may be omitted. For example, the current block may be configured to be reconstructed by using only the predicted value. A flag indicating whether the current block includes the residual value may be generated and output in a bitstream. FIG. 1C is a flowchart of a video encoding method 10*c* with boundary filtering, according to another embodiment.

The encoding method 10*c* of FIG. 1C includes time-series operations performed by the encoding apparatus 10*a* of FIG. 1A. Accordingly, the above descriptions of the operations of the encoding apparatus 10*a* of FIG. 1A may be equally applied to the encoding method 10*c* of FIG. 1C.

Compared to the encoding method 10*b* of FIG. 1B, the encoding method 10*c* of FIG. 1C further includes operations 14*c* and 15*c*, and operations 11*c* to 13*c* of the encoding method 10*c* of FIG. 1C may equally correspond to operations 11*b* to 13*b* of the encoding method 10*b* of FIG. 1B. Accordingly, the descriptions given above in relation to FIG. 1B are omitted herein.

In operation 14*c*, a filtering flag indicating whether to filter a predicted value of a pixel adjacent to a boundary of partitions may be generated.

The filtering flag may be generated per block. For example, when a coding unit (block) is split into prediction units (partitions), a filtering flag indicating whether to filter boundaries of the prediction units of the current coding unit may be generated.

Alternatively, the filtering flag may be generated per upper or lower unit of the block based on a tree structure. For example, the filtering flag may be generated per largest coding unit or coding unit among coding units having a tree structure.

For example, the value of the filtering flag may be determined based on the size of the partition. For example, if the maximum size of the partition split from the block is equal to or greater than a predetermined threshold value, the filtering flag may indicate not to filter the pixel located at the boundary of the partitions. Otherwise, if the maximum size of the partition is less than the predetermined threshold value, the filtering flag may indicate to filter the pixel located at the boundary of the partitions.

As another example, the value of the filtering flag may be determined based on a discontinuity level of the boundary of the partitions. For example, the discontinuity level may refer to the difference between predicted values of pixels located adjacent to each other with respect to the boundary of the partitions within the block. Specifically, when the partitions include a first partition and a second partition, the discontinuity level may refer to the difference between a sum of predicted values of pixels included in the first partition and adjacent to a boundary of the first and second partitions, and a sum of predicted values of pixels included in the second partition and adjacent to the boundary of the first and second partitions. If the discontinuity level is equal to or less than a predetermined threshold value, the filtering flag may indicate not to filter the pixel located at the boundary of the partitions. Otherwise, if the discontinuity level is greater than the predetermined threshold value, the filtering flag may indicate to filter the pixel located at the boundary of the partitions. The discontinuity level may also be named as a smoothness level, an edge strength, or the like.

Alternatively, the value of the filtering flag may be determined based on a prediction mode of the block, information indicating whether a residual signal is present in the block, split information of the block, or the like.

The generated filtering flag may be encoded, output in a bitstream, and transmitted to a decoding apparatus.

If the filtering flag indicates to filter the predicted value of the pixel adjacent to the boundary of the partitions in operation 15*c*, in operation 11*c*, at least one partition may be obtained from a block of an image. Otherwise, if the filtering flag indicates not to filter the predicted value of the pixel adjacent to the boundary of the partitions in operation 15*c*, operations 11*c* and 12*c* may be omitted.

In operation 12*c*, the predicted value of the pixel adjacent to the boundary of the partitions may be filtered.

If the filtering flag indicates to filter the predicted value of the pixel adjacent to the boundary of the partitions in operation 15*c*, in operation 13*c*, a residual value of the pixel may be encoded by using the filtered predicted value of the pixel.

Otherwise, if the filtering flag indicates not to filter the predicted value of the pixel adjacent to the boundary of the partitions in operation 15*c*, the residual value of the pixel may be encoded by using the non-filtered predicted value of the pixel.

Figure 1D:
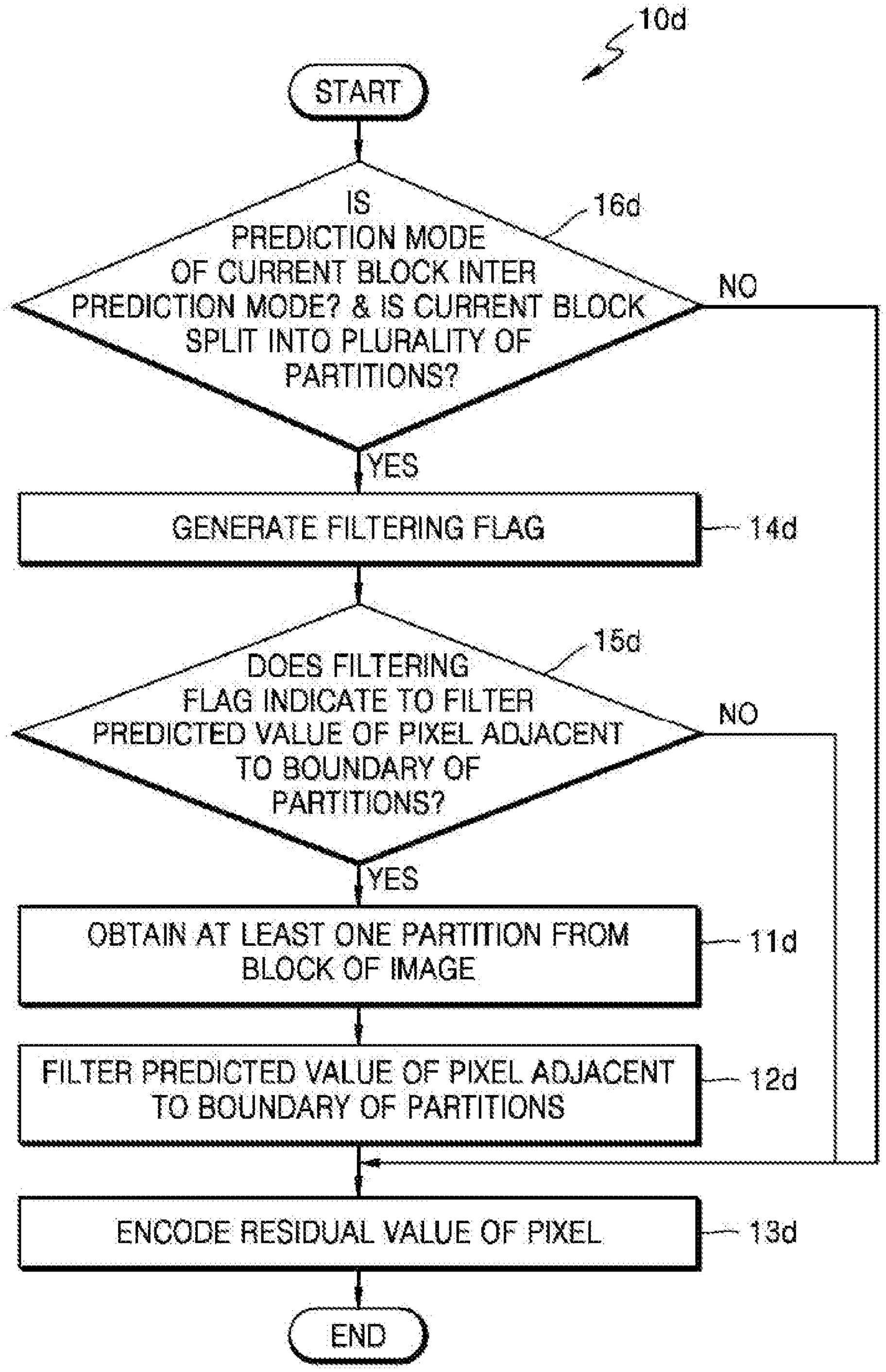
FIG. 1D is a flowchart of a video encoding method 10*d* with boundary filtering, according to another embodiment.

FIG. 1D is a flowchart of a video encoding method 10*d* with boundary filtering, according to another embodiment.

The encoding method 10*d* of FIG. 1D includes time-series operations performed by the encoding apparatus 10*a* of FIG. 1A. Accordingly, the above descriptions of the operations of the encoding apparatus 10*a* of FIG. 1A may be equally applied to the encoding method 10*d* of FIG. 1D.

Compared to the encoding method 10*c* of FIG. 1C, the encoding method 10*d* of FIG. 1D further includes operation 16*d*, and operations 11*d* to 15*d* of the encoding method 10*d* of FIG. 1D may equally correspond to operations 11*c* to 15*c* of the encoding method 10*c* of FIG. 1C. Accordingly, the descriptions given above in relation to FIG. 1C are omitted herein.

In the encoding method 10*d*, a filtering flag may be generated based on a prediction mode indicating whether to perform intra prediction or inter prediction on a current block.

When the current block is in an inter prediction mode or in an intra prediction mode, the filtering flag may be generated.

For example, the filtering flag may be generated if the prediction mode of the current block indicates inter prediction, and may not be generated if the prediction mode of the current block indicates intra prediction.

To reduce the amount of calculation for encoding and decoding, it is assumed that encoding and decoding methods and apparatuses filter a boundary of partitions only for inter prediction. In this case, if the prediction mode of the current block indicates intra prediction, the encoding and decoding methods and apparatuses may not filter a pixel located at the boundary between the partitions, without reference to the filtering flag. Accordingly, the encoding apparatus may not generate the filtering flag of the current block.

For example, in operation 16*d*, the prediction mode of the current block may be determined. Specifically, the prediction mode indicating whether to perform inter prediction or intra prediction on the current block may be determined. If the prediction mode of the current block is determined as an inter prediction mode as a result of operation 16*d*, in operation 14*d*, the filtering flag indicating whether to filter a predicted value of the pixel adjacent to the boundary of the partitions may be generated.

The filtering flag may be generated based on a partition mode indicating whether the current block is split into a plurality of partitions.

For example, the filtering flag may be generated if the partition mode of the current block indicates that the current block is split into a plurality of partitions, and may not be generated if the partition mode of the current block indicates that the current block includes one partition.

If the partition mode of the current block indicates that the current block includes one partition, the encoding and decoding methods and apparatuses may not perform filtering without reference to the filtering flag.

For example, in operation 16*d*, whether the current block is split into a plurality of partitions may be determined by using the partition mode of the current block. If it is determined that the current block includes a plurality of partitions as a result of operation 16*d*, in operation 14*d*, the filtering flag indicating whether to filter the predicted value of the pixel adjacent to the boundary of the partitions may be generated.

If the filtering flag indicates to filter the predicted value of the pixel adjacent to the boundary of the partitions in operation 15*d*, in operation 11*d*, at least one partition may be obtained from a block of an image. Otherwise, if the filtering flag indicates not to filter the predicted value of the pixel adjacent to the boundary of the partitions in operation 15*d*, operations 11*d* and 12*d* may be omitted.

In operation 12*d*, the predicted value of the pixel adjacent to the boundary of the partitions may be filtered.

If the filtering flag indicates to filter the predicted value of the pixel adjacent to the boundary of the partitions in operation 15*d*, in operation 13*d*, a residual value of the pixel may be encoded by using the filtered predicted value of the pixel.

Otherwise, if the filtering flag indicates not to filter the predicted value of the pixel adjacent to the boundary of the partitions in operation 15*d*, in operation 13*d*, the residual value of the pixel may be encoded by using the non-filtered predicted value of the pixel.

Figure 2A:
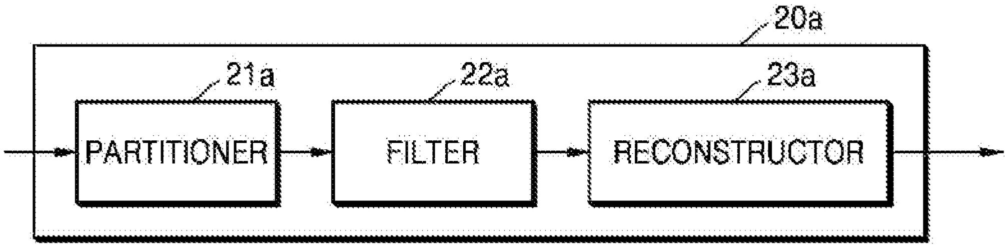
FIG. 2A is a block diagram of a video decoding apparatus 20*a* with boundary filtering, according to an embodiment.

FIG. 2A is a block diagram of a video decoding apparatus 20*a* with boundary filtering, according to an embodiment.

The video decoding apparatus 20*a* according to an embodiment may include a partitioner 21*a*, a filter 22*a*, and a reconstructor 23*a*. The video decoding apparatus 20*a* according to an embodiment may further include a central processor (not shown) for controlling the partitioner 21*a*, the filter 22*a*, and the reconstructor 23*a*. Alternatively, the partitioner 21*a*, the filter 22*a*, and the reconstructor 23*a* may be controlled by individual processors (not shown) and the processors may interactively operate to control the video decoding apparatus 20*a*. Otherwise, the partitioner 21*a*, the filter 22*a*, and the reconstructor 23*a* may be controlled by an external processor (not shown) of the video decoding apparatus 20*a*.

The video decoding apparatus 20*a* may further include one or more data storages (not shown) for storing input and output data of the partitioner 21*a*, the filter 22*a*, and the reconstructor 23*a*. The video decoding apparatus 20*a* may include a memory controller (not shown) for controlling data input and output to and from the data storages.

To output a video decoding result, the video decoding apparatus 20*a* may perform video decoding operations including filtering in association with an internal or external video decoding processor. The internal video decoding processor of the video decoding apparatus 20*a* may implement the video decoding operations as a separate processor. Alternatively, the video decoding apparatus 20*a*, a central processing unit, or a graphic processing unit may include a video decoding module to implement basic video decoding operations.

The partitioner 21*a* may obtain at least one partition from a block of an image. For example, the partitioner 21*a* may obtain one partition having the same size as the block of the image. As another example, the partitioner 21*a* may split the block of the image into a plurality of partitions.

Herein, the ‘block’ may refer to a largest coding unit or a coding unit split from the image to be encoded or decoded.

Specifically, the block may be a largest coding unit split from the image based on size information of a coding unit for determining the maximum size of the coding unit. The decoding apparatus 20*a* may obtain the size information of the coding unit from a bitstream. The largest coding unit including coding units having a tree structure may be variously named as a coding tree unit, a coding block tree, a block tree, a root block tree, a coding tree, a coding root, or a tree trunk.

Alternatively, the block may be a coding unit split from the largest coding unit based on coding unit split information indicating whether the coding unit is split. The decoding apparatus 20*a* may obtain the coding unit split information from the bitstream.

The block may have a square shape, a rectangular shape, or an arbitrary geometric shape, and is not limited to a certain-sized data unit.

For example, the partition may include a prediction unit, a transformation unit, or the like among coding units having a tree structure.

Specifically, the partition may be a prediction unit split from a coding unit of a lowermost depth, i.e., a coding unit which is no more splittable. For example, the partitions may include the coding unit of the lowermost depth, and a first prediction unit and a second prediction unit obtained by splitting at least one of the height and width of the coding unit of the lowermost depth, based on a partition mode obtained from the bitstream. The prediction unit is a data unit split from the coding unit of the lowermost depth, and may have the same size as the coding unit of the lowermost depth.

The partition mode may indicate at least one prediction unit split from the coding unit. For example, when the partition mode obtained from the bitstream indicates 2N×N, the partitioner 21*a* may split a 2N×2N coding unit of a lowermost depth into two 2N×N prediction units. Encoding and decoding methods based on coding units having a tree structure will be described in detail below with reference to FIGS. 8 to 20.

The partition may have a square shape, a rectangular shape, or an arbitrary geometric shape, and is not limited to a certain-sized data unit.

The partitioner 21*a* may obtain an object partition and a background partition, or a foreground partition and a background partition by splitting the block of the image. For example, the partitioner 21*a* may obtain an object and a background partition by splitting a block of a 3D image by using depth information. As another example, the partitioner 21*a* may obtain an object and a background partition by splitting a block of a 3D image by using a segmentation mask.

When the block includes two or more partitions, the filter 22*a* may filter at least one of a predicted value and a residual value of a pixel adjacent to a boundary between the partitions. For example, when the partitions include a first prediction unit and a second prediction unit, the filter 22*a* may filter at least one of a predicted value and a residual value of a pixel adjacent to a boundary between the first and second prediction units.

The boundary between the partitions may have a linear shape or a nonlinear shape. When the partitioner 21*a* splits the block into square or rectangular partitions, the boundary of the partitions may be a straight line. For example, when the partitioner 21*a* splits a 2N×2N coding unit of a lowermost depth into four N×N prediction units, the boundaries of the partitions may be straight lines of horizontal and vertical directions.

As another example, when the partitioner 21*a* splits the block into arbitrary partitions, the boundary of the partitions may be a straight line, a curve, or a combination thereof. As another example, when the partitioner 21*a* splits the block into an object and a background partition by using depth information, the boundary of the partitions may be provided along the outline of the object.

The pixel adjacent to the boundary of the partitions may refer to a pixel contacting the boundary of the partitions. Since decoding and encoding methods and apparatuses may perform prediction coding, transformation, or inverse-transformation in partition units, when prediction or transformation properties are set differently per partition unit, pixels adjacent to the boundary of the partitions may cause a high-frequency component of a residual signal. Accordingly, the filter 22*a* may suppress a high-frequency component of a residual signal and increase decoding and encoding efficiency by filtering at least one pixel adjacent to the boundary of the partitions.

The filter 22*a* may filter a pixel close to the boundary of the partitions as well as the pixel adjacent to the boundary of the partitions. That is, the filter 22*a* may filter a pixel located within a predetermined distance from the boundary of the partitions. For example, the filter 22*a* may filter a pixel spaced apart from the boundary of the partitions by a 1-pixel length.

After prediction is performed on the block and before the residual value of the block is obtained, the filter 22*a* may perform filtering on the predicted value.

For example, it is assumed that the partitioner 21*a* splits a coding unit (block) of a lowermost depth into a first prediction unit (partition) and a second prediction unit (partition).

The decoding apparatus 20*a* may generate a first predicted block and a second predicted block by performing intra prediction on an intra-mode coding unit of a current picture per prediction unit, and performing inter prediction on an inter-mode coding unit of the current picture per prediction unit by using the current picture and a reference picture obtained from a reconstructed picture buffer.

For example, the decoding apparatus 20*a* may generate a predicted block by setting a prediction direction per prediction unit in the intra-mode coding unit of the current picture, and performing intra prediction based on the set prediction direction. Herein, intra prediction may be performed per at least one transformation unit split from the coding unit.

As another example, the decoding apparatus 20*a* may find an optimal block from reference pictures by performing motion estimation on the inter-mode coding unit of the current picture per prediction unit. In addition, the decoding apparatus 20*a* may generate a predicted block based on motion information (e.g., a motion vector or a reference picture index) obtained through motion estimation. That is, the decoding apparatus 20*a* may perform motion compensation per prediction unit.

The filter 22*a* may filter a predicted value of a pixel included in the first prediction unit and adjacent to a boundary of the first and second prediction units, by using a predicted value of a neighboring pixel included in the second prediction unit and adjacent to the pixel to be filtered.

The filter 22*a* may adaptively perform filtering based on properties of the pixel to be filtered, and the neighboring pixel. For example, the filter 22*a* may determine at least one of the intensity of filtering and the size of filtering based on at least one of the distance from the pixel to be filtered to the boundary between the partitions, the predicted value of the pixel to be filtered, the residual value of the pixel to be filtered, a predicted value of at least one neighboring pixel adjacent to the pixel to be filtered, motion information of the partitions, and mode information of the partitions. For example, the motion information of the partitions may include a motion vector, a reference picture index, or the like. The mode information of the partitions may include, for example, merge mode information indicating whether to merge partition units. An operation of filtering pixels by the filter 22*a* will be described in detail below with reference to FIG. 4.

The decoding apparatus 20*a* may perform intra or inter prediction and then filter the predicted value of the pixel located at the boundary of the predicted blocks. The decoding apparatus 20*a* may remove a high-frequency component of a residual signal and improve decoding and encoding performance by removing discontinuity between the prediction units after prediction is performed on the block and before the predicted value is added to the residual value.

The reconstructor 23*a* may reconstruct the value of the pixel by using at least one of the filtered predicted value and the filtered residual value.

Alternatively, the reconstructor 23*a* may reconstruct the value of the pixel by using the filtered predicted value and the residual value of the pixel. Specifically, if a residual value of a current block is present, the reconstructor 23*a* may reconstruct the value of the pixel by adding the filtered predicted value to the residual value.

Otherwise, if the residual value of the current block is not present, the reconstructor 23*a* may set the filtered predicted value of the pixel as the value of the pixel.

The decoding apparatus 20*a* may obtain a flag indicating whether the residual value of the current block is present, from the bitstream.

The reconstructor 23*a* may remove a high-frequency component caused by discontinuity of the partitions and improve decoding and encoding performance by reconstructing the value of the pixel by using the filtered predicted value.

When the block includes two or more partitions, the filter 22*a* may filter the residual value of the pixel adjacent to the boundary between the partitions. The reconstructor 23*a* may reconstruct the value of the pixel by using the filtered residual value.

Specifically, the decoding apparatus 20*a* may remove discontinuity between transformation units or prediction units and improve decoding and encoding performance by filtering the residual value of the pixel before the predicted value of the pixel is added.

Figure 2B:
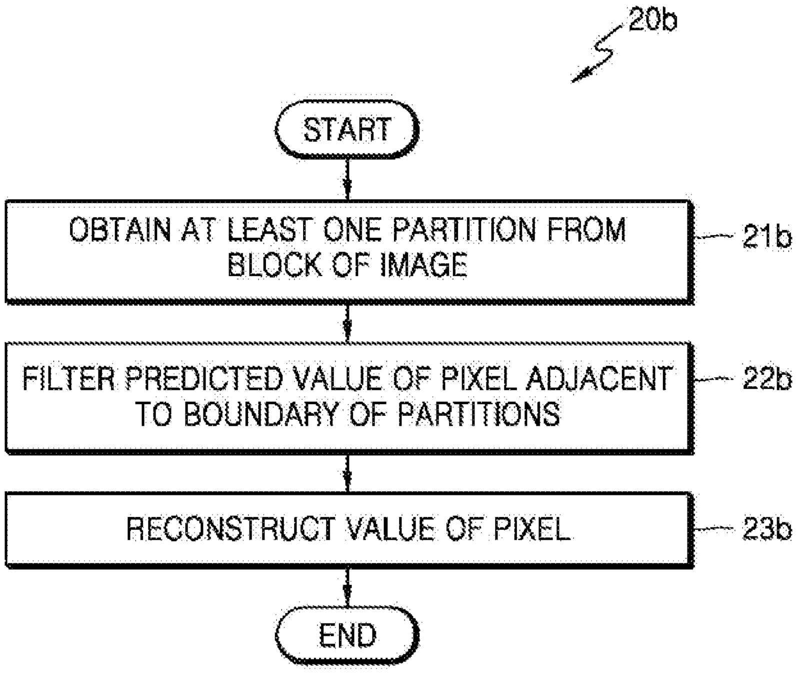
FIG. 2B is a flowchart of a video decoding method 20*b* with boundary filtering, according to an embodiment.

FIG. 2B is a flowchart of a video decoding method 20*b* with boundary filtering, according to an embodiment.

The decoding method 20*b* of FIG. 2B includes time-series operations performed by the decoding apparatus 20*a* of FIG.

2A. Accordingly, the above descriptions of the operations of the decoding apparatus 20*a* of FIG. 2A may be equally applied to the decoding method 20*b* of FIG. 2B.

In operation 21*b*, at least one partition may be obtained from a block of an image. The block may refer to a largest coding unit or a coding unit split from the image to be encoded or decoded. The partition may include a prediction unit, a transformation unit, or the like among coding units having a tree structure. Each of the block and the partition may have a square shape, a rectangular shape, or an arbitrary geometric shape, and is not limited to a certain-sized data unit.

In operation 22*b*, at least one of a predicted value and a residual value of a pixel adjacent to a boundary of partitions may be filtered. The boundary between the partitions may have a linear shape or a nonlinear shape. For example, when the block is split into square or rectangular partitions in operation 21*b*, the boundary of the partitions may be a straight line. As another example, when the block is split into arbitrary partitions, the boundary of the partitions may be a straight line, a curve, or a combination thereof. As another example, when the block is split into an object and a background partition based on depth information, the boundary of the partitions may be provided along the outline of the object.

In operation 23*b*, the value of the pixel may be reconstructed by using at least one of the filtered predicted value and the filtered residual value of the pixel. The pixel adjacent to the boundary of the partitions may refer to a pixel contacting the boundary of the partitions.

Specifically, if a residual value of a current block is not present, the filtered predicted value of the pixel may be set as the value of the pixel.

Alternatively, the value of the pixel may be reconstructed by using the filtered predicted value and the residual value of the pixel. Specifically, if the residual value of the current block is present, the value of the pixel may be reconstructed by adding the filtered predicted value to the residual value.

A flag indicating whether the residual value of the current block is present may be obtained from a bitstream.

The value of the pixel may be reconstructed by using the filtered residual value. A high-frequency component of a residual signal may be suppressed and decoding and encoding efficiency may be increased by filtering at least one pixel adjacent to the boundary of the partitions.

Figure 2C:
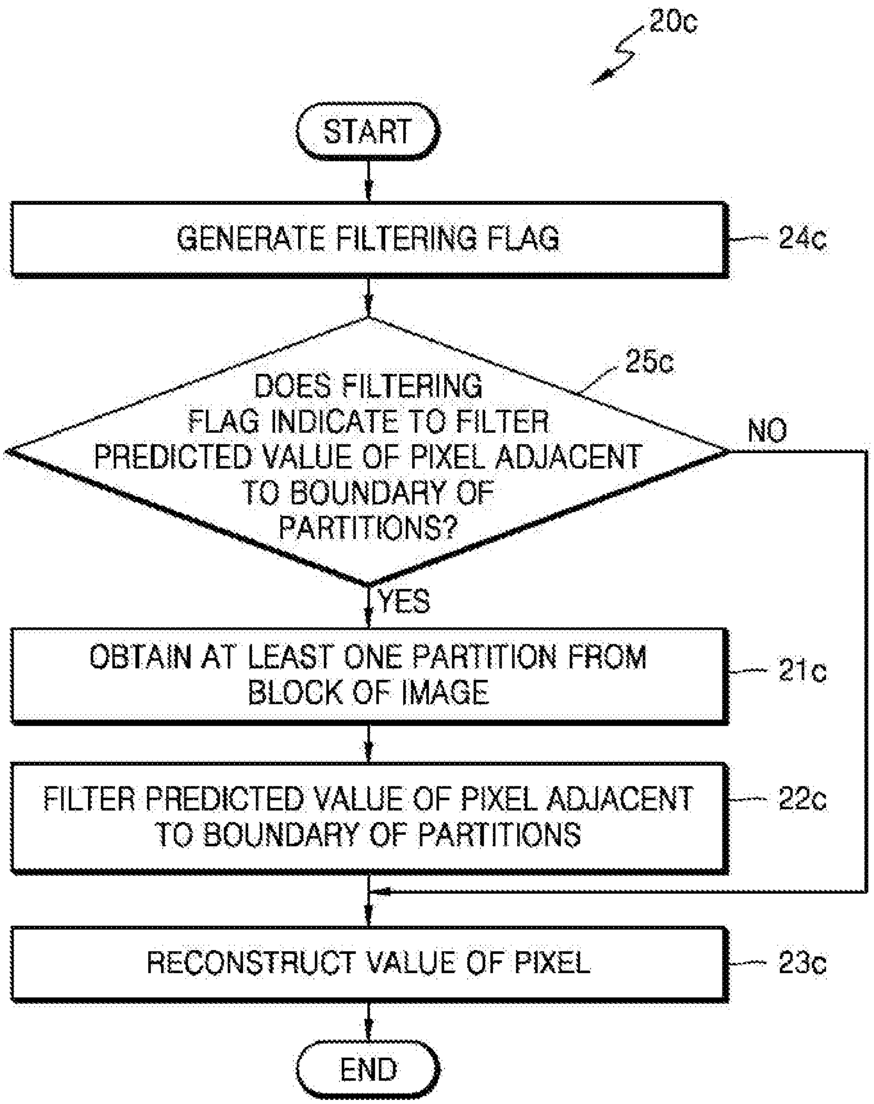
FIG. 2C is a flowchart of a video decoding method 20*c* with boundary filtering, according to another embodiment.

FIG. 2C is a flowchart of a video decoding method 20*c* with boundary filtering, according to another embodiment.

The decoding method 20*c* of FIG. 2C includes time-series operations performed by the decoding apparatus 20*a* of FIG. 2A. Accordingly, the above descriptions of the operations of the decoding apparatus 20*a* of FIG. 2A may be equally applied to the decoding method 20*c* of FIG. 2C.

Compared to the decoding method 20*b* of FIG. 2B, the decoding method 20*c* of FIG. 2C further includes operations 24*c* and 25*c*, and operations 21*c* to 23*c* of the decoding method 20*c* of FIG. 2C may equally correspond to operations 21*b* to 23*b* of the decoding method 20*b* of FIG. 2B. Accordingly, the descriptions given above in relation to FIG. 2B are omitted herein.

In operation 24*c*, a filtering flag indicating whether to filter a predicted value of a pixel adjacent to a boundary of partitions may be obtained from a bitstream.

The filtering flag may be obtained per block. For example, when a coding unit (block) is split into prediction units (partitions), a filtering flag indicating whether to filter boundaries of the prediction units of the current coding unit may be obtained from the bitstream.

Alternatively, the filtering flag may be obtained per upper or lower unit of the block based on a tree structure. For example, the filtering flag may be obtained per largest coding unit or coding unit among coding units having a tree structure.

The filtering flag may indicate to filter or not to filter the pixel located at the boundary of the partitions, based on the size of the partition. For example, if the maximum size of the partition split from the block is equal to or greater than a predetermined threshold value, the filtering flag may indicate not to filter the pixel located at the boundary of the partitions. Otherwise, if the maximum size of the partition is less than the predetermined threshold value, the filtering flag may indicate to filter the pixel located at the boundary of the partitions.

As another example, the value of the filtering flag may be determined based on a discontinuity level of the boundary of the partitions. For example, the discontinuity level may refer to the difference between predicted values of pixels located adjacent to each other with respect to the boundary of the partitions within the block. Specifically, when the partitions include a first partition and a second partition, the discontinuity level may refer to the difference between a sum of predicted values of pixels included in the first partition and adjacent to a boundary of the first and second partitions, and a sum of predicted values of pixels included in the second partition and adjacent to the boundary of the first and second partitions. If the discontinuity level is equal to or less than a predetermined threshold value, the filtering flag may indicate not to filter the pixel located at the boundary of the partitions. Otherwise, if the discontinuity level is greater than the predetermined threshold value, the filtering flag may indicate to filter the pixel located at the boundary of the partitions. The discontinuity level may also be named as a smoothness level, an edge strength, or the like.

Alternatively, the value of the filtering flag may be determined based on a prediction mode of the block, information indicating whether a residual signal is present in the block, split information of the block, or the like.

The value of the filtering flag may be determined by an encoding apparatus and method, and whether to filter the pixel located at the boundary of the partitions may be determined based on the value of the filtering flag received from the bitstream.

If the filtering flag indicates to filter the predicted value of the pixel adjacent to the boundary of the partitions in operation 25*c*, in operation 21*c*, at least one partition may be obtained from a block of an image. Otherwise, if the filtering flag indicates not to filter the predicted value of the pixel adjacent to the boundary of the partitions in operation 25*c*, operations 21*c* and 22*c* may be omitted.

In operation 22*c*, the predicted value of the pixel adjacent to the boundary of the partitions may be filtered.

If the filtering flag indicates to filter the predicted value of the pixel adjacent to the boundary of the partitions in operation 25*c*, in operation 23*c*, the value of the pixel may be reconstructed by using the filtered predicted value of the pixel.

Otherwise, if the filtering flag indicates not to filter the predicted value of the pixel adjacent to the boundary of the partitions in operation 25*c*, in operation 23*c*, the value of the pixel may be reconstructed by using the non-filtered predicted value of the pixel.

Figure 2D:
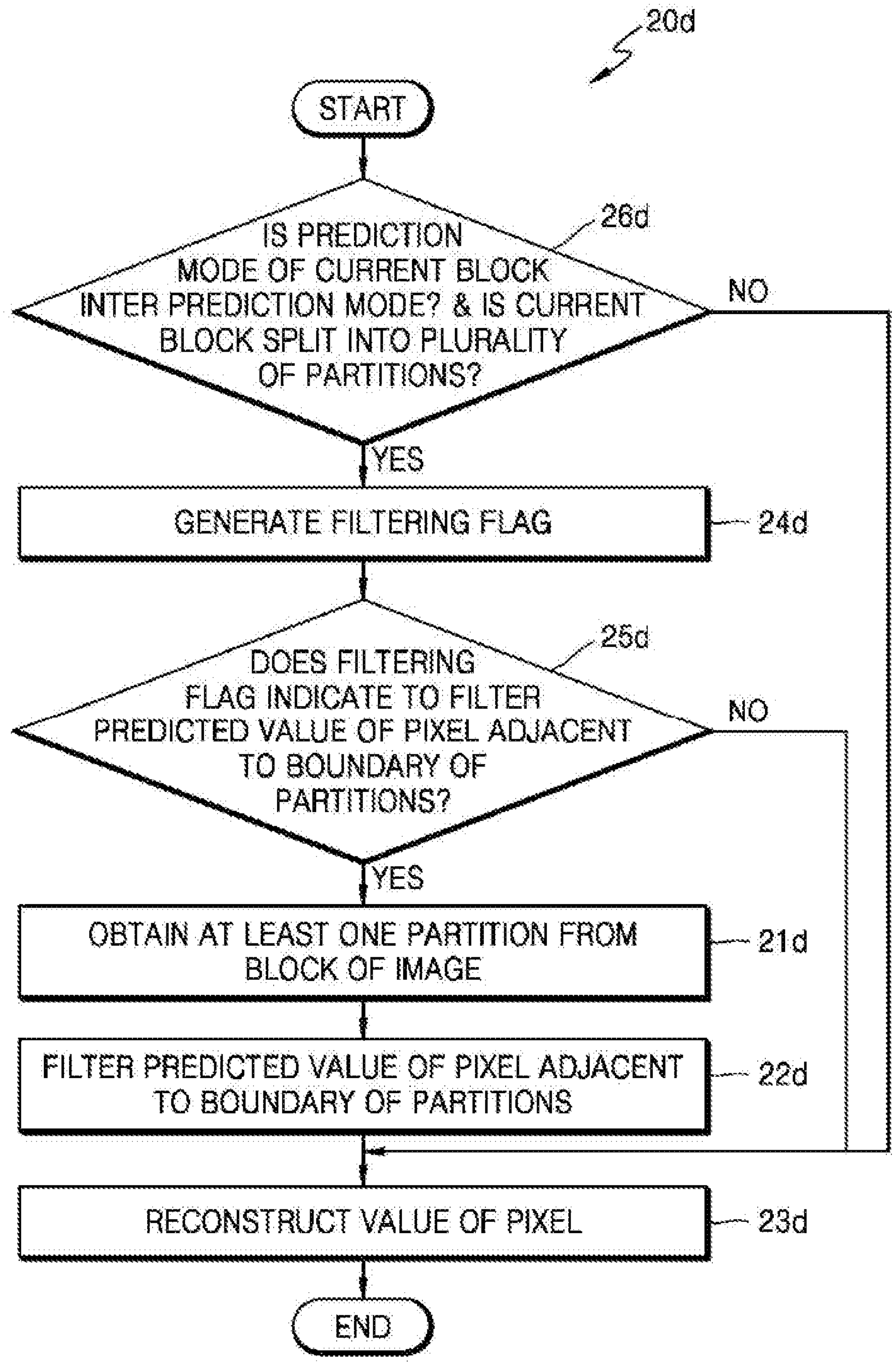
FIG. 2D is a flowchart of a video decoding method 20*d* with boundary filtering, according to another embodiment.

FIG. 2D is a flowchart of a video decoding method 20*d* with boundary filtering, according to another embodiment.

The decoding method 20*d* of FIG. 2D includes time-series operations performed by the decoding apparatus 20*a* of FIG.

2A. Accordingly, the above descriptions of the operations of the decoding apparatus 20_a_ of FIG. 2A may be equally applied to the decoding method 20_d_ of FIG. 2D.

Compared to the decoding method 20_c_ of FIG. 2C, the decoding method 20_d_ of FIG. 2D further includes operation 26_d_, and operations 21_d_ to 25_d_ of the decoding method 20_d_ of FIG. 2D may equally correspond to operations 21_c_ to 25_c_ of the decoding method 20_c_ of FIG. 2C. Accordingly, the descriptions given above in relation to FIG. 2C are omitted herein.

In the decoding method 20_d_, a filtering flag may be obtained based on a prediction mode indicating whether to perform intra prediction or inter prediction on a current block.

Information about the prediction mode of the current block may be obtained from a bitstream. When the prediction mode of the current block is an inter prediction mode or is an intra prediction mode, the filtering flag may be obtained.

For example, the filtering flag may be obtained if the prediction mode of the current block indicates inter prediction, and may not be obtained if the prediction mode of the current block indicates intra prediction.

To reduce the amount of calculation for encoding and decoding, it is assumed that encoding and decoding methods and apparatuses filter a boundary of partitions only for inter prediction. In this case, if the prediction mode of the current block indicates intra prediction, the encoding and decoding methods and apparatuses may not filter a pixel located at the boundary between the partitions, without reference to the filtering flag. Accordingly, the decoding apparatus may not obtain the filtering flag of the current block.

For example, in operation 26_d_, the prediction mode of the current block may be determined. Specifically, the prediction mode indicating whether to perform inter prediction or intra prediction on the current block may be obtained from the bitstream. If the prediction mode of the current block is determined as an inter prediction mode, in operation 24_d_, the filtering flag indicating whether to filter a predicted value of the pixel adjacent to the boundary of the partitions may be obtained.

The filtering flag may be obtained based on a partition mode indicating whether the current block is split into a plurality of partitions.

For example, the filtering flag may be obtained from the bitstream if the partition mode of the current block indicates that the current block is split into a plurality of partitions, and may not be obtained if the partition mode of the current block indicates that the current block includes one partition.

If the partition mode of the current block indicates that the current block includes one partition, the encoding and decoding methods and apparatuses may not perform filtering without reference to the filtering flag.

For example, in operation 26_d_, whether the current block is split into a plurality of partitions may be determined by using the partition mode of the current block. If it is determined that the current block includes a plurality of partitions as a result of operation 26_d_, in operation 24_d_, the filtering flag indicating whether to filter the predicted value of the pixel adjacent to the boundary of the partitions may be obtained from the bitstream.

If the filtering flag indicates to filter the predicted value of the pixel adjacent to the boundary of the partitions in operation 25_d_, in operation 21_d_, at least one partition may be obtained from a block of an image. Otherwise, if the filtering flag indicates not to filter the predicted value of the pixel adjacent to the boundary of the partitions in operation 25_d_, operations 21_d_ and 22_d_ may be omitted.

In operation 22_d_, the predicted value of the pixel adjacent to the boundary of the partitions may be filtered.

If the filtering flag indicates to filter the predicted value of the pixel adjacent to the boundary of the partitions in operation 25_d_, in operation 23_d_, the value of the pixel may be reconstructed by using the filtered predicted value of the pixel.

Otherwise, if the filtering flag indicates not to filter the predicted value of the pixel adjacent to the boundary of the partitions in operation 25_d_, in operation 23_d_, the value of the pixel may be reconstructed by using the non-filtered predicted value of the pixel.

Figure 3A:
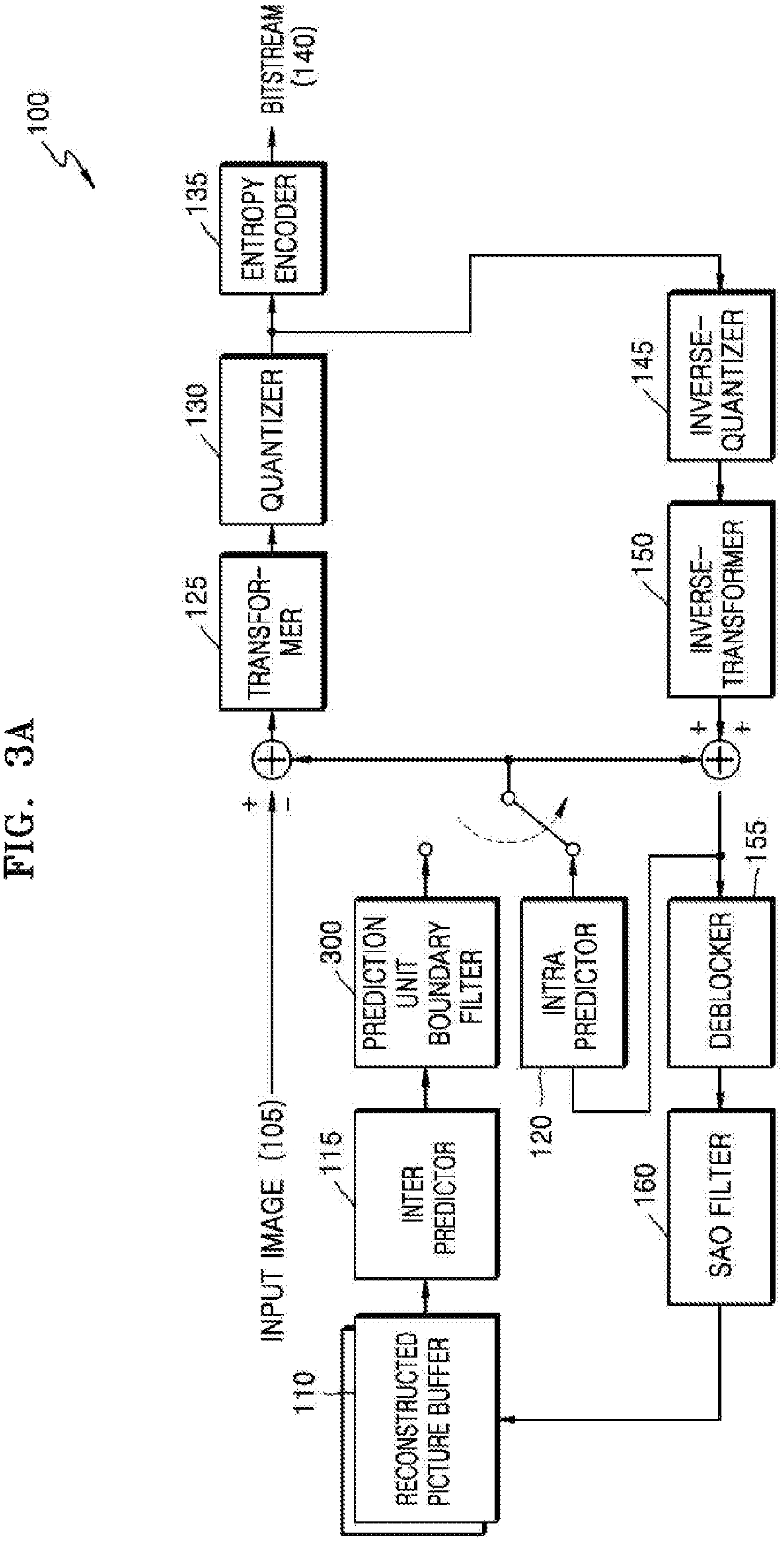
FIG. 3A is a block diagram of a video encoding apparatus 100 with prediction unit boundary filtering, according to an embodiment.

FIG. 3A is a block diagram of a video encoding apparatus 100 with prediction unit boundary filtering, according to an embodiment.

The encoding apparatus 100 of FIG. 3A receives a current image 105 as input and outputs a bitstream 140. Compared to a video encoder 1100 of FIG. 11 to be described below, the encoding apparatus 100 of FIG. 3A may further include a prediction unit boundary filter 300. Elements of the encoding apparatus 100 of FIG. 3A other than the prediction unit boundary filter 300 may equally correspond to those of or included in the video encoder 1100 of FIG. 11. Specifically, a reconstructed picture buffer 110, an inter predictor 115, an intra predictor 120, a transformer 125, a quantizer 130, an entropy encoder 135, an inverse-quantizer 145, an inverse-transformer 150, a deblocker 155, and a sample adaptive offset (SAO) filter 160 of the encoding apparatus 100 of FIG. 3A may equally correspond to a reconstructed picture buffer 1110, an inter predictor 1115, an intra predictor 1120, a transformer 1125, a quantizer 1130, an entropy encoder 1135, an inverse-quantizer 1145, an inverse-transformer 1150, a deblocker 1155, and an SAO filter 1160 of the video encoder 1100 of FIG. 11. Accordingly, detailed descriptions of the elements of the encoding apparatus 100 of FIG. 3A corresponding to those of the video encoder 1100 of FIG. 11 will be given below with reference to FIG. 11.

The encoding apparatus 100 of FIG. 3A may include the encoding apparatus 10_a_ of FIG. 1A. Specifically, the partitioner 11_a_ and the filter 12_a_ of the encoding apparatus 10_a_ of FIG. 1A may be included in the prediction unit boundary filter 300 of the encoding apparatus 100 of FIG. 3A. In addition, the encoder 13_a_ of the encoding apparatus 10_a_ of FIG. 1A may be included in at least one of the transformer 125 and the quantizer 130 of the encoding apparatus 100 of FIG. 3A.

FIG. 3A illustrates that the encoding apparatus 100 according to an embodiment filters a predicted value of a pixel adjacent to a boundary between prediction units after inter prediction is performed on a current block and before a residual value is added to reconstruct the value of the pixel.

Alternatively, FIG. 3A illustrates that the encoding apparatus 100 according to an embodiment filters the predicted value of the pixel adjacent to the boundary between the prediction units after inter prediction is performed on the current block and before the predicted value is subtracted from an original value to obtain the residual value.

The encoding apparatus 100 may remove a high-frequency component of a residual signal and improve encoding and decoding performance by filtering the predicted value of the pixel adjacent to the boundary between the prediction units after inter prediction is performed.

The inter predictor 115 may perform inter prediction per prediction unit split from an inter-mode coding unit of a current image 105. Specifically, the inter predictor 115 may generate a predicted block by performing motion compensation per prediction unit.

The prediction unit boundary filter 300 may filter the predicted value of the pixel adjacent to the boundary of the prediction units split from the inter-predicted coding unit. The transformer 125 may transform the residual value of the pixel by subtracting the filtered predicted value of the pixel from an original value of the pixel.

Specifically, the prediction unit boundary filter 300 may obtain at least one prediction unit from a current coding unit of an image, based on a partition mode. For example, if the partition mode indicates 2N×2N, the prediction unit boundary filter 300 may obtain one 2N×2N prediction unit from the current 2N×2N coding unit. Otherwise, if the partition mode indicates 2N×N, the prediction unit boundary filter 300 may split the current 2N×2N coding unit into two 2N×N prediction units. When the current coding unit includes two or more prediction units, the prediction unit boundary filter 300 may filter the predicted value of the pixel adjacent to the boundary between the prediction units.

The prediction unit boundary filter 300 may determine whether to filter the boundary of the prediction units, based on at least one of a prediction mode of the current coding unit, size information of the prediction units split from the current coding unit, size information of transformation units split from the current coding unit, and information indicating whether a transformation coefficient is present in the current coding unit.

For example, the prediction unit boundary filter 300 may filter the boundary of the prediction units if the prediction mode of the current coding unit is an inter prediction mode, and may be bypassed if the prediction mode of the current coding unit is an intra prediction mode.

As another example, if the size of at least one transformation unit split from the current coding unit is greater than the size of at least one prediction unit split from the current coding unit, the prediction unit boundary filter 300 may filter the boundary of the prediction units. When the boundary of the prediction units is included in one transformation unit, discontinuity of the prediction units may cause a high-frequency component in a transformation process. Otherwise, if the transformation unit is always smaller than the prediction unit, the influence of discontinuity of the prediction units on a transformation process may be relatively small. Accordingly, to reduce the amount of calculation, the prediction unit boundary filter 300 may determine whether to filter the boundary of the prediction units, based on size information of the prediction units and size information of the transformation unit.

Specifically, the prediction unit boundary filter 300 may obtain at least one transformation unit from the coding unit based on transformation unit split information. In addition, the prediction unit boundary filter 300 may obtain at least one prediction unit from the coding unit based on the partition mode. The size of the prediction unit obtained from the coding unit may be independent of the size of the transformation unit obtained from the coding unit. In other words, the prediction unit boundary filter 300 may split the coding unit into at least one transformation unit independently of the size of the prediction unit, or may split the coding unit into at least one prediction unit independently of the size of the transformation unit.

As another example, if the partition mode indicates that the current coding unit is split into one prediction unit, the boundary between the prediction units is not generated and thus the prediction unit boundary filter 300 may not perform filtering. Specifically, the prediction unit boundary filter 300 may not perform filtering if the partition mode of the current coding unit indicates 2N×2N.

The prediction unit boundary filter 300 may determine the type of filtering based on whether the transformation coefficient is present in the current coding unit. Specifically, the prediction unit boundary filter 300 may perform different types of filtering in a case when the transformation coefficient is present in the current coding unit and a case when the transformation coefficient is not present in the current coding unit. If the transformation coefficient is not present in the current coding unit, the current coding unit is not transformed and thus the influence of the boundary of the prediction units on decoding and encoding performance may be relatively small. Accordingly, if the transformation coefficient is not present in the current coding unit, the prediction unit boundary filter 300 may perform filtering configured not to generate over-blurring between the prediction units.

The prediction unit boundary filter 300 may determine the type of filtering based on the direction of the boundary between the prediction units. For example, if the boundary between the prediction units is provided in a horizontal direction, the prediction unit boundary filter 300 may perform vertical 3-tap filtering. Otherwise, if the boundary between the prediction units is provided in a vertical direction, the prediction unit boundary filter 300 may perform horizontal 3-tap filtering.

The prediction unit boundary filter 300 may adaptively perform filtering. Specifically, the prediction unit boundary filter 300 may determine at least one of the intensity of filtering and the size of filtering based on at least one of the predicted value of the pixel to be filtered and the predicted value of the neighboring pixel adjacent to the pixel to be filtered, the residual value of the pixel to be filtered, motion information of the prediction units, and mode information of the prediction units.

For example, if the difference between the predicted value of the pixel to be filtered and the predicted value of the neighboring pixel adjacent to the pixel to be filtered is equal to or greater than a predetermined threshold value, the prediction unit boundary filter 300 may perform strong filtering. Otherwise, if the difference between the predicted value of the pixel to be filtered and the predicted value of the neighboring pixel adjacent to the pixel to be filtered is equal to or less than the predetermined threshold value, the prediction unit boundary filter 300 may perform weak filtering. The prediction unit boundary filter 300 may adjust the intensity of filtering by adjusting filtering coefficients.

For example, if the difference between the predicted value of the pixel to be filtered and the predicted value of the neighboring pixel adjacent to the pixel to be filtered is equal to or greater than the predetermined threshold value, the prediction unit boundary filter 300 may perform large filtering. Otherwise, if the difference between the predicted value of the pixel to be filtered and the predicted value of the neighboring pixel adjacent to the pixel to be filtered is equal to or less than the predetermined threshold value, the prediction unit boundary filter 300 may perform small filtering. The prediction unit boundary filter 300 may adjust the size of filtering by adjusting the number of filtering taps.

The prediction unit boundary filter 300 may filter a pixel located within a predetermined distance from the boundary of the prediction units as well as the pixel adjacent to the boundary of the prediction units. For example, the prediction unit boundary filter 300 may filter a pixel spaced apart from the boundary of the prediction units by a 1-pixel distance. In addition, the prediction unit boundary filter 300 may adaptively perform filtering based on the location of the pixel to be filtered. For example, the prediction unit boundary filter 300 may reduce the intensity of filtering if the pixel to be filtered is spaced far apart from the prediction units.

The filtering conditions of the prediction unit boundary filter 300 may also be used as the filtering conditions of the deblocker 155. For example, the adaptive filtering conditions and the filtering coefficients may be shared between the prediction unit boundary filter 300 and the deblocker 155. Accordingly, the prediction unit boundary filter 300 may give information about the filtering conditions to the deblocker 155, or the deblocker 155 may give information about the filtering conditions to the prediction unit boundary filter 300.

Figure 3B:
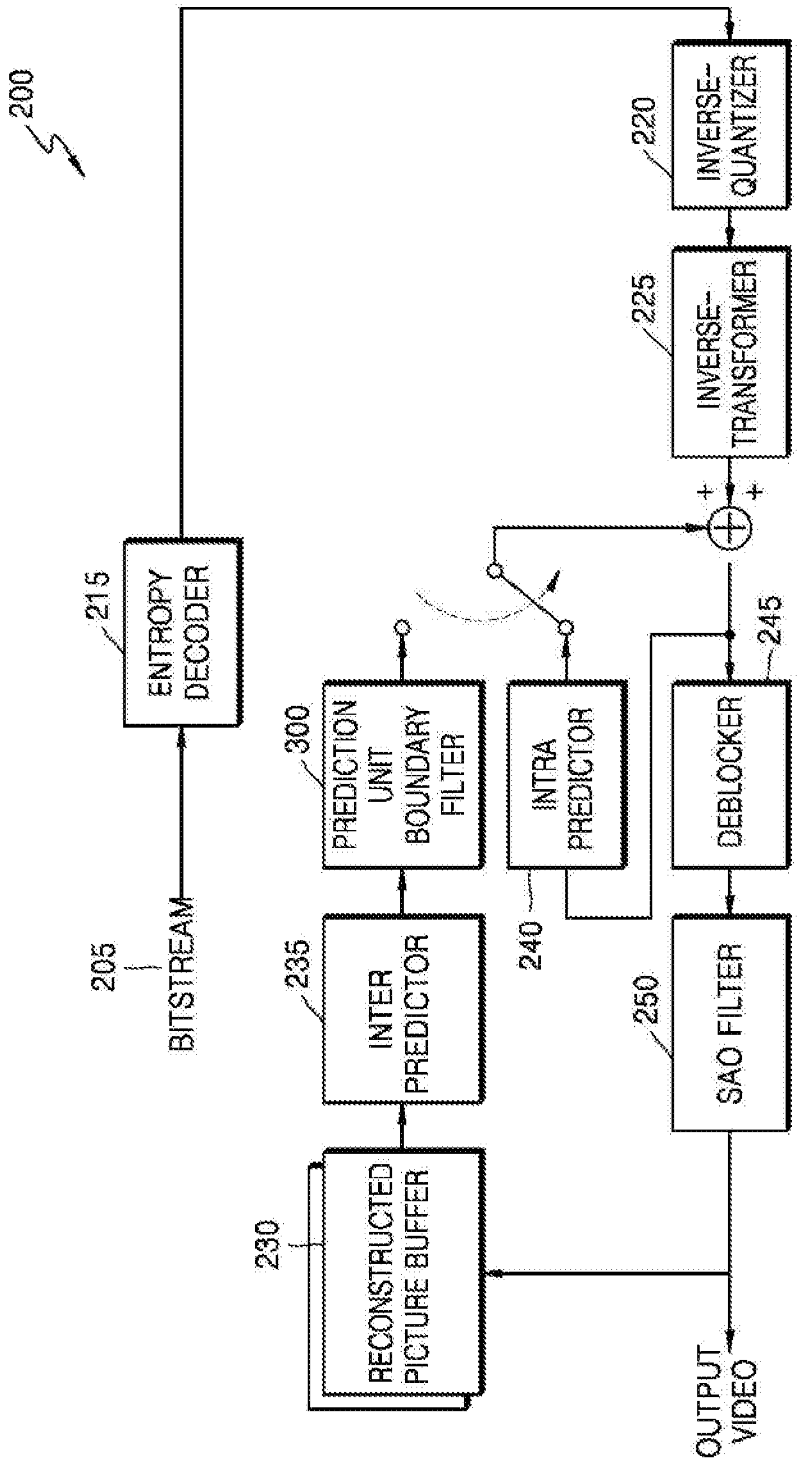
FIG. 3B is a block diagram of a video decoding apparatus 200 with prediction unit boundary filtering, according to an embodiment.

FIG. 3B is a block diagram of a video decoding apparatus 200 with prediction unit boundary filtering, according to an embodiment.

The decoding apparatus 200 of FIG. 3B receives a bitstream 205 as input and outputs a video. Compared to a video decoder 1200 of FIG. 12 to be described below, the decoding apparatus 200 of FIG. 3B may further include a prediction unit boundary filter 300. Elements of the decoding apparatus 200 of FIG. 3B other than the prediction unit boundary filter 300 may equally correspond to those of or included in the video decoder 1200 of FIG. 12. Specifically, an entropy decoder 215, an inverse-quantizer 220, an inverse-transformer 225, a reconstructed picture buffer 230, an inter predictor 235, an intra predictor 240, a deblocker 245, and an SAO filter 250 of the decoding apparatus 200 of FIG. 3B may equally correspond to an entropy decoder 1215, an inverse-quantizer 1220, an inverse-transformer 1225, a reconstructed picture buffer 1230, an inter predictor 1235, an intra predictor 1240, a deblocker 1245, and an SAO filter 1250 of the video decoder 1200 of FIG. 12. Accordingly, detailed descriptions of the elements of the decoding apparatus 200 of FIG. 3B corresponding to those of the video decoder 1200 of FIG. 12 will be given below with reference to FIG. 12.

The decoding apparatus 200 of FIG. 3B may include the decoding apparatus 20*a* of FIG. 2A. Specifically, the partitioner 21*a* and the filter 22*a* of the decoding apparatus 20*a* of FIG. 2A may be included in the prediction unit boundary filter 300 of the decoding apparatus 200 of FIG. 3B. In addition, the reconstructor 23*a* of the decoding apparatus 20*a* of FIG. 2A may be included in an adder 242 of the decoding apparatus 200 of FIG. 3B. The adder 242 of the decoding apparatus 200 of FIG. 3B may reconstruct the value of a pixel by adding a filtered predicted value output from the prediction unit boundary filter 300, to a residual value output from the inverse-transformer 225.

FIG. 3B illustrates that the decoding apparatus 200 according to an embodiment filters a predicted value of a pixel adjacent to a boundary between prediction units after inter prediction is performed on a current block and before the residual value is added.

The inter predictor 235 may perform inter prediction per prediction unit split from an inter-mode coding unit of a current picture. Specifically, the inter predictor 235 may generate a predicted block by performing motion compensation per prediction unit.

The prediction unit boundary filter 300 may filter the predicted value of the pixel adjacent to the boundary of the prediction units split from the inter-predicted coding unit. The value of the pixel may be reconstructed by adding the filtered predicted value of the pixel to the residual value of the pixel.

The decoding apparatus 200 may remove a high-frequency component of a residual signal and improve encoding and decoding performance by filtering the predicted value of the pixel adjacent to the boundary between the prediction units after inter prediction is performed and before the residual value is added.

The prediction unit boundary filter 300 may filter the predicted value of the pixel adjacent to the boundary of the prediction units split from the inter-predicted coding unit.

Specifically, the prediction unit boundary filter 300 may obtain at least one prediction unit from a current coding unit of an image, based on a partition mode obtained from the bitstream 205. For example, if the partition mode indicates 2N×2N, the prediction unit boundary filter 300 may obtain one 2N×2N prediction unit from the current 2N×2N coding unit. Otherwise, if the partition mode indicates 2N×N, the prediction unit boundary filter 300 may split the current 2N×2N coding unit into two 2N×N prediction units. When the current coding unit includes two or more prediction units, the prediction unit boundary filter 300 may filter the predicted value of the pixel adjacent to the boundary between the prediction units.

The prediction unit boundary filter 300 may determine whether to filter the boundary of the prediction units, based on at least one of a prediction mode of the current coding unit, size information of the prediction units split from the current coding unit, size information of transformation units split from the current coding unit, and information indicating whether a transformation coefficient is present in the current coding unit.

For example, the prediction unit boundary filter 300 may filter the boundary of the prediction units if the prediction mode of the current coding unit is an inter prediction mode, and may be bypassed if the prediction mode of the current coding unit is an intra prediction mode.

As another example, if the size of at least one transformation unit split from the current coding unit is greater than the size of at least one prediction unit split from the current coding unit, the prediction unit boundary filter 300 may filter the boundary of the prediction units. When the boundary of the prediction units is included in one transformation unit, discontinuity of the prediction units may cause a high-frequency component in a transformation process. Otherwise, if the transformation unit is always smaller than the prediction unit, the influence of discontinuity of the prediction units on a transformation process may be relatively small. Accordingly, to reduce the amount of calculation, the prediction unit boundary filter 300 may determine whether to filter the boundary of the prediction units, based on size information of the prediction units and size information of the transformation unit.

Specifically, the prediction unit boundary filter 300 may obtain at least one transformation unit from the coding unit based on transformation unit split information obtained from the bitstream 205. In addition, the prediction unit boundary filter 300 may obtain at least one prediction unit from the coding unit based on the partition mode obtained from the bitstream 205. The size of the prediction unit obtained from the coding unit may be independent of the size of the transformation unit obtained from the coding unit. In other words, the prediction unit boundary filter 300 may split the coding unit into at least one transformation unit independently of the size of the prediction unit, or may split the coding unit into at least one prediction unit independently of the size of the transformation unit.

As another example, if the partition mode indicates that the current coding unit is split into one prediction unit, the boundary between the prediction units is not generated and thus the prediction unit boundary filter 300 may not perform filtering. Specifically, the prediction unit boundary filter 300 may not perform filtering if the partition mode of the current coding unit indicates 2N×2N.

The prediction unit boundary filter 300 may determine the type of filtering based on whether a transformation coefficient is present in the current coding unit. Specifically, the prediction unit boundary filter 300 may perform different types of filtering in a case when the transformation coefficient is present in the current coding unit and a case when the transformation coefficient is not present in the current coding unit. If the transformation coefficient is not present in the current coding unit, the current coding unit is not transformed and thus the influence of the boundary of the prediction units on decoding and decoding performance may be relatively small. Accordingly, if the transformation coefficient is not present in the current coding unit, the prediction unit boundary filter 300 may perform filtering configured not to generate over-blurring between the prediction units.

The prediction unit boundary filter 300 may determine the type of filtering based on the direction of the boundary between the prediction units. For example, if the boundary between the prediction units is provided in a horizontal direction, the prediction unit boundary filter 300 may perform vertical 3-tap filtering. Otherwise, if the boundary between the prediction units is provided in a vertical direction, the prediction unit boundary filter 300 may perform horizontal 3-tap filtering.

The prediction unit boundary filter 300 may adaptively perform filtering. Specifically, the prediction unit boundary filter 300 may determine at least one of the intensity of filtering and the size of filtering based on at least one of the predicted value of the pixel to be filtered and the predicted value of the neighboring pixel adjacent to the pixel to be filtered, the residual value of the pixel to be filtered, motion information of the prediction units, and mode information of the prediction units.

For example, if the difference between the predicted value of the pixel to be filtered and the predicted value of the neighboring pixel adjacent to the pixel to be filtered is equal to or greater than a predetermined threshold value, the prediction unit boundary filter 300 may perform strong filtering. Otherwise, if the difference between the predicted value of the pixel to be filtered and the predicted value of the neighboring pixel adjacent to the pixel to be filtered is equal to or less than the predetermined threshold value, the prediction unit boundary filter 300 may perform weak filtering. The prediction unit boundary filter 300 may adjust the intensity of filtering by adjusting filtering coefficients.

For example, if the difference between the predicted value of the pixel to be filtered and the predicted value of the neighboring pixel adjacent to the pixel to be filtered is equal to or greater than the predetermined threshold value, the prediction unit boundary filter 300 may perform large filtering. Otherwise, if the difference between the predicted value of the pixel to be filtered and the predicted value of the neighboring pixel adjacent to the pixel to be filtered is equal to or less than the predetermined threshold value, the prediction unit boundary filter 300 may perform small filtering. The prediction unit boundary filter 300 may adjust the size of filtering by adjusting the number of filtering taps. The prediction unit boundary filter 300 may filter a pixel located within a predetermined distance from the boundary of the prediction units as well as the pixel adjacent to the boundary of the prediction units. For example, the prediction unit boundary filter 300 may filter a pixel spaced apart from the boundary of the prediction units by a 2-pixel distance. In addition, the prediction unit boundary filter 300 may adaptively perform filtering based on the location of the pixel to be filtered. For example, the prediction unit boundary filter 300 may reduce the intensity of filtering if the pixel to be filtered is spaced far apart from the prediction units.

The filtering conditions of the prediction unit boundary filter 300 may also be used as the filtering conditions of the deblocker 245. For example, the adaptive filtering conditions and the filtering coefficients may be shared between the prediction unit boundary filter 300 and the deblocker 245. Accordingly, the prediction unit boundary filter 300 may give information about the filtering conditions to the deblocker 245, or the deblocker 245 may give information about the filtering conditions to the prediction unit boundary filter 300.

Figure 3C:
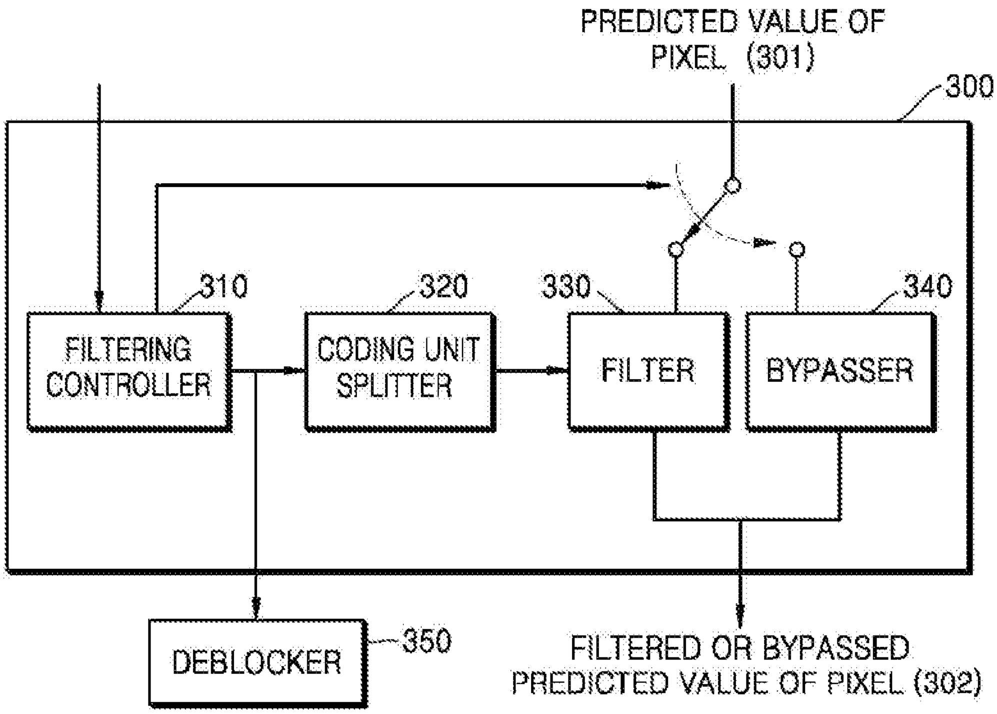
FIG. 3C is a block diagram of a prediction unit boundary filter 300 according to an embodiment.

FIG. 3C is a block diagram of a prediction unit boundary filter 300 according to an embodiment.

The prediction unit boundary filter 300 according to an embodiment may include a coding unit splitter 320, a filter 330, and a bypasser 340. The prediction unit boundary filter 300 according to an embodiment may further include a filtering controller 310 for controlling the coding unit splitter 320, the filter 330, and the bypasser 340. Alternatively, the coding unit splitter 320, the filter 330, and the bypasser 340 may be controlled by individual processors (not shown) and the processors may interactively operate to control the prediction unit boundary filter 300. Otherwise, the coding unit splitter 320, the filter 330, and the bypasser 340 may be controlled by an external processor (not shown) of the prediction unit boundary filter 300.

In the following description, the prediction unit boundary filter 300 according to an embodiment includes the filtering controller 310 for controlling the coding unit splitter 320, the filter 330, and the bypasser 340.

The prediction unit boundary filter 300 may further include one or more data storages (not shown) for storing input and output data of the coding unit splitter 320, the filter 330, and the bypasser 340. The prediction unit boundary filter 300 may include a memory controller (not shown) for controlling data input and output to and from the data storages.

The prediction unit boundary filter 300 may receive a predicted value 301 of a pixel as input, and outputs a filtered or bypassed predicted value 302 of the pixel.

The filtering controller 310 may determine whether to filter a boundary of prediction units. For example, if a prediction mode of a current coding unit is an intra prediction mode, the filtering controller 310 may control the bypasser 340 to bypass the current coding unit.

The filtering controller 310 may determine filtering coefficients or the intensity of filtering to be applied to the filter 330. For example, the filtering controller 310 may determine the filtering coefficients to be applied to the filter 330, based on the distance from the pixel to be filtered to the boundary between the prediction units.

The filtering controller 310 may share filtering conditions of the prediction unit boundary filter 300 with a deblocker 350.

The coding unit splitter 320 may spit the current coding unit of an inter prediction mode into at least one prediction unit based on a partition mode.

The filter 330 may filter the predicted value 301 of the pixel under the control of the filtering controller 310.

The bypasser 340 may bypass the predicted value 301 of the pixel under the control of the filtering controller 310.

Figure 4:
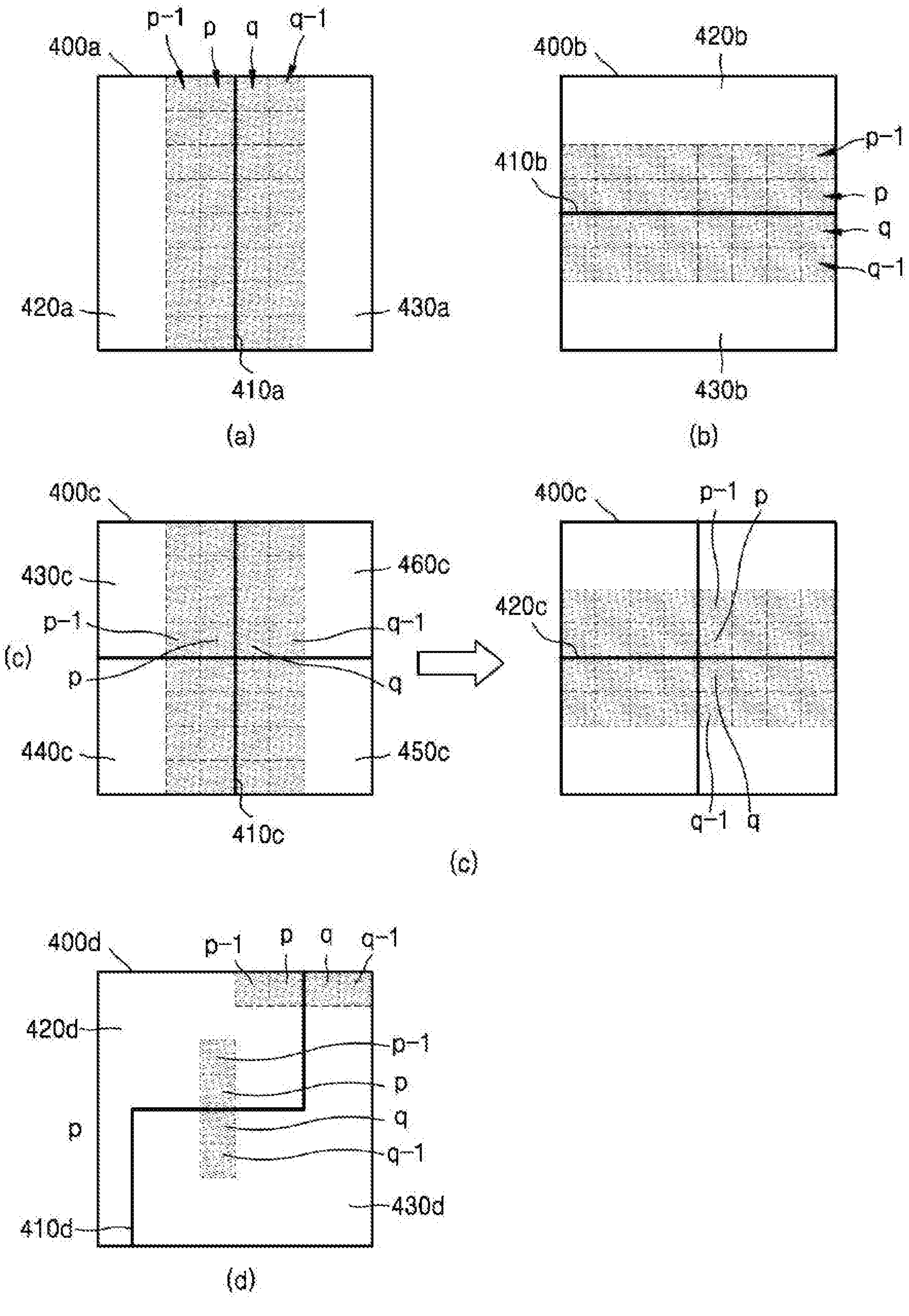
FIG. 4 is a diagram for describing operations of filtering a boundary of partitions within a block, according to embodiments.

FIG. 4 is a diagram for describing operations of filtering a boundary of partitions within a block, according to embodiments.

The encoding apparatuses 10*a* and 100, the encoding methods 10*b*, 10*c*, and 10*d*, the decoding apparatuses 20*a* and 200, and the decoding methods 20*b*, 20*c*, and 20*d* according to embodiments may perform the filtering operations to be described below with reference to FIG. 4.

(a) of FIG. 4 illustrates that the decoding and encoding methods and apparatuses according to embodiments split a block 400*a* into two partitions 420*a* and 430*a* with respect to a vertical boundary 410*a*. For example, the decoding and encoding methods and apparatuses according to embodiments may split the block 400*a* having a size of 2N×2N into the partitions 420*a* and 430*a* having sizes of N×2N and nL×2N or nR×2N, respectively.

(b) of FIG. 4 illustrates that the decoding and encoding methods and apparatuses according to embodiments split a block 400*b* into two partitions 420*b* and 430*b* with respect to a horizontal boundary 410*b*. For example, the decoding and encoding methods and apparatuses according to embodiments may split the block 400*b* having a size of 2N×2N into the partitions 420*b* and 430*b* having sizes of 2N×N and 2N×NU or 2N×dU, respectively.

(c) of FIG. 4 illustrates that the decoding and encoding methods and apparatuses according to embodiments split a block 400*c* into four partitions 430*c*, 440*c*, 450*c*, and 460*c* with respect to a horizontal boundary 420*c* and a vertical boundary 410*c*. For example, the decoding and encoding methods and apparatuses according to embodiments may split the block 400*c* having a size of 2N×2N into the partitions 430*c*, 440*c*, 450*c*, and 460*c* each having a size of N×N.

(d) of FIG. 4 illustrates that the decoding and encoding methods and apparatuses according to embodiments split a block 400*d* having a size of 2N×2N into two partitions 420*d* and 430*d* with respect to an arbitrary boundary 410*d*. For example, the decoding and encoding methods and apparatuses according to embodiments may split the block 400*d* having a size of 2N×2N into a foreground partition 420*d* and a background partition 430*d*.

The decoding and encoding methods and apparatuses according to embodiments may sequentially filter pixels adjacent to the boundary of the partitions, along the boundary of the partitions.

When a block includes a horizontal boundary and a vertical boundary, the decoding and encoding methods and apparatuses according to embodiments may sequentially filter pixels adjacent to the horizontal boundary, along the horizontal boundary, and then sequentially filter pixels adjacent to the vertical boundary, along the vertical boundary. In this case, pixels adjacent to both of the horizontal boundary and the vertical boundary may be filtered repeatedly. For example, pixels adjacent to both of the vertical boundary 410*c* and the horizontal boundary 420*c* of (c) of FIG. 4 may be filtered repeatedly.

The decoding and encoding methods and apparatuses according to embodiments may perform horizontal 3-tap filtering on a vertical boundary. In addition, the decoding and encoding methods and apparatuses according to embodiments may perform vertical 3-tap filtering on a horizontal boundary.

For example, the decoding and encoding methods and apparatuses according to embodiments may perform filtering based on Equation 1.

$$p'=((p-1)<<a+p<<b+(q)<<c+\text{offset})>>d$$

$$q'=((p)<<a+q<<b+(q-1)<<c+\text{offset})>>d \quad \text{[Equation 1]}$$

In Equation 1, p and q may refer to predicted values of pixel p and pixel q adjacent to a boundary of partitions. Likewise, in Equation 1, p−1 may refer to a predicted value of pixel p−1 adjacent to pixel p, and q−1 may refer to a predicted value of pixel q−1 adjacent to pixel q. In Equation 1, p' may refer to a result of filtering the predicted value of pixel p. In addition, a, b, and c may refer to filtering coefficients, and the intensity of filtering may be determined depending on the values of a, b, and c. Furthermore, d may be determined depending on a, b, c, and an offset.

For example, the decoding and encoding methods and apparatuses according to embodiments may perform 3-tap filtering on the predicted value of pixel p included in a first partition and adjacent to a boundary of the first partition and a second partition, by using the predicted values of pixel p−1 and pixel q adjacent to pixel p.

As another example, the decoding and encoding methods and apparatuses according to embodiments may perform 3-tap filtering on the predicted value of pixel q included in the second partition and adjacent to the boundary of the first partition and the second partition, by using the predicted values of pixel p and pixel q−1 adjacent to pixel q.

Figure 5:
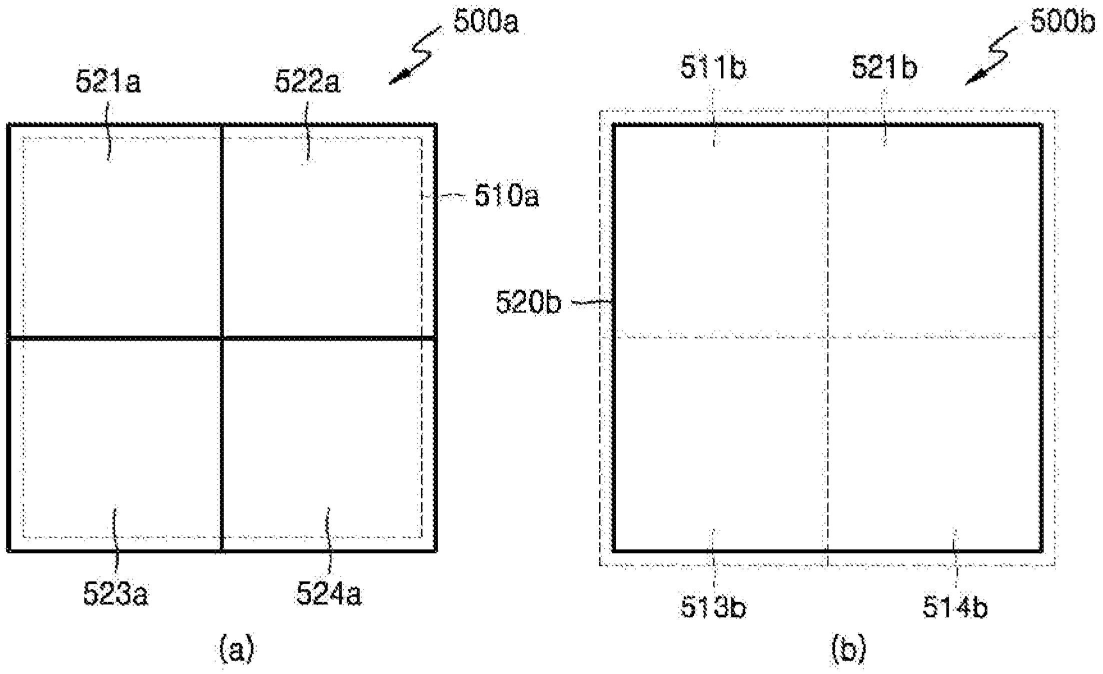
FIG. 5 is a diagram for describing conditions for filtering a boundary of partitions within a block, according to an embodiment.

FIG. 5 is a diagram for describing conditions for filtering a boundary of partitions within a block, according to an embodiment. The filtering conditions to be described below with reference to FIG. 5 may be applied to the encoding apparatuses 10*a* and 100, the encoding methods 10*b*, 10*c*, and 10*d*, the decoding apparatuses 20*a* and 200, and the decoding methods 20*b*, 20*c*, and 20*d* according to embodiments.

(a) of FIG. 5 illustrates a 2N×2N coding unit 500*a* split into a 2N×2N transformation unit 510*a* and into N×N prediction units 521*a*, 522*a*, 523*a*, and 524*a*. Herein, the prediction units 521*a*, 522*a*, 523*a*, and 524*a* may be included in one transformation unit 510*a* split from the coding unit 500*a*.

When the coding unit 500*a* is split as illustrated in (a) of FIG. 5, discontinuity of the prediction units 521*a*, 522*a*, 523*a*, and 524*a* may influence transformation encoding and thus cause a high-frequency component of a residual signal.

Accordingly, if the first and second prediction units 521*a* and 522*a* among the prediction units 521*a*, 522*a*, 523*a*, and 524*a* split from the current coding unit 500*a* are included in one transformation unit 510*a* split from the current coding unit 500*a*, the encoding and decoding methods and apparatuses according to embodiments may filter predicted values of pixels adjacent to a boundary between the first and second prediction units 521*a* and 522*a*.

Alternatively, the encoding and decoding methods and apparatuses according to embodiments may filter predicted values of pixels adjacent to boundaries among the prediction units 521*a*, 522*a*, 523*a*, and 524*a* by comparing size information of the prediction units split from the current coding unit 500*a* and size information of the transformation unit split from the current coding unit 500*a*.

Otherwise, at least one boundary of the prediction units 521*a*, 522*a*, 523*a*, and 524*a* split from the current coding unit 500*a* is entirely or partially included in at least one transformation unit 510*a* split from the current coding unit 500*a*, the encoding and decoding methods and apparatuses according to embodiments may filter predicted values of pixels adjacent to the boundary of the prediction units.

(b) of FIG. 5 illustrates a 2N×2N coding unit 500*b* split into N×N transformation units 511*b*, 512*b*, 513*b*, and 514*b* and a 2N×2N prediction unit 520*b*.

When a transformation unit split from a current coding unit is always smaller than a prediction unit split from the current coding unit as illustrated in (b) of FIG. 5, the influence of discontinuity of prediction units on a transformation process may be relatively small. Accordingly, to reduce the amount of calculation, the decoding and encoding apparatuses and methods according to embodiments may not filter pixels adjacent to a boundary of the prediction units based on size information of the prediction units and size information of the transformation unit.

FIG. 6A is a diagram for describing an operation of obtaining a filtering flag, according to an embodiment. FIG. 6A illustrates coding_unit syntax.

Reference numeral 600 shows syntax for obtaining the filtering flag, e.g., a cu_pus_flag[x0][v0], from a bitstream.

The cu_pus_flag[x0][y0] is a flag indicating whether to filter a predicted value of a pixel adjacent to a boundary between prediction units split from a current coding unit, in the current coding unit.

For example, to reduce the amount of calculation, the predicted value of the pixel adjacent to the boundary between the prediction units may not be filtered in an intra prediction mode. Specifically, in an intra prediction mode, since the size of a transformation unit may not be greater than the size a prediction unit, the predicted value of the pixel adjacent to the boundary between the prediction units may not be filtered.

Furthermore, if a partition mode is 2N×2N, since the current coding unit may include only one prediction unit, the predicted value of the pixel adjacent to the boundary between the prediction units may not be filtered.

If the current coding unit is in an intra mode or the prediction unit split from the current coding unit has a size of 2N×2N, a decoding method and apparatus may not filter the predicted value of the pixel adjacent to the boundary between the prediction units, without reference to the cu_pus_flag[x0][y0]. Accordingly, the cu_pus_flag[x0][y0] may be obtained from the bitstream if the current coding unit is not in an intra mode and the partition mode indicating the size of the prediction unit split from the current coding unit is not 2N×2N.

In addition, if a cu_skip_flag[x0][y0] of the current coding unit indicates that the current coding unit is in a CU skip mode, the current coding unit may be split in one prediction mode. Accordingly, the decoding method and apparatus may not filter the predicted value of the pixel adjacent to the boundary between the prediction units, without reference to the cu_pus_flag[x0][y0]. Accordingly, if the cu_skip_flag [x0][y0] indicates that the current coding unit is not in a CU skip mode, the decoding method and apparatus may obtain the cu_pus_flag[x0][y0] of the current coding unit from the bitstream.

The value of the cu_pus_flag[x0][v0] may be determined by an encoding apparatus and method. For example, the encoding apparatus and method may determine the value of the cu_pus_flag[x0][y0] based on a discontinuity level of the prediction units split from the current coding unit. The encoding apparatus and method may encode the cu_pus_flag [x0][y0] and output the same in a bitstream.

FIGS. 6B and 6C are diagrams for describing pseudo code for filtering a boundary of partitions within a block, according to an embodiment. Specifically, FIGS. 6B and 6C may show pseudo code for filtering a boundary of prediction units (partitions) within a current coding unit (block). In the following description, a method of filtering the boundary of the partitions within the block based on the pseudo code of FIGS. 6B and 6C is referred to as 'prediction unit boundary filtering'.

Figure 6D:
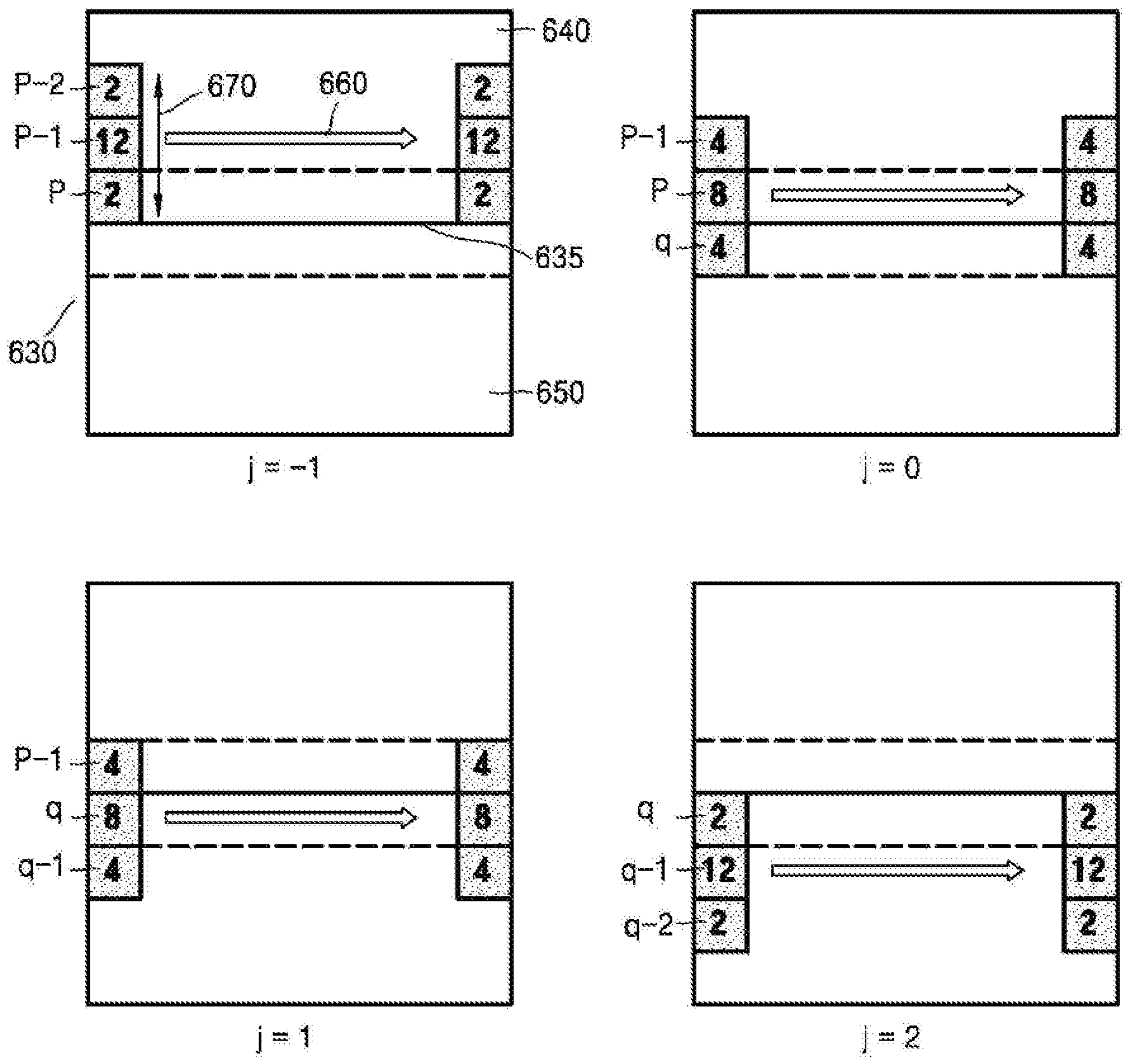
FIG. 6D is a diagram for describing an operation of filtering partitions within a block based on the pseudo code of FIGS. 6B and 6C.

FIG. 6D is a diagram for describing an operation of filtering partitions within a block based on the pseudo code of FIGS. 6B and 6C. Specifically, FIG. 6D shows the prediction unit boundary filtering operation in a case when a current 2N×2N coding unit 630 is split into 2N×N prediction units 640 and 650.

FIGS. 6B to 6D assume that prediction unit boundary filtering is performed by using 3-tap filtering. However, the number of taps used for prediction unit boundary filtering is not limited thereto. For example, prediction unit boundary filtering may be performed by using 5-tap filtering.

FIG. 6B shows pseudo code for setting input parameters applied to prediction unit boundary filtering of FIG. 6C based on a partition mode of the current coding unit.

For example, the input parameters applied to prediction unit boundary filtering may include (xB1, yB1), BLen, and BoundaryType.

BLen may refer to a pixel length of the boundary between the prediction units. BLen may be set based on size information of the current coding unit. If the current coding unit has a square shape and the prediction units split from the current coding unit have a square or rectangular shape, the pixel length of the boundary of the prediction units may be the same as a pixel length of the current coding unit. Accordingly, the value of BLen may be set to nCbSL indicating a pixel value of the current coding unit.

In general, for encoding and decoding efficiency, encoding and decoding apparatuses and methods may encode and decode log 2CbSize indicating a log value of the length of the current coding unit. Accordingly, the value of nCbSL may be set to 1<<log 2CbSize.

BoundaryType may refer to the direction of the boundary between the prediction units. Specifically, BoundaryType=1 may refer to a horizontal boundary and BoundaryType=0 may refer to a vertical boundary.

For example, in partition modes of 2N×N, 2N×NU, and 2N×ND, a horizontal boundary is enabled and thus the value of BoundaryType may be set to 1. As another example, in partition modes of N×2N, nL×2N, and nR×2N, a vertical boundary is enabled and thus the value of BoundaryType may be set to 0. As another example, in a partition mode of N×N, both vertical and horizontal boundaries are enabled and thus the value of BoundaryType may be set to 1 if filtering is performed on the vertical boundary and may be set to 0 if filtering is performed on the horizontal boundary.

(xBl, yB1) may refer to coordinate information of an initial pixel to be filtered with respect to the top left of the current coding unit. If the current coding unit has a square shape and the prediction units split from the current coding unit have a square or rectangular shape, the coordinate information of the initial pixel to be filtered may be set based on the pixel length of the current coding unit.

For example, in a coding unit having a partition mode of 2N×N, an x coordinate value of the initial pixel may be set to 0, and a y coordinate value thereof may be set to $(nCbS_L>>1)-1$ corresponding to a ½ point of the height of the current coding unit.

As another example, in a coding unit having a partition mode of 2N×NU, the x coordinate value of the initial pixel may be set to 0, and the y coordinate value thereof may be set to ($nCbS_L$>>2)−1 corresponding to a ¼ point of the height of the current coding unit.

As another example, in a coding unit having a partition mode of 2N×ND, the x coordinate value of the initial pixel may be set to 0, and the y coordinate value thereof may be set to ($nCbS_L$>>1)+($nCbS_L$>>2)−1 corresponding to a ¾ point of the height of the current coding unit.

As another example, in a coding unit having a partition mode of N×2N, the x coordinate value of the initial pixel may be set to ($nCbS_L$>>1)−1 corresponding to a ½ point of the width of the current coding unit, and the y coordinate value thereof may be set to 0.

As another example, in a coding unit having a partition mode of nL×2N, the x coordinate value of the initial pixel may be set to ($nCbS_L$>>2)−1 corresponding to a ¼ point of the width of the current coding unit, and the y coordinate value thereof may be set to 0.

As another example, in a coding unit having a partition mode of nR×2N, the x coordinate value of the initial pixel may be set to ($nCbS_L$>>1)+($nCbS_L$>>2)−1 corresponding to a ¾ point of the height of the current coding unit, and the y coordinate value thereof may be set to 0.

As another example, in a coding unit having a partition mode of N×N, if filtering is performed on a vertical boundary, the x coordinate value of the initial pixel may be set to ($nCbS_L$>>1)−1 corresponding to a ½ point of the width of the current coding unit, and the y coordinate value thereof may be set to 0. Otherwise, if filtering is performed on a horizontal boundary, the x coordinate value of the initial pixel may be set to 0, and the y coordinate value thereof may be set to ($nCbS_L$>>1)−1 corresponding to a ½ point of the height of the current coding unit.

For example, for a horizontal boundary of BoundaryType=1, the encoding and decoding apparatuses and methods may filter predicted values of pixels from the initial pixel located at coordinates (xBl, yB1) to a pixel located at coordinates (xB1+BLen−1, yB1) with respect to the top left of the current coding unit. For a vertical boundary of BoundaryType=0, the encoding and decoding apparatuses and methods may filter predicted values of pixels from the initial pixel located at coordinates (xBl, yB1) to a pixel located at coordinates (xBl, yB1+BLen−1) with respect to the top left of the current coding unit.

Referring to FIG. 6C, reference numeral 610*c* shows input parameters of prediction unit boundary filtering. For example, the input parameters of prediction unit boundary filtering may include (xCb, yCb), (xBl, yB1), Blen, BoundaryType, and predSamplesL.

(xBl, yB1), Blen, and BoundaryType may be set based on the partition mode of the current coding unit as described above in relation to FIG. 6B.

(xCb, yCb) may refer to coordinates at which a top left pixel of the current coding unit is located with respect to the top left of a current picture.

In addition, predSampleL may refer to predicted values of the current coding unit, and may be an array having the same size as the current coding unit (i.e., ($nCbS_L$)×(nCBSL)).

Reference numeral 620*c* shows output parameters of prediction unit boundary filtering. For example, the output parameters of prediction unit boundary filtering may include predSamplesL indicating filtered predicted values.

Specifically, reference numeral 621*c* shows pseudo code for setting a proceeding direction of prediction unit boundary filtering and a filtering direction of prediction unit boundary filtering.

Xstep and Ystep may be parameters for setting the proceeding direction of prediction unit boundary filtering. For example, when prediction unit boundary filtering is performed to sequentially filter pixels along the boundary between the prediction units, XStep and YStep may be used to move a filter along the boundary between the prediction units. Specifically, if Xstep has a value 1 and Ystep has a value 0, this may mean that the proceeding direction of prediction unit boundary filtering is a horizontal direction. Otherwise, if Xstep has a value 0 and Ystep has a value 1, this may mean that the proceeding direction of prediction unit boundary filtering is a vertical direction.

In prediction unit boundary filtering, if the boundary between the prediction units is provided in a horizontal direction, i.e., if BoundaryType has a value 1, Xstep may be set to 1 and YStep may be set to 0. Otherwise, in prediction unit boundary filtering, if the boundary between the prediction units is provided in a vertical direction, i.e., if BoundarvType has a value 0, Xstep may be set to 0 and YStep may be set to 1.

For example, referring to FIG. 6D, the current 2N×2N coding unit 630 includes a horizontal boundary 635 between the 2N×N prediction units 640 and 650. Accordingly, a proceeding direction 660 of prediction unit boundary filtering may be a horizontal direction along the horizontal boundary 635.

Referring back to FIG. 6C, XAstep and YAstep may be parameters for setting the filtering direction of prediction unit boundary filtering. Specifically, if XAstep has a value 1 and YAstep has a value 0, the filtering direction of prediction unit boundary filtering may be a horizontal direction. Otherwise, if Xstep has a value 0 and Ystep has a value 1, the filtering direction of prediction unit boundary filtering may be a vertical direction.

For example, XAstep and YAstep may be set in such a manner that the filtering direction of prediction unit boundary filtering is perpendicular to the boundary between the prediction units. Specifically, in prediction unit boundary filtering, if the boundary between the prediction units is provided in a horizontal direction, i.e., if BoundaryType has a value 1, XAstep may be set to 0 and YAStep may be set to 1. Otherwise, in prediction unit boundary filtering, if the boundary between the prediction units is provided in a vertical direction, i.e., if BoundaryType has a value 0, XAstep may be set to 1 and YAStep may be set to 0.

For example, referring to FIG. 6D, the current 2N×2N coding unit 630 includes the horizontal boundary 635 between the 2N×N prediction units 640 and 650. Accordingly, a filtering direction 670 of prediction unit boundary filtering may be a vertical direction perpendicular to the horizontal boundary 635.

However, the filtering direction 670 of prediction unit boundary filtering is not limited to the direction perpendicular to the boundary 635 between the prediction units 640 and 650. For example, the filtering direction 670 of prediction unit boundary filtering may be parallel to the boundary 635 between the prediction units 640 and 650.

Referring back to FIG. 6C, reference numeral 622*c* shows a parameter j for specifying a target pixel to be filtered.

For example, referring to FIG. 6D, if j=−1, pixel p−1 included in the first prediction unit 640 and spaced apart from the boundary 635 between the prediction units 640 and 650 by a 1-pixel distance may be the target pixel to be filtered. Otherwise, if j=0, pixel p included in the first prediction unit 640 and adjacent to the boundary 635 between the prediction units 640 and 650 may be the target pixel to be filtered. Otherwise, if j=1, pixel q included in the second prediction unit 650 and adjacent to the boundary 635 between the prediction units 640 and 650 may be the target pixel to be filtered. Otherwise, if j=2, pixel q−1 included in the second prediction unit 650 and spaced apart from the boundary 635 between the prediction units 640 and 650 by a 1-pixel distance may be the target pixel to be filtered.

Referring back to FIG. 6C, reference numeral 623*c* shows pseudo code for adaptively setting filtering coefficients W1, W2, and W3 used for prediction unit boundary filtering.

For example, the intensity of prediction unit boundary filtering may be reduced if the target pixel to be filtered is spaced far apart from the boundary between the prediction units. Accordingly, as shown by 623*c*, to perform strong filtering on pixels adjacent to the boundary between the prediction units (i.e., j=0 and j=1), the filtering coefficient W1 may be set to 4, the filtering coefficient W2 may be set to 8, and the filtering coefficient W3 may be set to 4. In addition, to perform weak filtering on pixels spaced apart from the boundary between the prediction units by a 1-pixel distance (i.e., j=−1 and j=2), the filtering coefficient W1 may be set to 2, the filtering coefficient W2 may be set to 12, and the filtering coefficient W3 may be set to 2.

Referring to FIG. 6D, weak filtering using W0=2, W1=14, and W2=2 may be performed on predicted values of pixel p−1 (i.e., j=−1) and pixel q−1 (i.e., j=2), and strong filtering using W0=4, W1=8, and W2=4 may be performed on predicted values of pixel p (i.e., j=0) and pixel q (i.e, j=1).

Referring back to FIG. 6C, reference numeral 624*c* shows pseudo code for setting predicted values a, b, and c to be used for 3-tap filtering, by using the input parameters (xCb, yCb), (xBl, yB1), Blen, and predSamplesL set as indicated by 610*c*, and the parameters XStep, YStep, XAStep, and YAStep set as indicated by 621*c*. Specifically, b may be set as a predicted value of the target pixel to be filtered, and a and c may be set as predicted values of neighboring pixels adjacent to the target pixel to be filtered.

Referring to FIGS. 6C and 6D, if j=−1, a, b, and c of 624*c* may be set as predicted values of pixel p−2, pixel p−1, and pixel p, respectively. Otherwise, if j=0, a, b, and c of 624*c* may be set as predicted values of pixel p−1, pixel p, and pixel q, respectively. Otherwise, if j=1 a, b, and c of 624*c* may be set as predicted values of pixel p, pixel q, and pixel q−1, respectively. Otherwise, if j=1, a, b, and c of 624*c* may be set as predicted values of pixel q, pixel q−1, and q−2 pixel, respectively.

Referring back to FIG. 6C, reference numeral 625*c* shows pseudo code for calculating a filtered predicted value TempPel by using a, b, and c set as indicted by 624*c*. Reference numeral 626*c* shows pseudo code for changing a predicted value within a current coding unit by using the filtered predicted value TempPel calculated as indicated by 625*c*.

FIG. 7 illustrates an interlayer prediction structure according to an embodiment.

The video encoding apparatus 10*a* according to an embodiment may prediction-encode base-view pictures, left-view pictures, and right-view pictures based on a reproduction order 700 of the multi-view video prediction structure illustrated in FIG. 7.

Based on the reproduction order 700 of the multi-view video prediction structure according to a related art, pictures corresponding to the same view are arranged in a horizontal direction. Accordingly, the left-view pictures marked as 'Left' are arranged in a row in a horizontal direction, the base-view pictures marked as 'Center' are arranged in a row in a horizontal direction, and the right-view pictures marked as 'Right' are arranged in a row in a horizontal direction. The base-view pictures may be center-view pictures compared to the left-view/right-view pictures.

In addition, pictures of the same picture order count (POC) order are arranged in a vertical direction. The POC order of the pictures indicates a reproduction order of pictures included in a video. 'POC X' marked in a multi-view video prediction structure indicates a relative reproduction order of pictures located in each column. A small value of X indicates an early reproduction order, and a large value thereof indicates a late reproduction order.

Therefore, based on the reproduction order 700 of the multi-view video prediction structure according to the related art, the left-view pictures marked as 'Left' are arranged based on the POC order (reproduction order) in a horizontal direction, the base-view pictures marked as 'Center' are arranged based on the POC order (reproduction order) in a horizontal direction, and the right-view pictures marked as 'Right' are arranged based on the POC order (reproduction order) in a horizontal direction. A left-view picture and a right-view picture located at the same column as a base-view picture have different views but have the same POC order (reproduction order).

Per view, four sequential pictures configure one group of pictures (GOP). Each GOP includes pictures located between two sequential anchor pictures, and one anchor picture (key picture).

An anchor picture is a random access point (RAP) picture. When a video is reproduced, at a certain reproduction order, that is, if a reproduction location is randomly selected among the pictures arranged based on the POC order, an anchor picture which is the closest to the reproduction location in the POC order is reproduced. The base-view pictures include base-view anchor pictures 711, 712, 713, 714, and 715, the left-view pictures include left-view anchor pictures 721, 722, 723, 724, and 725, and the right-view pictures include right-view anchor pictures 731, 732, 733, 734, and 735.

The multi-view pictures may be reproduced and predicted (reconstructed) in the order of the GOPs. Initially, according to the reproduction order 700 of the multi-view video prediction structure, per view, the pictures included in GOP 0 may be reproduced and then the pictures included in GOP 1 may be reproduced. That is, the pictures included in every GOP may be reproduced in the order of GOP 0, GOP 1, GOP 2, and GOP 3. In addition, based on a coding order of the multi-view video prediction structure, per view. the pictures included in GOP 0 may be predicted (reconstructed) and then the pictures included in GOP 1 may be predicted (reconstructed). That is, the pictures included in every GOP may be predicted (reconstructed) in the order of GOP 0, GOP 1, GOP 2, and GOP 3.

Based on the reproduction order 700 of the multi-view video prediction structure, both inter-view prediction (interlayer prediction) and inter prediction are performed on the pictures. In the multi-view video prediction structure, a picture from which an arrow starts is a reference picture, and a picture to which the arrow is directed is a picture to be predicted by using the reference picture.

A result of predicting the base-view pictures may be encoded and then output in the form of a base-view video stream, and a result of predicting the additional-view pictures may be encoded and then output in the form of a layer bitstream. In addition, a result of prediction-encoding the left-view pictures may be output in the form of a first layer bitstream, and a result of prediction-encoding the right-view pictures may be output in the form of a second layer bitstream Only inter prediction is performed on the base-view pictures. That is, although the I-type anchor pictures 711,

712, 713, 714, and 715 do not refer to other pictures, the other B-type and b-type pictures are predicted with reference to other base-view pictures. The B-type pictures are predicted with reference to I-type anchor pictures preceding the same in POC order and I-type anchor pictures following the same in POC order. The b-type pictures are predicted with reference to I-type anchor pictures preceding the same in POC order and B-type pictures following the same in POC order, or with reference to B-type anchor pictures preceding the same in POC order and I-type anchor pictures following the same in POC order.

On the left-view pictures and the right-view pictures, inter-view prediction (interlayer prediction) is performed with reference to pictures corresponding to another view and inter prediction is performed with reference to pictures corresponding to the same view.

Inter-view prediction (interlayer prediction) may be performed on the left-view anchor pictures 721, 722, 723, 724, and 725 with reference to the base-view anchor pictures 711, 712, 713, 714, and 715 corresponding thereto in the POC order. Inter-view prediction may be performed on the right-view anchor pictures 731, 732, 733, 734, and 735 with reference to the base-view anchor pictures 711, 712, 713, 714, and 715 or the left-view anchor pictures 721, 722, 723, 724, and 725 corresponding thereto in the POC order. In addition, inter-view prediction (interlayer prediction) involving referring to a picture having a same POC and corresponding to a different view may be performed on left-view non-anchor pictures and right-view non-anchor pictures that are not the anchor pictures 711, 712, 713, 714, 715, 721, 722, 723, 724, and 725.

The left-view non-anchor pictures and the right-view non-anchor pictures that are not the anchor pictures 711, 712, 713, 714, 715, 721, 722, 723, 724, and 725 are predicted with reference to pictures corresponding to the same view.

However, the left-view pictures and the right-view pictures may not be predicted with reference to anchor pictures preceding the same in reproduction order among the additional-view pictures of the same view. That is, for inter prediction of a current left-view picture, left-view non-anchor pictures preceding the current left-view picture in reproduction order may be referred to. Likewise, for inter prediction of a current right-view picture, right-view non-anchor pictures preceding the current right-view picture in reproduction order may be referred to.

Alternatively, for inter prediction of a current left-view picture, a left-view picture belonging to a previous GOP preceding a current GOP including the current left-view picture may not be referred to, and a left-view picture belonging to the current GOP and preceding the current left-view picture in reconstruction order may be referred to. The above principle is equally applied to a right-view picture.

The video decoding apparatus 200 according to an embodiment may reconstruct the base-view pictures, the left-view pictures, and the right-view pictures based on the reproduction order 700 of the multi-view video prediction structure illustrated in FIG. 7.

The left-view pictures may be reconstructed by performing inter-view disparity compensation with reference to the base-view pictures and performing inter motion compensation with reference to the left-view pictures. The right-view pictures may be reconstructed by performing inter-view disparity compensation with reference to the base-view pictures and the left-view pictures and performing inter motion compensation with reference to the right-view pictures. Reference pictures should be reconstructed first for disparity compensation and motion compensation of the left-view pictures and the right-view pictures.

For inter motion compensation of the left-view picture, the left-view pictures may be reconstructed by performing inter motion compensation with reference to reconstructed left-view reference pictures. For inter motion compensation of the right-view picture, the right-view pictures may be reconstructed by performing inter motion compensation with reference to reconstructed right-view reference pictures.

Alternatively, for inter motion compensation of a current left-view picture, a left-view picture belonging to a previous GOP preceding a current GOP including the current left-view picture may not be referred to, and only a left-view picture belonging to the current GOP and preceding the current left-view picture in reconstruction order may be referred to. The above principle is equally applied to a right-view picture.

Figure 8:
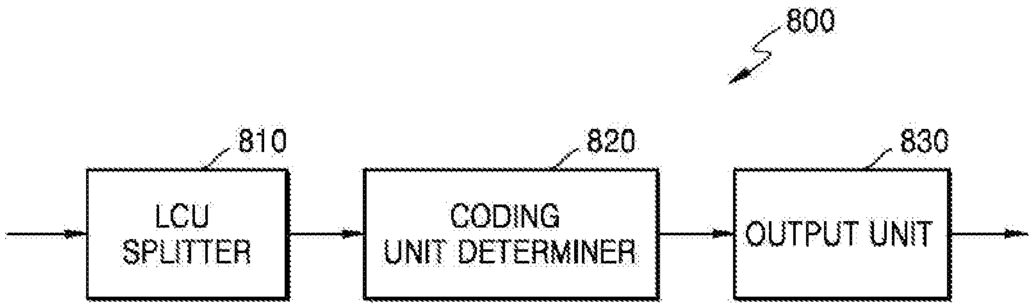
FIG. 8 illustrates a block diagram of a video encoding apparatus based on coding units of a tree structure 800, according to an embodiment of the present disclosure.

FIG. 8 illustrates a block diagram of a video encoding apparatus based on coding units of tree structure 800, according to an embodiment of the present disclosure.

The video encoding apparatus involving video prediction based on coding units of tree structure 800 according to an embodiment includes a largest coding unit splitter 810, a coding unit determiner 820 and an output unit 830. Hereinafter, for convenience of description, the video encoding apparatus involving video prediction based on coding units of tree structure 800 according to an embodiment is referred to as the 'video encoding apparatus 800'.

The largest coding unit splitter 810 may split a current picture based on a largest coding unit that is a coding unit having a maximum size for a current picture of an image. If the current picture is larger than the largest coding unit, image data of the current picture may be split into the at least one largest coding unit. The largest coding unit according to an embodiment may be a data unit having a size of 32×32, 64×64, 128×128, 256×256, etc., wherein a shape of the data unit is a square having a width and length in squares of 2.

A coding unit according to an embodiment may be characterized by a maximum size and a depth. The depth denotes the number of times the coding unit is spatially split from the largest coding unit, and as the depth deepens, deeper coding units according to depths may be split from the largest coding unit to a smallest coding unit. A depth of the largest coding unit may be defined as an uppermost depth and a depth of the smallest coding unit may be defined as a lowermost depth. Since a size of a coding unit corresponding to each depth decreases as the depth of the largest coding unit deepens, a coding unit corresponding to an upper depth may include a plurality of coding units corresponding to lower depths.

As described above, the image data of the current picture is split into the largest coding units according to a maximum size of the coding unit, and each of the largest coding units may include deeper coding units that are split according to depths. Since the largest coding unit according to an embodiment is split according to depths, the image data of a spatial domain included in the largest coding unit may be hierarchically classified according to depths.

A maximum depth and a maximum size of a coding unit, which limit the total number of times a height and a width of the largest coding unit are hierarchically split, may be predetermined.

The coding unit determiner 820 encodes at least one split region obtained by splitting a region of the largest coding unit according to depths, and determines a depth to output a finally encoded image data according to the at least one split region. That is, the coding unit determiner 820 determines a final depth by encoding the image data in the deeper coding units according to depths, according to the largest coding unit of the current picture, and selecting a depth having the least encoding error. The determined final depth and image data according to largest coding units are output to the output unit 830.

The image data in the largest coding unit is encoded based on the deeper coding units corresponding to at least one depth equal to or below the maximum depth, and results of encoding the image data based on each of the deeper coding units are compared. A depth having the least encoding error may be selected after comparing encoding errors of the deeper coding units. At least one final depth may be selected for each largest coding unit.

The size of the largest coding unit is split as a coding unit is hierarchically split according to depths, and as the number of coding units increases. Also, even if coding units correspond to the same depth in one largest coding unit, it is determined whether to split each of the coding units corresponding to the same depth to a lower depth by measuring an encoding error of the image data of the each coding unit, separately. Accordingly, even when image data is included in one largest coding unit, the encoding errors may differ according to regions in the one largest coding unit, and thus the final depths may differ according to regions in the image data. Thus, one or more final depths may be determined in one largest coding unit, and the image data of the largest coding unit may be divided according to coding units of at least one final depth.

Accordingly, the coding unit determiner 820 according to the embodiment may determine coding units having a tree structure included in the largest coding unit. The 'coding units having a tree structure' according to an embodiment include coding units corresponding to a depth determined to be the final depth, from among all deeper coding units included in the largest coding unit. A coding unit of a final depth may be hierarchically determined according to depths in the same region of the largest coding unit, and may be independently determined in different regions. Equally, a final depth in a current region may be determined independently from a final depth in another region.

A maximum depth according to an embodiment is an index related to the number of splitting times from a largest coding unit to a smallest coding unit. A first maximum depth according to an embodiment may denote the total number of splitting times from the largest coding unit to the smallest coding unit. A second maximum depth according to an embodiment may denote the total number of depth levels from the largest coding unit to the smallest coding unit. For example, when a depth of the largest coding unit is 0, a depth of a coding unit, in which the largest coding unit is split once, may be set to 1, and a depth of a coding unit, in which the largest coding unit is split twice, may be set to 2. Here, if the smallest coding unit is a coding unit in which the largest coding unit is split four times, depth levels of depths 0, 1, 2, 3, and 4 exist, and thus the first maximum depth may be set to 4, and the second maximum depth may be set to 5.

Prediction encoding and transformation may be performed according to the largest coding unit. The prediction encoding and the transformation are also performed based on the deeper coding units according to a depth equal to or depths less than the maximum depth, according to the largest coding unit.

Since the number of deeper coding units increases whenever the largest coding unit is split according to depths, encoding, including the prediction encoding and the transformation, is performed on all of the deeper coding units generated as the depth deepens. Hereinafter, for convenience of description, the prediction encoding and the transformation will be described based on a coding unit of a current depth in at least one largest coding unit.

The video encoding apparatus 800 according to an embodiment may variously select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 800 according to an embodiment may select not only a coding unit for encoding the image data, but may also select a data unit different from the coding unit so as to perform the prediction encoding on the image data in the coding unit.

In order to perform prediction encoding in the largest coding unit, the prediction encoding may be performed based on a coding unit of a final depth, i.e., based on the coding unit that is no longer split. Hereinafter, the coding unit that is no longer split and becomes a basis unit for prediction encoding will now be referred to as a 'prediction unit'. A partition obtained by splitting the prediction unit may include a prediction unit and a data unit obtained by splitting at least one selected from a height and a width of the prediction unit. A partition is a data unit where a prediction unit of a coding unit is split, and a prediction unit may be a partition having the same size as a coding unit.

For example, when a coding unit of 2N×2N (where N is a positive integer) is no longer split and becomes a prediction unit of 2N×2N, and a size of a partition may be 2N×2N, 2N×N, N×2N, or N×N. Examples of a partition mode may selectively include symmetrical partitions obtained by symmetrically splitting a height or width of the prediction unit, and may selectively include partitions obtained by asymmetrically splitting the height or width of the prediction unit, such as 1:n or n:1, partitions obtained by geometrically splitting the prediction unit, and partitions having arbitrary shapes.

A prediction mode of the prediction unit may be at least one of an intra mode, an inter mode, and a skip mode. For example, the intra mode or the inter mode may be performed on the partition of 2N×2N, 2N×N, N×2N, or N×N. Also, the skip mode may be performed only on the partition of 2N×2N. The encoding may be independently performed on one prediction unit in a coding unit, thereby selecting a prediction mode having a least encoding error.

The video encoding apparatus 800 according to the embodiment may also perform the transformation on the image data in a coding unit based not only on the coding unit for encoding the image data, but also based on a data unit that is different from the coding unit. In order to perform the transformation in the coding unit, the transformation may be performed based on a data unit having a size smaller than or equal to the coding unit. For example, the transformation unit may include a data unit for an intra mode and a transformation unit for an inter mode.

The transformation unit in the coding unit may be recursively split into smaller sized regions in the similar manner as the coding unit according to the tree structure, thus, residual data of the coding unit may be divided according to the transformation unit having the tree structure according to a transformation depth.

A transformation depth indicating the number of splitting times to reach the transformation unit by splitting the height and width of the coding unit may also be set in the transformation unit. For example, in a current coding unit of 2N×2N, a transformation depth may be 0 when the size of a transformation unit is 2N×2N, may be 1 when the size of the transformation unit is N×N, and may be 2 when the size of the transformation unit is N/2×N/2. That is, with respect to the transformation unit, the transformation unit having the tree structure may be set according to the transformation depths.

Split information according to depths requires not only information about a depth but also requires information related to prediction and transformation. Accordingly, the coding unit determiner 820 may determine not only a depth generating a least encoding error but may also determine a partition mode in which a prediction unit is split to partitions, a prediction mode according to prediction units, and a size of a transformation unit for transformation.

Coding units according to a tree structure in a largest coding unit and methods of determining a prediction unit/partition, and a transformation unit, according to embodiments, will be described in detail later with reference to FIGS. 9 through 19.

The coding unit determiner 820 may measure an encoding error of deeper coding units according to depths by using Rate-Distortion Optimization based on Lagrangian multipliers.

The coding unit determiner 820 may determine a coding unit and a prediction mode to be applied to the coding unit, by taking into account the encoding error of the deeper coding units according to depths and an encoding error of coding units according to prediction modes. Then, the coding unit determiner 820 may predict a prediction unit of the coding unit, based on the determined prediction mode, and may generate a residual block.

The coding unit determiner 820 may determine a residual representative value among residual pixel values of the generated residual block. The coding unit determiner 820 may determine a plurality of residual representative value candidates, and may determine, as the residual representative value, a residual representative value candidate having a small encoding error among the residual representative value candidates.

The output unit 830 outputs, in bitstreams, the image data of the largest coding unit, which is encoded based on the at least one depth determined by the coding unit determiner 820, and information according to depths.

The encoded image data may correspond to a result obtained by encoding residual data of an image.

The split information according to depths may include depth information, partition mode information of the prediction unit, prediction mode information, and the split information of the transformation unit.

Final depth information may be defined by using split information according to depths, which specifies whether encoding is performed on coding units of a lower depth instead of a current depth. If the current depth of the current coding unit is a depth, the current coding unit is encoded by using the coding unit of the current depth, and thus split information of the current depth may be defined not to split the current coding unit to a lower depth. On the contrary, if the current depth of the current coding unit is not the depth, the encoding has to be performed on the coding unit of the lower depth, and thus the split information of the current depth may be defined to split the current coding unit to the coding units of the lower depth.

If the current depth is not the depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one largest coding unit, and at least one piece of split information has to be determined for a coding unit of a depth, at least one piece of split information may be determined for one largest coding unit. Also, a depth of data of the largest coding unit may vary according to locations since the data is hierarchically split according to depths, and thus a depth and split information may be set for the data.

Accordingly, the output unit 830 according to the embodiment may assign encoding information about a corresponding depth and an encoding mode to at least one of the coding unit, the prediction unit, and a minimum unit included in the largest coding unit.

The minimum unit according to an embodiment is a square data unit obtained by splitting the smallest coding unit constituting the lowermost depth by 4. Alternatively, the minimum unit according to an embodiment may be a maximum square data unit that may be included in all of the coding units, prediction units, partition units, and transformation units included in the largest coding unit.

For example, the encoding information output by the output unit 830 may be classified into encoding information according to deeper coding units, and encoding information according to prediction units. The encoding information according to the deeper coding units may include the information about the prediction mode and about the size of the partitions. The encoding information according to the prediction units may include information about an estimated direction during an inter mode, about a reference image index of the inter mode, about a motion vector, about a chroma component of an intra mode, and about an interpolation method during the intra mode.

Information about a maximum size of the coding unit defined according to pictures, slices, or GOPs, and information about a maximum depth may be inserted into a header of a bitstream, a sequence parameter set, or a picture parameter set.

Information about a maximum size of the transformation unit allowed with respect to a current video, and information about a minimum size of the transformation unit may also be output through a header of a bitstream, a sequence parameter set, or a picture parameter set.

The output unit 830 may encode and output reference information, prediction information, and slice type information, which are related to prediction.

The output unit 830 may determine information regarding the prediction mode and a partition mode used to predict the coding unit.

The output unit 830 may determine an SDC flag indicating whether the coding unit is encoded during an SDC mode.

The output unit 830 may determine SDC mode information with respect to a depth image according to whether a coding unit in which the SDC mode is used is present in the depth image.

The output unit 830 may output a bitstream including the residual DC value, prediction mode information, partition mode information, the SDC flag, and the SDC mode information.

According to the simplest embodiment for the video encoding apparatus 800, the deeper coding unit may be a coding unit obtained by dividing a height or width of a coding unit of an upper depth, which is one layer above, by two. That is, when the size of the coding unit of the current depth is 2N×2N, the size of the coding unit of the lower depth is N×N. Also, a current coding unit having a size of 2N×2N may maximally include four lower-depth coding units having a size of N×N.

Accordingly, the video encoding apparatus 800 may form the coding units having the tree structure by determining coding units having an optimum shape and an optimum size for each largest coding unit, based on the size of the largest coding unit and the maximum depth determined considering characteristics of the current picture. Also, since encoding may be performed on each largest coding unit by using any one of various prediction modes and transformations, an optimal encoding mode may be determined by taking into account characteristics of the coding unit of various image sizes.

Thus, if an image having a high resolution or a large data amount is encoded in a conventional macroblock, the number of macroblocks per picture excessively increases. Accordingly, the number of pieces of compressed information generated for each macroblock increases, and thus it is difficult to transmit the compressed information and data compression efficiency decreases. However, by using the video encoding apparatus according to the embodiment, image compression efficiency may be increased since a coding unit is adjusted while considering characteristics of an image while increasing a maximum size of a coding unit while considering a size of the image.

The inter-layer video encoding apparatus including configuration described above with reference to FIG. 1A may include the video encoding apparatuses 800 corresponding to the number of layers so as to encode single layer images in each of the layers of a multilayer video. For example, a first layer encoder may include one video encoding apparatus 800, and a second layer encoder may include the video encoding apparatuses 800 corresponding to the number of second layers.

When the video encoding apparatuses 800 encode first layer images, the coding unit determiner 820 may determine a prediction unit for inter-image prediction according to each of coding units of a tree structure in each largest coding unit, and may perform the inter-image prediction on each prediction unit.

When the video encoding apparatuses 800 encode the second layer images, the coding unit determiner 820 may determine prediction units and coding units of a tree structure in each largest coding unit, and may perform inter-prediction on each of the prediction units.

The video encoding apparatuses 800 may encode a luminance difference so as to compensate for the luminance difference between the first layer image and the second layer image. However, whether to perform luminance compensation may be determined according to an encoding mode of a coding unit. For example, the luminance compensation may be performed only on a prediction unit having a size of 2N×2N.

Figure 9:
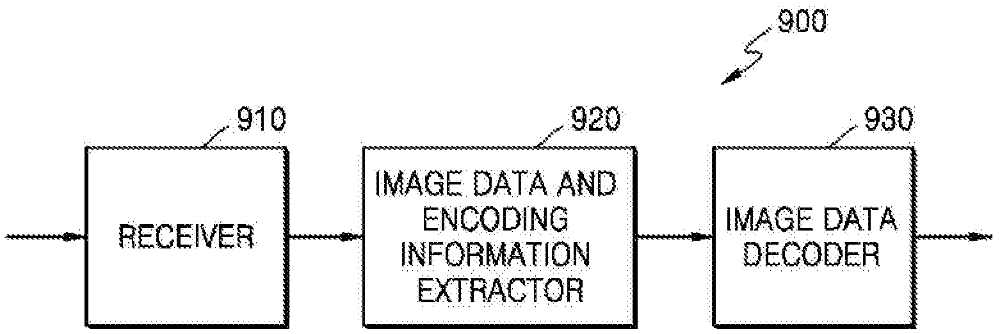
FIG. 9 illustrates a block diagram of a video decoding apparatus based on coding units of a tree structure 900, according to an embodiment.

FIG. 9 illustrates a block diagram of a video decoding apparatus based on coding units of tree structure 900, according to an embodiment.

The video decoding apparatus involving video prediction based on coding units of the tree structure 900 according to the embodiment includes a receiver 910, an image data and encoding information extractor 920, and an image data decoder 930. Hereinafter, for convenience of description, the video decoding apparatus involving video prediction based on coding units of the tree structure 900 according to the embodiment is referred to as the 'video decoding apparatus 900'.

Definitions of various terms, such as a coding unit, a depth, a prediction unit, a transformation unit, and various types of split information for decoding operations of the video decoding apparatus 900 according to the embodiment are identical to those described with reference to FIG. 8 and the video encoding apparatus 800.

The receiver 910 receives and parses a bitstream of an encoded video. The image data and encoding information extractor 920 extracts encoded image data for each coding unit from the parsed bitstream, wherein the coding units have a tree structure according to each largest coding unit, and outputs the extracted image data to the image data decoder 930. The image data and encoding information extractor 920 may extract information about a maximum size of a coding unit of a current picture, from a header about the current picture, a sequence parameter set, or a picture parameter set.

Also, the image data and encoding information extractor 920 extracts, from the parsed bitstream, a final depth and split information about the coding units having a tree structure according to each largest coding unit. The extracted final depth and the extracted split information are output to the image data decoder 930. That is, the image data in a bitstream is split into the largest coding unit so that the image data decoder 930 may decode the image data for each largest coding unit.

A depth and split information according to each of the largest coding units may be set for one or more pieces of depth information, and split information according to depths may include partition mode information of a corresponding coding unit, prediction mode information, and split information of a transformation unit. Also, as the depth information, the split information according to depths may be extracted.

The depth and the split information according to each of the largest coding units extracted by the image data and encoding information extractor 920 are a depth and split information determined to generate a minimum encoding error when an encoder, such as the video encoding apparatus 800, repeatedly performs encoding for each deeper coding unit according to depths according to each largest coding unit. Accordingly, the video decoding apparatus 900 may reconstruct an image by decoding data according to an encoding method that generates the minimum encoding error.

Since encoding information about the depth and the encoding mode may be assigned to a predetermined data unit from among a corresponding coding unit, a prediction unit, and a minimum unit, the image data and encoding information extractor 920 may extract the depth and the split information according to the predetermined data units. If a depth and split information of a corresponding largest coding unit are recorded according to each of the predetermined data units, predetermined data units having the same depth and the split information may be inferred to be the data units included in the same largest coding unit.

The image data and encoding information extractor 920 may obtain SDC mode information and determine whether an SDC mode is allowed in a depth image from the SDC mode information.

The image data and encoding information extractor 920 may obtain information regarding a prediction mode and a partition mode of a coding unit.

The image data and encoding information extractor 920 may obtain an SDC flag with respect to the coding unit when the SDC mode is allowed in the depth image.

The image data and encoding information extractor 920 may obtain a residual DC value with respect to the coding unit when the SDC flag indicates that the SDC mode is applied to the coding unit The image data decoder 930 reconstructs the current picture by decoding the image data in each largest coding unit based on the depth and the split information according to each of the largest coding units. That is, the image data decoder 930 may decode the encoded image data, based on a read partition mode, a prediction mode, and a transformation unit for each coding unit from among the coding units having the tree structure included in each largest coding unit. A decoding process may include a prediction process including intra prediction and motion compensation, and an inverse transformation process.

The image data decoder 930 may perform intra prediction or motion compensation according to a partition and a prediction mode of each coding unit, based on the information about the partition type and the prediction mode of the prediction unit of the coding unit according to depths.

In addition, for inverse transformation for each largest coding unit, the image data decoder 930 may read information about a transformation unit according to a tree structure for each coding unit so as to perform inverse transformation based on transformation units for each coding unit. Due to the inverse transformation, a pixel value of a spatial domain of the coding unit may be reconstructed.

The image data decoder 930 may determine a depth of a current largest coding unit by using split information according to depths. If the split information indicates that image data is no longer split in the current depth, the current depth is a depth. Accordingly, the image data decoder 930 may decode the image data of the current largest coding unit by using the information about the partition mode of the prediction unit, the prediction mode, and the size of the transformation unit for each coding unit corresponding to the current depth.

That is, data units containing the encoding information including the same split information may be gathered by observing the encoding information set assigned for the predetermined data unit from among the coding unit, the prediction unit, and the minimum unit, and the gathered data units may be considered to be one data unit to be decoded by the image data decoder 930 in the same encoding mode. As such, the current coding unit may be decoded by obtaining the information about the encoding mode for each coding unit.

The image data decoder 930 may perform a function of the decoder 250 of FIG. 2A.

The image data decoder 930 may determine prediction values included in a prediction unit of the coding unit according to the prediction mode and the partition mode of the coding unit. The image data decoder 930 may add the residual DC value to each of the prediction values to reconstruct a current block of the coding unit.

The interlayer video decoding apparatus including configuration described above with reference to FIG. 2A may include the video decoding apparatuses 900 corresponding to the number of views, so as to reconstruct first layer images and second layer images by decoding a received first layer imagestream and a received second layer imagestream.

When the first layer imagestream is received, the image data decoder 930 of the video decoding apparatus 900 may split samples of the first layer images, which are extracted from the first layer imagestream by the extractor 920, into coding units according to a tree structure of a largest coding unit. The image data decoder 930 may perform motion compensation, based on prediction units for the inter-image prediction, on each of the coding units according to the tree structure of the samples of the first layer images, and may reconstruct the first layer images.

When the second layer imagestream is received, the image data decoder 930 of the video decoding apparatus 900 may split samples of the second layer images, which are extracted from the second layer imagestream by the extractor 920, into coding units according to a tree structure of a largest coding unit. The image data decoder 930 may perform motion compensation, based on prediction units for the inter-image prediction, on each of the coding units of the samples of the second layer images, and may reconstruct the second layer images.

The extractor 920 may obtain, from a bitstream, information related to a luminance error so as to compensate for a luminance difference between the first layer image and the second layer image. However, whether to perform luminance compensation may be determined according to an encoding mode of a coding unit. For example, the luminance compensation may be performed only on a prediction unit having a size of 2N×2N.

Thus, the video decoding apparatus 900 may obtain information about at least one coding unit that generates the minimum encoding error when encoding is recursively performed for each largest coding unit, and may use the information to decode the current picture. That is, the coding units having the tree structure determined to be the optimum coding units in each largest coding unit may be decoded.

Accordingly, even if an image has high resolution or has an excessively large data amount, the image may be efficiently decoded and reconstructed by using a size of a coding unit and an encoding mode, which are adaptively determined according to characteristics of the image, by using optimal split information received from an encoding terminal.

Figure 10:
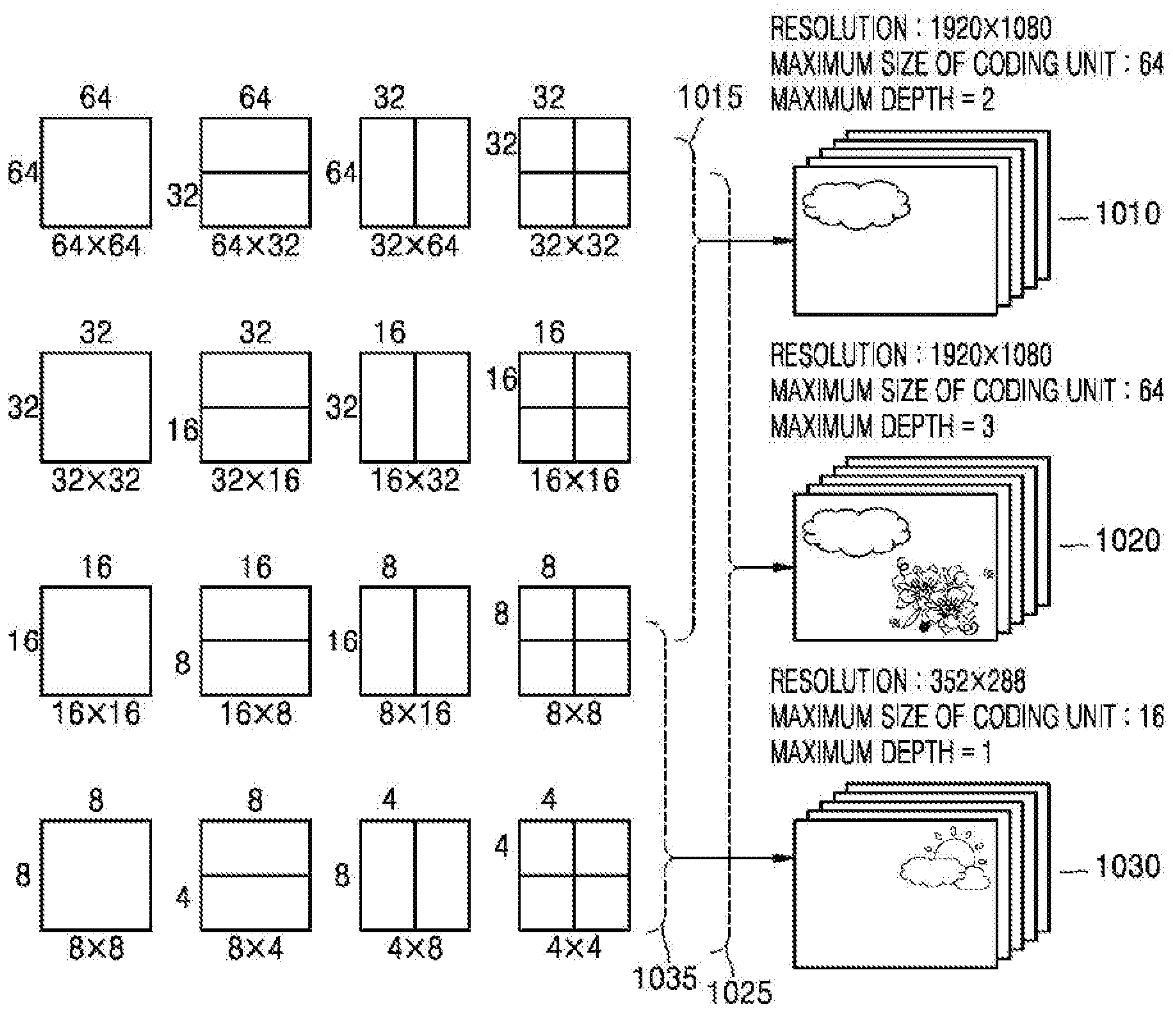
FIG. 10 illustrates a concept of coding units, according to an embodiment.

FIG. 10 illustrates a concept of coding units, according to an embodiment.

A size of a coding unit may be expressed by width×height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 1010, a resolution is 1920×1080, a maximum size of a coding unit is 64, and a maximum depth is 2. In video data 1020, a resolution is 1920×1080, a maximum size of a coding unit is 64, and a maximum depth is 3. In video data 1030, a resolution is 352×288, a maximum size of a coding unit is 16, and a maximum depth is 1. The maximum depth shown in FIG. 10 denotes the total number of splits from a largest coding unit to a smallest coding unit.

If a resolution is high or a data amount is large, it is preferable that a maximum size of a coding unit is large so as to not only increase encoding efficiency but also to accurately reflect characteristics of an image. Accordingly, the maximum size of the coding unit of the video data 1010 and 1020 having a higher resolution than the video data 1030 may be selected to 64.

Since the maximum depth of the video data 1010 is 2, coding units 1015 of the vide data 1010 may include a largest coding unit having a long axis size of 64, and coding units having long axis sizes of 32 and 16 since depths are deepened to two layers by splitting the largest coding unit twice. On the other hand, since the maximum depth of the video data 1030 is 1, coding units 1035 of the video data 1030 may include a largest coding unit having a long axis size of 16, and coding units having a long axis size of 8 since depths are deepened to one layer by splitting the largest coding unit once.

Since the maximum depth of the video data 1020 is 3, coding units 1025 of the video data 1020 may include a largest coding unit having a long axis size of 64, and coding units having long axis sizes of 32, 16, and 8 since the depths are deepened to 3 layers by splitting the largest coding unit three times. As a depth deepens, an expression capability with respect to detailed information may be improved.

Figure 11:
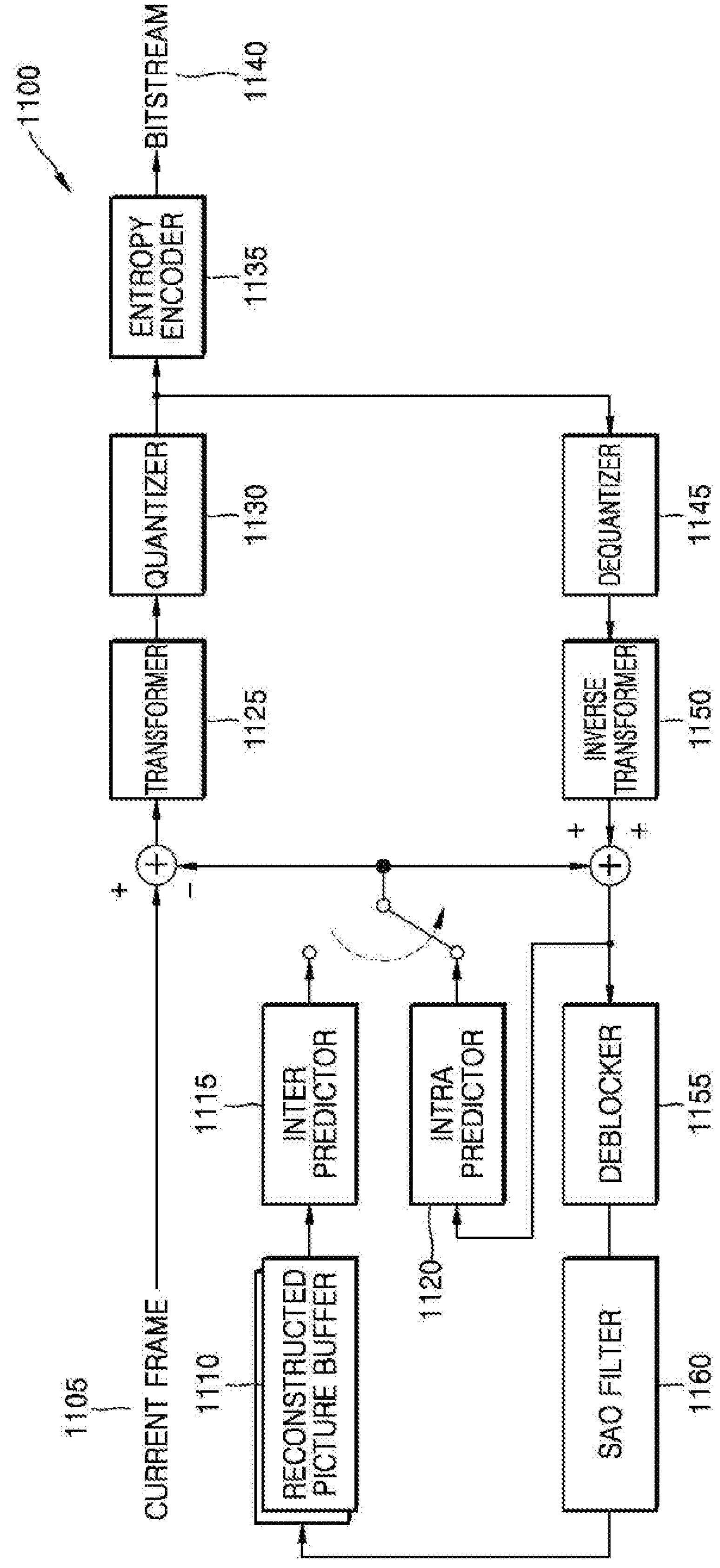
FIG. 11 illustrates a block diagram of a video encoder 1100 based on coding units, according to an embodiment.

FIG. 11 illustrates a block diagram of a video encoder 1100 based on coding units, according to various embodiments.

The video encoder 1100 according to an embodiment performs operations of a picture encoder 1520 of the video encoding apparatus 800 so as to encode image data. That is, an intra predictor 1120 performs intra prediction on coding units in an intra mode, from among a current image 1105, and an inter predictor 1115 performs inter prediction on coding units in an inter mode by using the current image 1105 and a reference image obtained from a reconstructed picture buffer 1110 according to prediction units. The current image 1105 may be split into largest coding units and then the largest coding units may be sequentially encoded. In this regard, the largest coding units that are to be split into coding units having a tree structure may be encoded.

Residue data is generated by removing prediction data regarding a coding unit of each mode which is output from the intra predictor 1120 or the inter predictor 1115 from data regarding an encoded coding unit of the current image 1105, and the residue data is output as a quantized transformation coefficient according to transformation units through a transformer 1125 and a quantizer 1130. The quantized transformation coefficient is reconstructed as the residue data in a spatial domain through an inverse-quantizer 1145 and an inverse-transformer 1150. The reconstructed residual image data in the spatial domain is added to prediction data for the coding unit of each mode which is output from the intra predictor 1120 or the inter predictor 1115 and thus is reconstructed as data in a spatial domain for a coding unit of the current image 1105. The reconstructed data in the spatial domain is generated as a reconstructed image through a deblocker 1155 and an SAO filter 1160 and the reconstructed image is stored in the reconstructed picture buffer 1110. The reconstructed images stored in the reconstructed picture buffer 1110 may be used as reference images for inter predicting another image. The transformation coefficient quantized by the transformer 1125 and the quantizer 1130 may be output as a bitstream 1140 through an entropy encoder 1135.

In order for the video encoder 1100 to be applied in the video encoding apparatus 800, all elements of the video encoder 1100, i.e., the inter predictor 1115, the intra predictor 1120, the transformer 1125, the quantizer 1130, the entropy encoder 1135, the inverse-quantizer 1145, the inverse-transformer 1150, the deblocker 1155, and the SAO filter 1160, may perform operations based on each coding unit among coding units having a tree structure according to each largest coding unit.

In particular, the intra predictor 1120 and the inter predictor 1115 may determine a partition mode and a prediction mode of each coding unit from among the coding units having a tree structure, by taking into account the maximum size and the maximum depth of a current largest coding unit, and the transformer 1125 may determine whether to split a transformation unit according to a quadtree in each coding unit from among the coding units having a tree structure.

Figure 12:
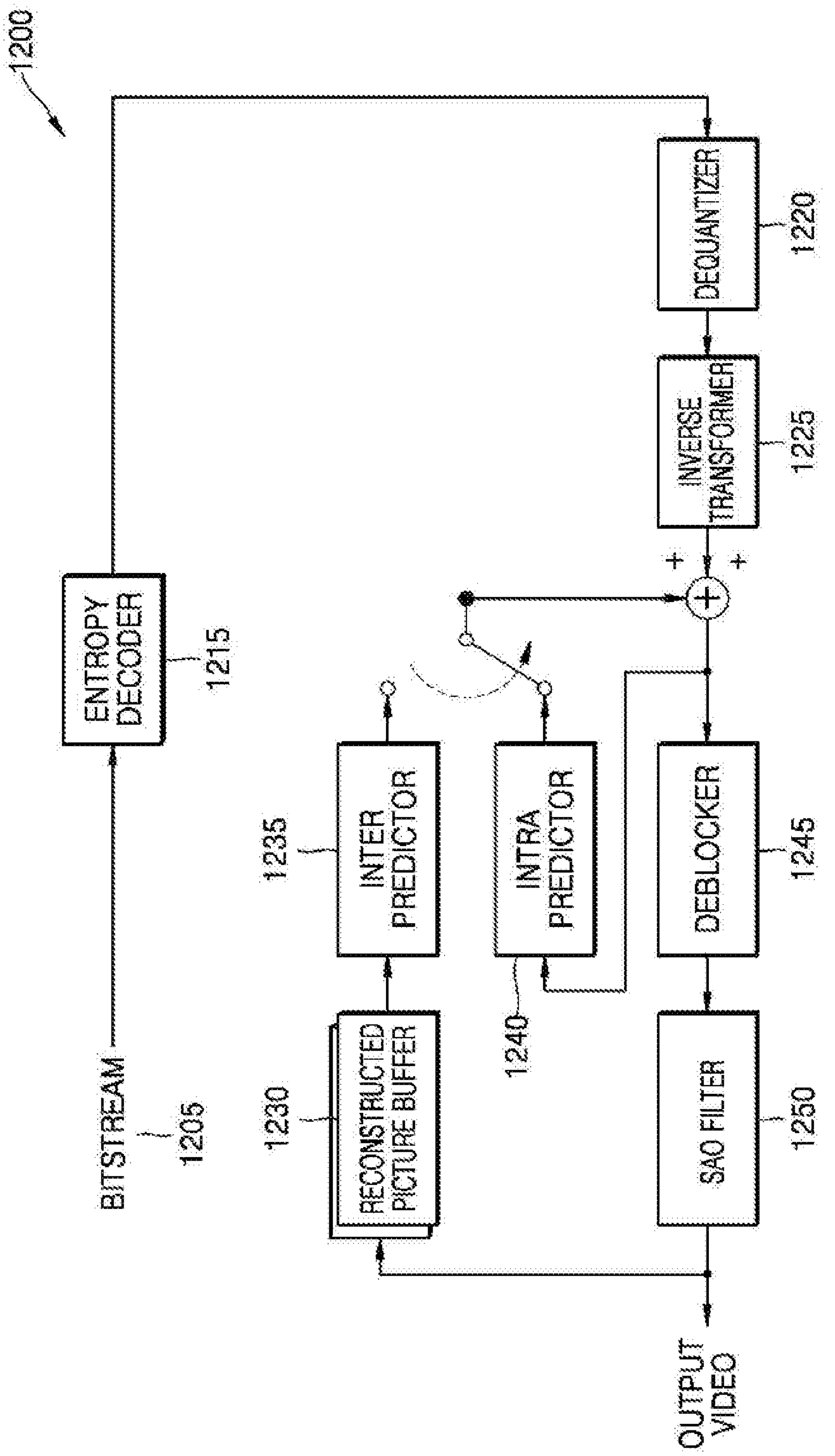
FIG. 12 illustrates a block diagram of a video decoder 1200 based on coding units, according to an embodiment.

FIG. 12 illustrates a block diagram of a video decoder 1200 based on coding units, according to an embodiment.

An entropy decoder 1215 parses, from a bitstream 1205, encoded image data to be decoded and encoding information required for decoding. The encoded image data corresponds to a quantized transformation coefficient, and an inverse-quantizer 1220 and an inverse-transformer 1225 reconstruct residue data from the quantized transformation coefficient.

An intra predictor 1240 performs intra prediction on a coding unit in an intra mode according to prediction units. An inter predictor 1235 performs inter prediction by using a reference image with respect to a coding unit in an inter mode from among a current image, wherein the reference image is obtained by a reconstructed picture buffer 1230 according to prediction units.

Prediction data and residue data regarding coding units of each mode, which passed through the intra predictor 1240 and the inter predictor 1235, are summed, so that data in a spatial domain regarding coding units of the current image 1205 may be reconstructed, and the reconstructed data in the spatial domain may be output as a reconstructed image 1260 through a deblocker 1245 and an SAO filter 1250. Also, reconstructed images stored in the reconstructed picture buffer 30 may be output as reference images.

In order for a picture decoder 930 of the video decoding apparatus 900 to decode the image data, operations after the entropy decoder 1215 of the video decoder 1200 according to an embodiment may be performed.

In order for the video decoder 1200 to be applied in the video decoding apparatus 900 according to an embodiment, all elements of the video decoder 1200, i.e., the entropy decoder 1215, the inverse-quantizer 1220, the inverse-transformer 1225, the intra predictor 1240, the inter predictor 1235, the deblocker 1245, and the SAO filter 1250 may perform operations based on coding units having a tree structure for each largest coding unit.

In particular, the intra predictor 1240 and the inter predictor 1235 may determine a partition mode and a prediction mode of each coding unit from among the coding units according to a tree structure, and the inverse-transformer 1225 may determine % hether or not to split a transformation unit according to a quadtree in each coding unit.

The encoding operation of FIG. 10 and the decoding operation of FIG. 11 are described as a videostream encoding operation and a videostream decoding operation, respectively, in a single layer. Thus, if the video encoding apparatus 10 of FIG. 1A encodes a videostream of two or more layers, the video encoder 1100 may be provided for each layer. Similarly, if the inter-layer decoding apparatus 20 of FIG. 2A decodes a videostream of two or more layers, the video decoder 1200 may be provided for each layer.

Figure 13:
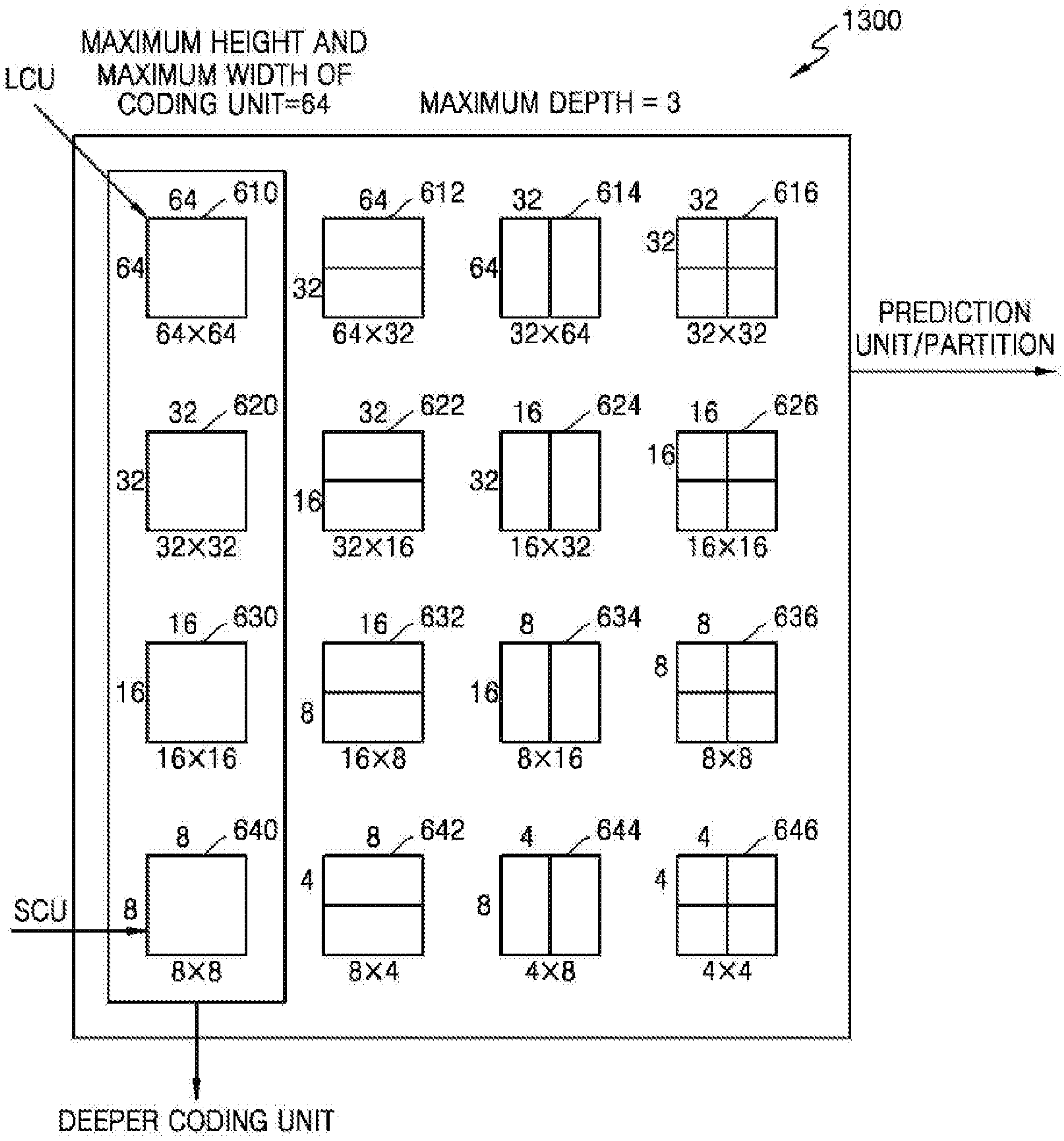
FIG. 13 illustrates deeper coding units according to depths, and partitions, according to an embodiment.

FIG. 13 illustrates deeper coding units according to depths, and partitions, according to an embodiment.

The video encoding apparatus 800 according to an embodiment and the video decoding apparatus 900 according to an embodiment use hierarchical coding units so as to consider characteristics of an image. A maximum height, a maximum width, and a maximum depth of coding units may be adaptively determined according to the characteristics of the image, or may be variously set according to user requirements. Sizes of deeper coding units according to depths may be determined according to the predetermined maximum size of the coding unit.

In a hierarchical structure of coding units 1300 according to an embodiment, the maximum height and the maximum width of the coding units are each 64, and the maximum depth is 3. In this case, the maximum depth represents a total number of times the coding unit is split from the largest coding unit to the smallest coding unit. Since a depth deepens along a vertical axis of the hierarchical structure of coding units 1300, a height and a width of the deeper coding unit are each split. Also, a prediction unit and partitions, which are bases for prediction encoding of each deeper coding unit, are shown along a horizontal axis of the hierarchical structure of coding units 1300.

That is, a coding unit 1310 is a largest coding unit in the hierarchical structure of coding units 1300, wherein a depth is 0 and a size, i.e., a height by width, is 64×64. The depth deepens along the vertical axis, and a coding unit 1320 having a size of 32×32 and a depth of 1, a coding unit 1330 having a size of 16×16 and a depth of 2, and a coding unit 1340 having a size of 8×8 and a depth of 3. The coding unit 1340 having the size of 8×8 and the depth of 3 is a smallest coding unit.

The prediction unit and the partitions of a coding unit are arranged along the horizontal axis according to each depth. That is, if the coding unit 1310 having a size of 64×64 and a depth of 0 is a prediction unit, the prediction unit may be split into partitions include in the coding unit 1310 having the size of 64×64, i.e. a partition 1310 having a size of 64×64, partitions 1312 having the size of 64×32, partitions 1314 having the size of 32×64, or partitions 1316 having the size of 32×32.

Equally, a prediction unit of the coding unit 1320 having the size of 32×32 and the depth of 1 may be split into partitions included in the coding unit 1320 having the size of 32×32, i.e. a partition 1320 having a size of 32×32, partitions 1322 having a size of 32×16, partitions 1324 having a size of 16×32, and partitions 1326 having a size of 16×16.

Equally, a prediction unit of the coding unit 1330 having the size of 16×16 and the depth of 2 may be split into partitions included in the coding unit 1330 having the size of 16×16, i.e. a partition having a size of 16×16 included in the coding unit 1330, partitions 1332 having a size of 16×8, partitions 1334 having a size of 8×16, and partitions 1336 having a size of 8×8.

Equally, a prediction unit of the coding unit 1340 having the size of 8×8 and the depth of 3 may be split into partitions included in the coding unit 1340 having the size of 8×8, i.e. a partition having a size of 8×8 included in the coding unit 1340, partitions 1342 having a size of 8×4, partitions 1344 having a size of 4×8, and partitions 1346 having a size of 4×4.

In order to determine a depth of the largest coding unit 1310, the coding unit determiner 820 of the video encoding apparatus 800 has to perform encoding on coding units respectively corresponding to depths included in the largest coding unit 1310.

The number of deeper coding units according to depths including data in the same range and the same size increases as the depth deepens. For example, four coding units corresponding to a depth of 2 are required to cover data that is included in one coding unit corresponding to a depth of 1. Accordingly, in order to compare results of encoding the same data according to depths, the data has to be encoded by using each of the coding unit corresponding to the depth of 1 and four coding units corresponding to the depth of 2.

In order to perform encoding according to each of the depths, a least encoding error that is a representative encoding error of a corresponding depth may be selected by performing encoding on each of prediction units of the coding units according to depths, along the horizontal axis of the hierarchical structure of coding units 1300. Also, the minimum encoding error may be searched for by comparing representative encoding errors according to depths, by performing encoding for each depth as the depth deepens along the vertical axis of the hierarchical structure of coding units 1300. A depth and a partition generating the minimum encoding error in the largest coding unit 1310 may be selected as a depth and a partition mode of the largest coding unit 1310.

Figure 14:
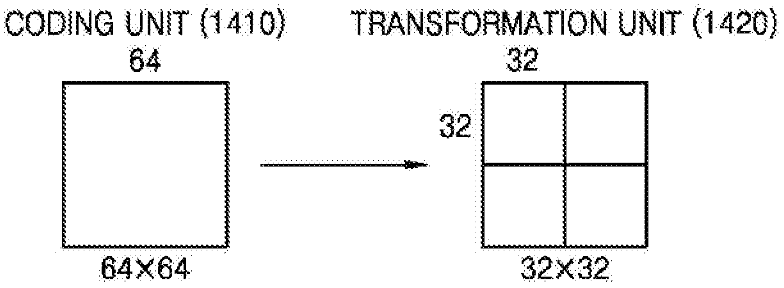
FIG. 14 illustrates a relationship between a coding unit and transformation units, according to an embodiment.

FIG. 14 illustrates a relationship between a coding unit and transformation units, according to an embodiment.

The video encoding apparatus 800 according to an embodiment or the video decoding apparatus 900 according to an embodiment encodes or decodes an image according to coding units having sizes smaller than or equal to a largest coding unit for each largest coding unit.

Sizes of transformation units for transformation during an encoding process may be selected based on data units that are not larger than a corresponding coding unit.

For example, in the video encoding apparatus 800 or the video decoding apparatus 900, when a size of the coding unit 1410 is 64×64, transformation may be performed by using the transformation units 1420 having a size of 32×32.

Also, data of the coding unit 1410 having the size of 64×64 may be encoded by performing the transformation on each of the transformation units having the size of 32×32, 16×16, 8×8, and 4×4, which are smaller than 64×64, and then a transformation unit having the least coding error with respect to an original image may be selected.

Figure 15:
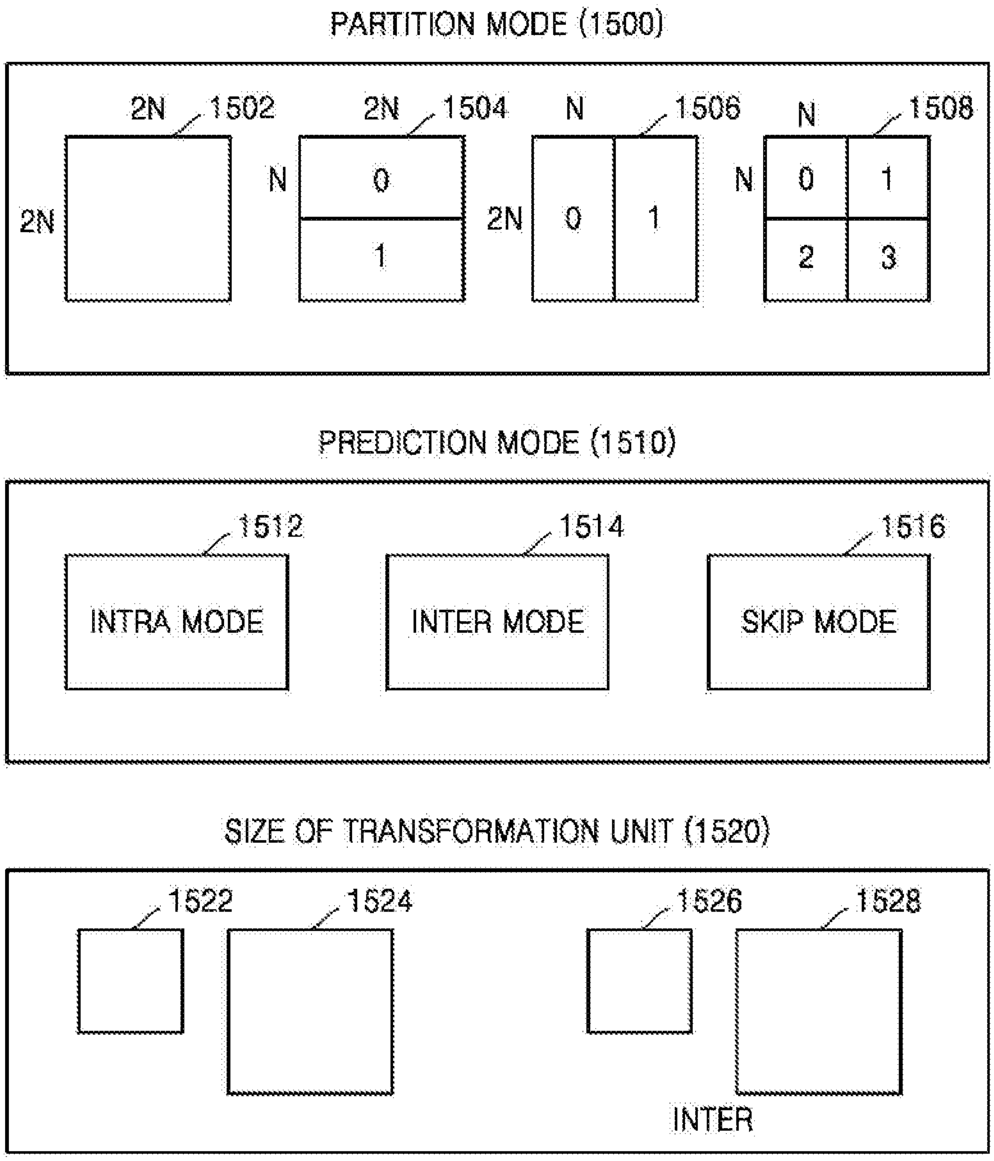
FIG. 15 illustrates a plurality of pieces of encoding information according to depths, according to an embodiment.

FIG. 15 illustrates a plurality of pieces of encoding information, according to an embodiment.

The output unit 830 of the video encoding apparatus 800 according to an embodiment may encode and transmit, as split information, partition mode information 1500, prediction mode information 1510, and transformation unit size information 1520 for each coding unit corresponding to a depth.

The partition mode information 1500 indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 1502 having a size of 2N×2N, a partition 1504 having a size of 2N×N, a partition 1506 having a size of N×2N, and a partition 1508 having a size of N×N. In this case, the partition mode information 1500 about a current coding unit is set to indicate one of the partition 1502 having a size of 2N×2N, the partition 1504 having a size of 2N×N, the partition 1506 having a size of N×2N, and the partition 1508 having a size of N×N.

The prediction mode information 1510 indicates a prediction mode of each partition. For example, the prediction mode information 1510 may indicate a mode of prediction encoding performed on a partition indicated by the partition mode information 1500, i.e., an intra mode 1512, an inter mode 1514, or a skip mode 1516.

The transformation unit size information 1520 represents a transformation unit to be based on when transformation is performed on a current coding unit. For example, the transformation unit may be one of a first intra transformation unit 1522, a second intra transformation unit 1524, a first inter transformation unit 1526, and a second inter transformation unit 1528.

The image data and encoding information extractor 1610 of the video decoding apparatus 900 may extract and use the partition mode information 1500, the prediction mode information 1510, and the transformation unit size information 1520 for decoding, according to each deeper coding unit.

Figure 16:
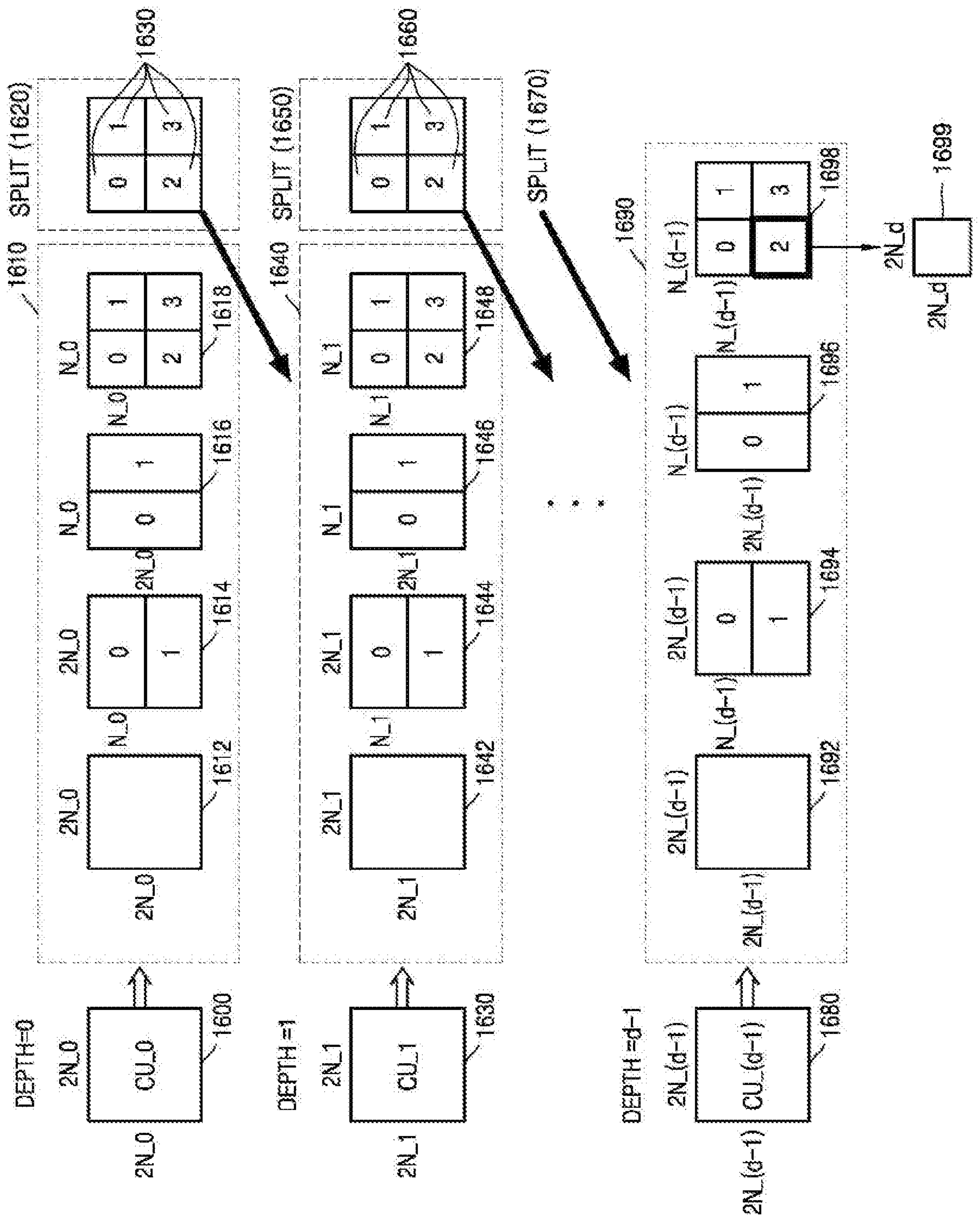
FIG. 16 illustrates deeper coding units according to depths, according to an embodiment.

FIG. 16 illustrates deeper coding units according to depths, according to an embodiment.

Split information may be used to represent a change in a depth. The spilt information specifies whether a coding unit of a current depth is split into coding units of a lower depth.

A prediction unit 1610 for prediction encoding a coding unit 1600 having a depth of 0 and a size of 2N_0×2N_0 may include partitions of a partition mode 1612 having a size of 2N_0×2N_0, a partition mode 1614 having a size of 2N_0×N_0, a partition mode 1616 having a size of N_0×2N_0, and a partition mode 1618 having a size of N_0×N_0. Only the partition modes 1612, 1614, 1616, and 1618 which are obtained by symmetrically splitting the prediction unit are illustrated, but as described above, a partition mode is not limited thereto and may include asymmetrical partitions, partitions having a predetermined shape, and partitions having a geometrical shape.

According to each partition mode, prediction encoding has to be repeatedly performed on one partition having a size of 2N_0×2N_0, two partitions having a size of 2N_0×N_0, two partitions having a size of N_0×2N_0, and four partitions having a size of N_0×N_0. The prediction encoding in an intra mode and an inter mode may be performed on the partitions having the sizes of 2N_0×2N_0, N_0×2N_0, 2N_0×N_0, and N_0×N_0. The prediction encoding in a skip mode may be performed only on the partition having the size of 2N_0×2N_0.

If an encoding error is smallest in one of the partition modes 1612, 1614, and 1616 having the sizes of 2N_0×2N_0, 2N_0×N_0 and N_0×2N_0, the prediction unit 1610 may not be split into a lower depth.

If the encoding error is the smallest in the partition mode 1618 having the size of N_0×N_0, a depth is changed from 0 to 1 and split is performed (operation 1620), and encoding may be repeatedly performed on coding units 1630 of a partition mode having a depth of 2 and a size of N_0×N_0 so as to search for a minimum encoding error.

A prediction unit 1630 for prediction encoding the coding unit 1630 having a depth of 1 and a size of 2N_1×2N_1 (=N_0×N_0) may include a partition mode 1642 having a size of 2N_1×2N_1, a partition mode 1644 having a size of 2N_1×N_1, a partition mode 1646 having a size of N_1×2N_1, and a partition mode 1648 having a size of N_1×N_1.

If an encoding error is the smallest in the partition mode 1648 having the size of N_1×N_1, a depth is changed from 1 to 2 and split is performed (in operation 1650), and encoding is repeatedly performed on coding units 1660 having a depth of 2 and a size of N_2×N_2 so as to search for a minimum encoding error.

When a maximum depth is d, deeper coding units according to depths may be set until when a depth corresponds to d−1, and split information may be set until when a depth corresponds to d−2. That is, when encoding is performed up to when the depth is d−1 after a coding unit corresponding to a depth of d−2 is split (in operation 1670), a prediction unit 1690 for prediction encoding a coding unit 1680 having a depth of d−1 and a size of 2N_(d−1)×2N_(d−1) may include partitions of a partition mode 1692 having a size of 2N_(d−1)×2N_(d−1), a partition mode 1694 having a size of 2N_(d−1)×N_(d−1), a partition mode 1696 having a size of N_(d−1)×2N (d−1), and a partition mode 1698 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition modes so as to search for a partition mode generating a minimum encoding error.

Even when the partition type 1698 having the size of N_(d−1)×N_(d−1) has the minimum encoding error, since a maximum depth is d, a coding unit CU_(d−1) having a depth of d−1 is no longer split into a lower depth, and a depth for the coding units constituting a current largest coding unit 1600 is determined to be d−1 and a partition mode of the current largest coding unit 1600 may be determined to be N_(d−1)×N_(d−1). Also, since the maximum depth is d, split information for a coding unit 1652 corresponding to a depth of d−1 is not set.

A data unit 1699 may be a ‘minimum unit’ for the current largest coding unit. A minimum unit according to the embodiment may be a square data unit obtained by splitting a smallest coding unit having a lowermost depth by 4. By performing the encoding repeatedly, the video encoding apparatus 800 according to the embodiment may select a depth having the least encoding error by comparing encoding errors according to depths of the coding unit 1600 to determine a depth, and set a corresponding partition type and a prediction mode as an encoding mode of the depth.

As such, the minimum encoding errors according to depths are compared in all of the depths of 0, 1, . . . , d−1, d, and a depth having the least encoding error may be determined as a depth. The depth, the partition mode of the prediction unit, and the prediction mode may be encoded and transmitted as split information. Also, since a coding unit has to be split from a depth of 0 to a depth, only split information of the depth is set to ‘0’, and split information of depths excluding the depth is set to ‘1’.

The image data and encoding information extractor 920 of the video decoding apparatus 900 according to the embodiment may extract and use a depth and prediction unit information about the coding unit 1600 so as to decode the coding unit 1612. The video decoding apparatus 900 according to the embodiment may determine a depth, in which split information is ‘0’, as a depth by using split information according to depths, and may use, for decoding, split information about the corresponding depth.

Figure 17:
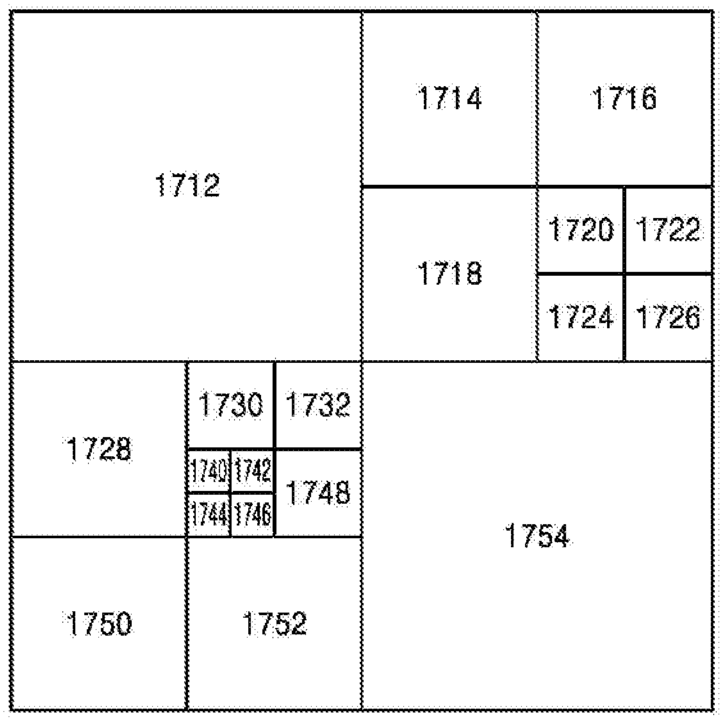
FIGS. 17, 18, and 19 illustrate a relationship between coding units, prediction units, and transformation units, according to an embodiment.
Figure 18:
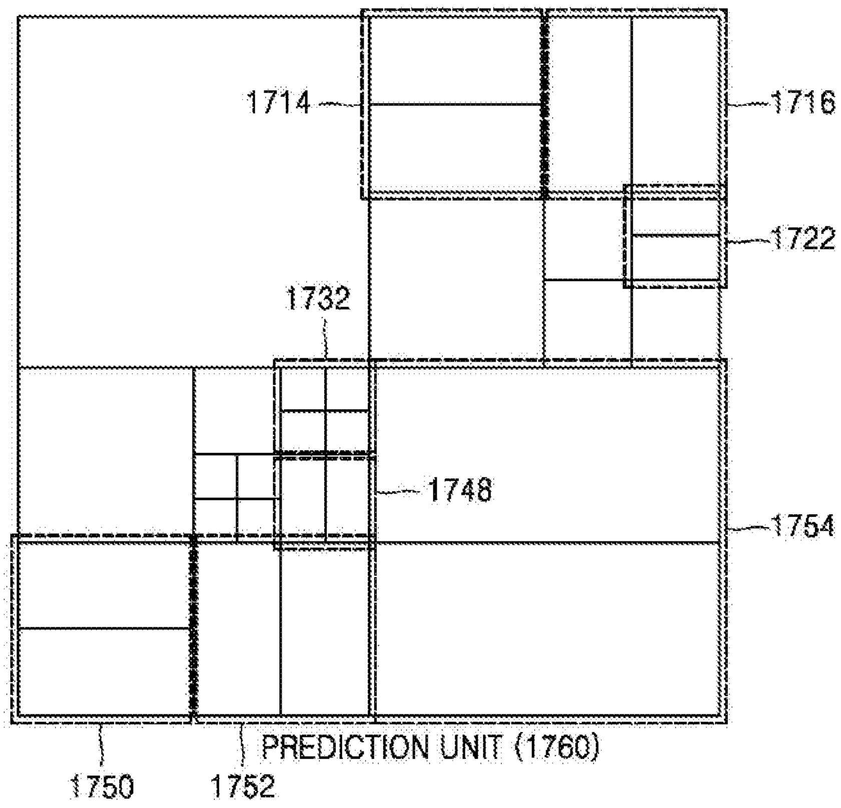
Figure 19:
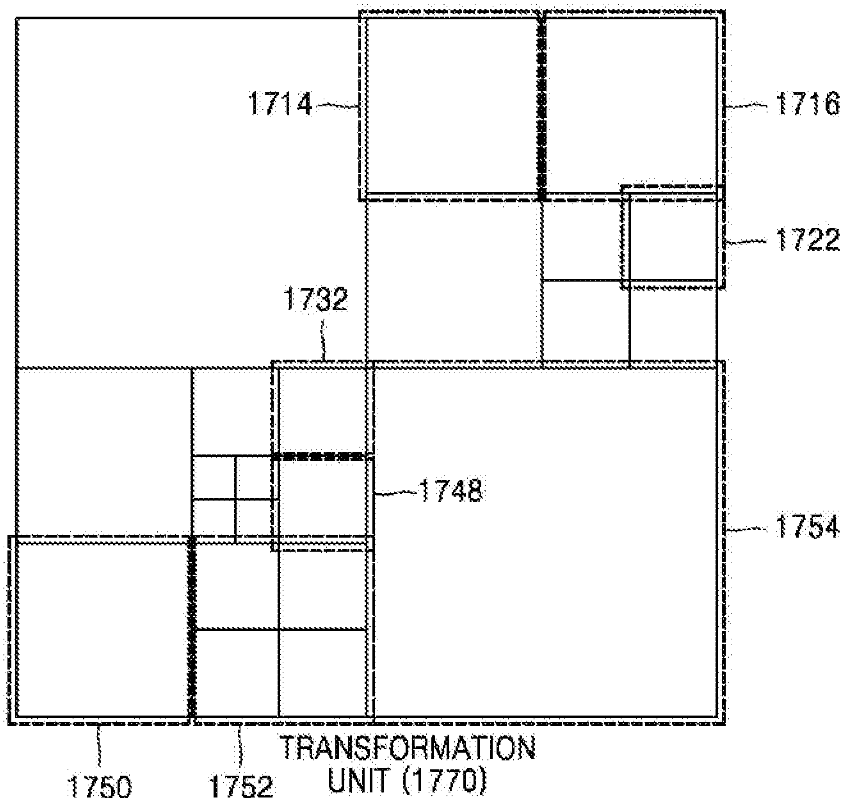

FIGS. 17, 18, and 19 illustrate a relationship between coding units, prediction units, and transformation units, according to an embodiment.

Coding units 1710 are deeper coding units according to depths determined by the video encoding apparatus 800, in a largest coding unit. Prediction units 1760 are partitions of prediction units of each of the coding units 1710 according to depths, and transformation units 1770 are transformation units of each of the coding units according to depths.

When a depth of a largest coding unit is 0 in the deeper coding units 1710, depths of coding units 1712 and 1054 are 1, depths of coding units 1714, 1716, 1718, 1728, 1750, and 1752 are 2, depths of coding units 1720, 1722, 1724, 1726, 1730, 1732, and 1748 are 3, and depths of coding units 1740, 1742, 1744, and 1746 are 4.

Some partitions 1714, 1716, 1722, 1732, 1748, 1750, 1752, and 1754 from among the prediction units 1760 are obtained by splitting the coding unit. That is, partitions 1714, 1722, 1750, and 1754 are a partition mode having a size of 2N×N, partitions 1716, 1748, and 1752 are a partition mode having a size of N×2N, and a partition 1732 is a partition mode having a size of N×N. Prediction units and partitions of the deeper coding units 1710 are smaller than or equal to each coding unit.

Transformation or inverse transformation is performed on image data of the coding unit 1752 in the transformation units 1770 in a data unit that is smaller than the coding unit 1752. Also, the coding units 1714, 1716, 1722, 1732, 1748, 1750, 1752, and 1754 in the transformation units 1760 are data units different from those in the prediction units 1760 in terms of sizes and shapes. That is, the video encoding apparatus 800 and the video decoding apparatus 900 according to the embodiments may perform intra prediction/motion estimation/motion compensation/and transformation/inverse transformation on an individual data unit in the same coding unit.

Accordingly, encoding is recursively performed on each of coding units having a hierarchical structure in each region of a largest coding unit so as to determine an optimum coding unit, and thus coding units according to a recursive tree structure may be obtained.

Encoding information may include split information about a coding unit, partition mode information, prediction mode information, and transformation unit size information. Table 1 below shows the encoding information that may be set by the video encoding apparatus 800 and the video decoding apparatus 900 according to the embodiments.

The partition mode information may indicate symmetrical partition modes having sizes of 2N×2N, 2N×N, N×2N, and N×N, which are obtained by symmetrically splitting a height or a width of a prediction unit, and asymmetrical partition modes having sizes of 2N×nU, 2N×nD, nL×2N, and nR×2N, which are obtained by asymmetrically splitting the height or width of the prediction unit. The asymmetrical partition modes having the sizes of 2N×nU and 2N×nD may be respectively obtained by splitting the height of the prediction unit in 1:3 and 3:1, and the asymmetrical partition modes having the sizes of nL×2N and nR×2N may be respectively obtained by splitting the width of the prediction unit in 1:3 and 3:1.

The size of the transformation unit may be set to be two types in the intra mode and two types in the inter mode. That is, if split information of the transformation unit is 0, the size of the transformation unit may be 2N×2N, which is the size of the current coding unit. If split information of the transformation unit is 1, the transformation units may be obtained by splitting the current coding unit. Also, if a partition mode of the current coding unit having the size of 2N×2N is a symmetrical partition mode, a size of a transformation unit may be N×N, and if the partition mode of the current coding unit is an asymmetrical partition mode, the size of the transformation unit may be N/2×N/2.

The encoding information about coding units having a tree structure according to the embodiment may be assigned to at least one of a coding unit corresponding to a depth, a

TABLE 1

| Split Information 0 (Encoding on Coding unit having Size of 2N × 2N and Current Depth of d) | | | | | Split Information 1 |
|---|---|---|---|---|---|
| Prediction Mode | Partition Type | | Size of Transform Unit | | Repeatedly Encode Coding Units having Lower Depth of d + 1 |
| Intra Inter Skip (Only 2N × 2N) | Symmetrical Partition Type | Asymmetrical Partition Type | Split Information 0 of Transform Unit | Split Information 1 of Transform Unit | |
| | 2N × 2N<br>2N × N<br>N × 2N<br>N × N | 2N × nU<br>2N × nD<br>nL × 2N<br>nR × 2N | 2N × 2N | N × N (Symmetrical Type)<br>N/2 × N/2 (Asymmetrical Type) | |

The output unit 830 of the video encoding apparatus 800 according to the embodiment may output the encoding information about the coding units having a tree structure, and the image data and encoding information extractor 920 of the video decoding apparatus 900 according to the embodiment may extract the encoding information about the coding units having a tree structure from a received bitstream.

Split information specifies whether a current coding unit is split into coding units of a lower depth. If split information of a current depth d is 0, a depth, in which a current coding unit is no longer split into a lower depth, is a depth, and thus partition mode information, prediction mode information, and transformation unit size information may be defined for the depth. If the current coding unit has to be further split according to the split information, encoding has to be independently performed on each of four split coding units of a lower depth.

A prediction mode may be one of an intra mode, an inter mode, and a skip mode. The intra mode and the inter mode may be defined in all partition modes, and the skip mode is defined only in a partition mode having a size of 2N×2N.

prediction unit, and a minimum unit. The coding unit corresponding to the depth may include at least one of a prediction unit and a minimum unit containing the same encoding information.

Accordingly, it is determined whether adjacent data units are included in the same coding unit corresponding to the depth by comparing encoding information of the adjacent data units. Also, a corresponding coding unit corresponding to a depth is determined by using encoding information of a data unit, and thus a distribution of depths in a largest coding unit may be inferred.

Accordingly, if a current coding unit is predicted based on encoding information of adjacent data units, encoding information of data units in deeper coding units adjacent to the current coding unit may be directly referred to and used.

In another embodiment, if a current coding unit is predicted based on encoding information of adjacent data units, data units adjacent to the current coding unit may be searched by using encoded information of the data units, and the searched adjacent coding units may be referred for predicting the current coding unit.

Figure 20:
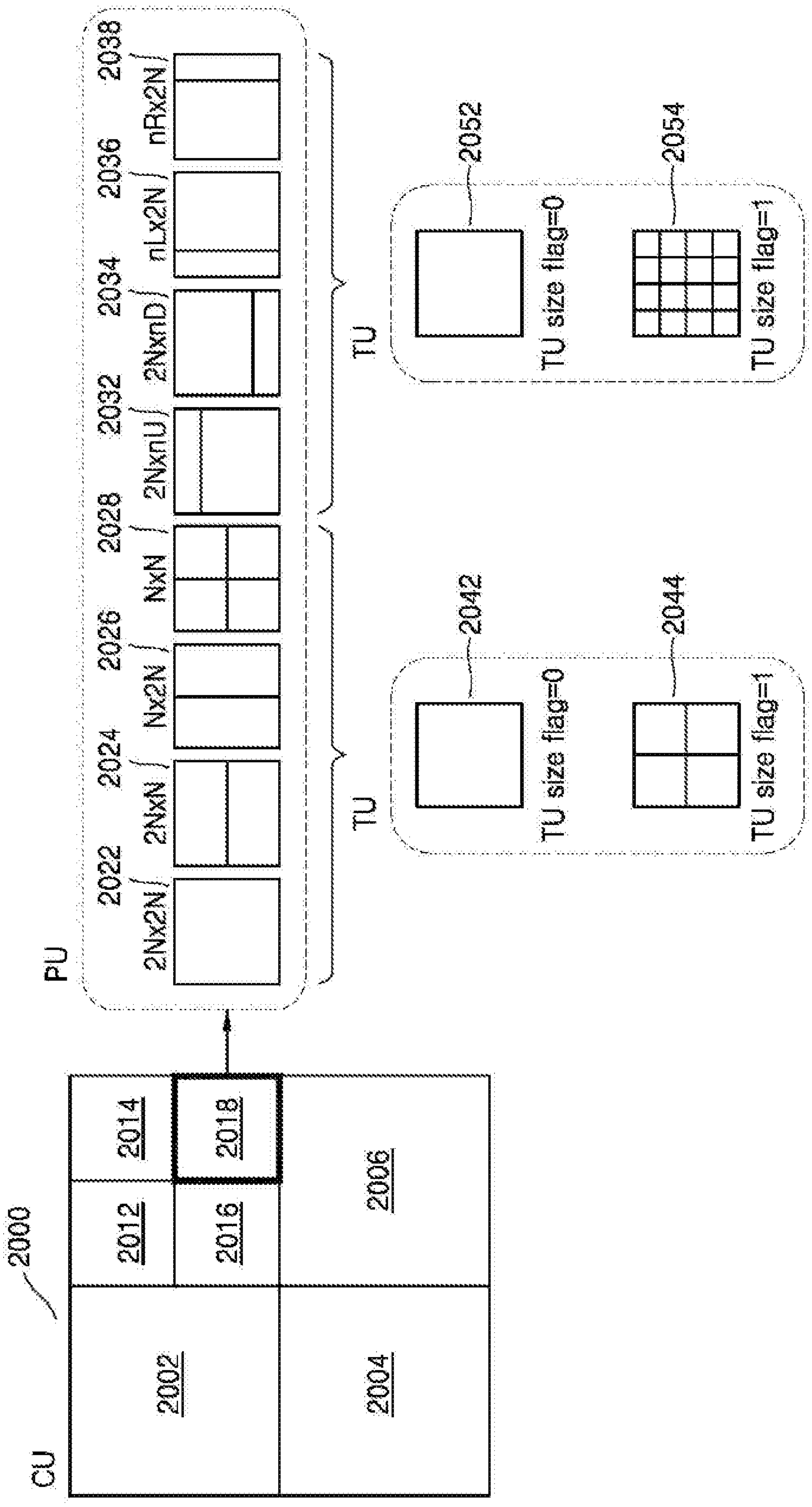
FIG. 20 illustrates a relationship between a coding unit, a prediction unit, and a transformation unit, according to encoding mode information of Table 1.

FIG. 20 illustrates a relationship between a coding unit, a prediction unit, and a transformation unit, according to encoding mode information of Table 1.

A largest coding unit 2000 includes coding units 2002, 2004, 2006, 2012, 2014, 2016, and 2018 of depths. Here, since the coding unit 2018 is a coding unit of a depth, split information may be set to 0. Partition mode information of the coding unit 2018 having a size of 2N×2N may be set to be one of partition modes including 2N×2N 2022, 2N×N 2024, N×2N 2026, N×N 2028, 2N×nU 2032, 2N×nD 2034, nL×2N 2036, and nR×2N 2038.

Transformation unit split information (TU size flag) is a type of a transformation index, and a size of a transformation unit corresponding to the transformation index may be changed according to a prediction unit type or partition mode of the coding unit.

For example, when the partition mode information is set to be one of symmetrical partition modes 2N×2N 2022, 2N×N 2024, N×2N 2026, and N×N 2028, if the transformation unit split information is 0, a transformation unit 2042 having a size of 2N×2N is set, and if the transformation unit split information is 1, a transformation unit 2044 having a size of N×N may be set.

When the partition mode information is set to be one of asymmetrical partition modes 2N×nU 2032, 2N×nD 2034, nL×2N 2036, and nR×2N 2038, if the transformation unit split information (TU size flag) is 0, a transformation unit 2052 having a size of 2N×2N may be set, and if the transformation unit split information is 1, a transformation unit 2054 having a size of N/2×N/2 may be set.

The transformation unit split information (TU size flag) described above with reference to FIG. 19 is a flag having a value or 0 or 1, but the transformation unit split information according to an embodiment is not limited to a flag having 1 bit, and the transformation unit may be hierarchically split while the transformation unit split information increases in a manner of 0, 1, 2, 3 . . . etc., according to setting. The transformation unit split information may be an example of the transformation index.

In this case, the size of a transformation unit that has been actually used may be expressed by using the transformation unit split information according to the embodiment, together with a maximum size of the transformation unit and a minimum size of the transformation unit. The video encoding apparatus 800 according to the embodiment may encode maximum transformation unit size information, minimum transformation unit size information, and maximum transformation unit split information. The result of encoding the maximum transformation unit size information, the minimum transformation unit size information, and the maximum transformation unit split information may be inserted into an SPS. The video decoding apparatus 900 according to the embodiment may decode video by using the maximum transformation unit size information, the minimum transformation unit size information, and the maximum transformation unit split information.

For example, (a) if the size of a current coding unit is 64×64 and a maximum transformation unit size is 32×32, (a-1) then the size of a transformation unit may be 32×32 when a TU size flag is 0, (a-2) may be 16×16 when the TU size flag is 1, and (a-3) may be 8×8 when the TU size flag is 2.

As another example, (b) if the size of the current coding unit is 32×32 and a minimum transformation unit size is 32×32, (b-1) then the size of the transformation unit may be 32×32 when the TU size flag is 0. Here, the TU size flag cannot be set to a value other than 0, since the size of the transformation unit cannot be smaller than 32×32.

As another example, (c) if the size of the current coding unit is 64×64 and a maximum TU size flag is 1, then the TU size flag may be 0 or 1. Here, the TU size flag cannot be set to a value other than 0 or 1.

Thus, if it is defined that the maximum TU size flag is 'MaxTransformSizeIndex', a minimum transformation unit size is 'MinTransformSize', and a transformation unit size is 'RootTuSize' when the TU size flag is 0, then a current minimum transformation unit size 'CurrMinTuSize' that can be determined in a current coding unit may be defined by Equation (1):

$$\text{CurrMinTuSize}=\max(\text{MinTransformSize},\text{RootTuSize}/(2^{\wedge}\text{MaxTransformSizeIndex})) \quad (1)$$

Compared to the current minimum transformation unit size 'CurrMinTuSize' that can be determined in the current coding unit, a transformation unit size 'RootTuSize' when the TU size flag is 0 may denote a maximum transformation unit size that can be selected in the system. That is, in Equation (1), 'RootTuSize/(2^MaxTransformSizeIndex)' denotes a transformation unit size when the transformation unit size 'RootTuSize', when the TU size flag is 0, is split by the number of times corresponding to the maximum TU size flag, and 'MinTransformSize' denotes a minimum transformation size. Thus, a smaller value from among 'RootTuSize/(2^MaxTransformSizeIndex)' and'MinTransformSize' may be the current minimum transformation unit size 'CurrMinTuSize' that can be determined in the current coding unit.

According to an embodiment, the maximum transformation unit size RootTuSize may vary according to the type of a prediction mode.

For example, if a current prediction mode is an inter mode, then 'RootTuSize' may be determined by using Equation (2) below. In Equation (2), 'MaxTransformSize' denotes a maximum transformation unit size, and 'PUSize' denotes a current prediction unit size.

$$\text{RootTuSize}=\min(\text{MaxTransformSize},\text{PUSize}) \quad (2)$$

That is, if the current prediction mode is the inter mode, the transformation unit size 'RootTuSize', when the TU size flag is 0, may be a smaller value from among the maximum transformation unit size and the current prediction unit size.

If a prediction mode of a current partition unit is an intra mode, 'RootTuSize' may be determined by using Equation (3) below. In Equation (3), 'PartitionSize' denotes the size of the current partition unit.

$$\text{RootTuSize}=\min(\text{MaxTransformSize},\text{PartitionSize}) \quad (3)$$

That is, if the current prediction mode is the intra mode, the transformation unit size 'RootTuSize' when the TU size flag is 0 may be a smaller value from among the maximum transformation unit size and the size of the current partition unit.

However, the current maximum transformation unit size 'RootTuSize' that varies according to the type of a prediction mode in a partition unit is just an embodiment, and a factor for determining the current maximum transformation unit size is not limited thereto.

According to the video encoding method based on coding units of a tree structure described above with reference to FIGS. 8 through 20, image data of a spatial domain is encoded in each of the coding units of the tree structure, and the image data of the spatial domain is reconstructed in a manner that decoding is performed on each largest coding unit according to the video decoding method based on the coding units of the tree structure, so that a video that is formed of pictures and picture sequences may be reconstructed. The reconstructed video may be reproduced by a reproducing apparatus, may be stored in a storage medium, or may be transmitted via a network.

The embodiments of the present disclosure may be written as computer programs and may be implemented in general-use digital computers that execute the programs by using a computer-readable recording medium. Examples of the computer-readable recording medium include magnetic storage media (e.g., ROM, floppy disks, hard disks, etc.), optical recording media (e.g., CD-ROMs, or DVDs), etc.

For convenience of description, the video encoding methods and/or the video encoding method, which are described with reference to FIGS. 1A through 20, will be collectively referred to as 'the video encoding method of the present disclosure'. Also, the video decoding methods and/or the video decoding method, which are described with reference to FIGS. 1A through 20, will be collectively referred to as 'the video decoding method of the present disclosure'.

Also, a video encoding apparatus including the video encoding apparatus, the video encoding apparatus 800 or the video encoder 1100 which are described with reference to FIGS. 1A through 20 will be collectively referred to as a 'video encoding apparatus of the present disclosure'. Also, a video decoding apparatus including the inter-layer video decoding apparatus, the video decoding apparatus 900, or the video decoder 1200 which are described with reference to FIGS. 1A through 20 will be collectively referred to as a 'video decoding apparatus of the present disclosure'.

A computer-readable recording medium such as a disc 21000 that stores the programs according to an embodiment will now be described in detail.

Figure 21:
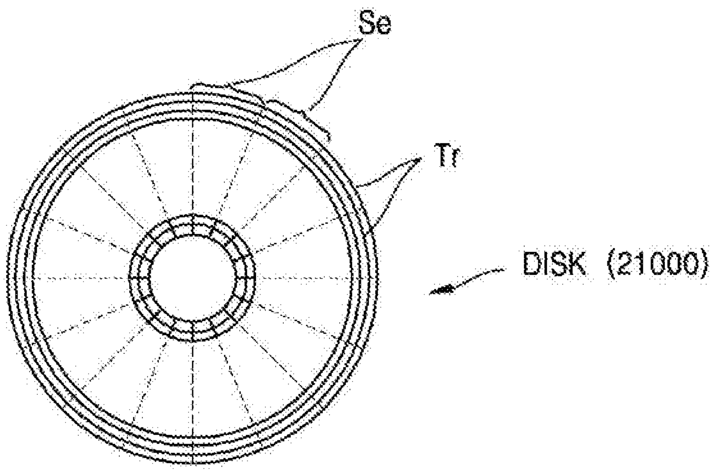
FIG. 21 illustrates a physical structure of a disc 26000 in which a program is stored, according to an embodiment.

FIG. 21 illustrates a physical structure of the disc 21000 in which a program is stored, according to an embodiment. The disc 21000, as a storage medium, may be a hard drive, a compact disc-read only memory (CD-ROM) disc, a Blu-ray disc, or a digital versatile disc (DVD). The disc 21000 includes a plurality of concentric tracks Tr that are each divided into a specific number of sectors Se in a circumferential direction of the disc 21000. In a specific region of the disc 21000, a program that executes the quantized parameter determining method, the video encoding method, and the video decoding method described above may be assigned and stored.

A computer system embodied using a storage medium that stores a program for executing the video encoding method and the video decoding method as described above will now be described with reference to FIG. 22.

Figure 22:
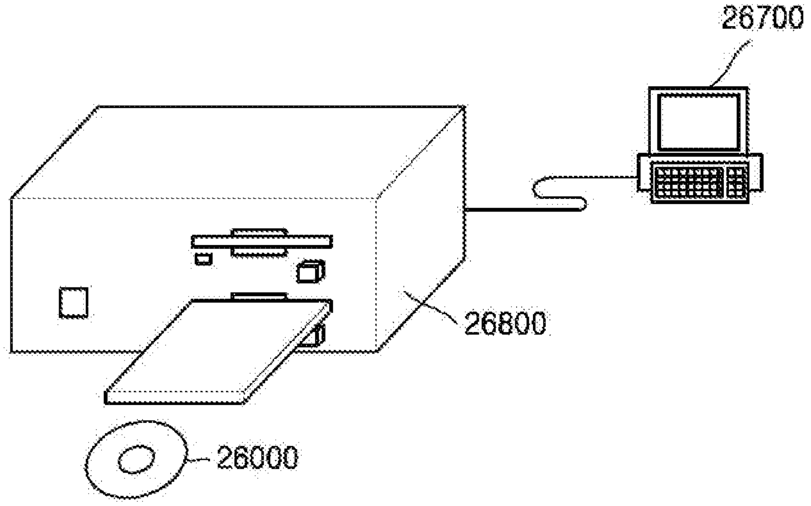
FIG. 22 illustrates a disc drive 26800 for recording and reading a program by using the disc 26000.

FIG. 22 illustrates a disc drive 26800 for recording and reading a program by using the disc 26000. A computer system 26700 may store a program that executes at least one of the video encoding method and the video decoding method of the present disclosure, in the disc 26000 via the disc drive 26800. In order to run the program stored in the disc 26000 in the computer system 26700, the program may be read from the disc 26000 and may be transmitted to the computer system 26700 by using the disc drive 26800.

The program that executes at least one of the video encoding method and the video decoding method of the present disclosure may be stored not only in the disc 26000 illustrated in FIGS. 21 and 22 but may also be stored in a memory card, a ROM cassette, or a solid state drive (SSD).

A system to which the video encoding method and the video decoding method according to the embodiments described above are applied will be described below.

Figure 23:
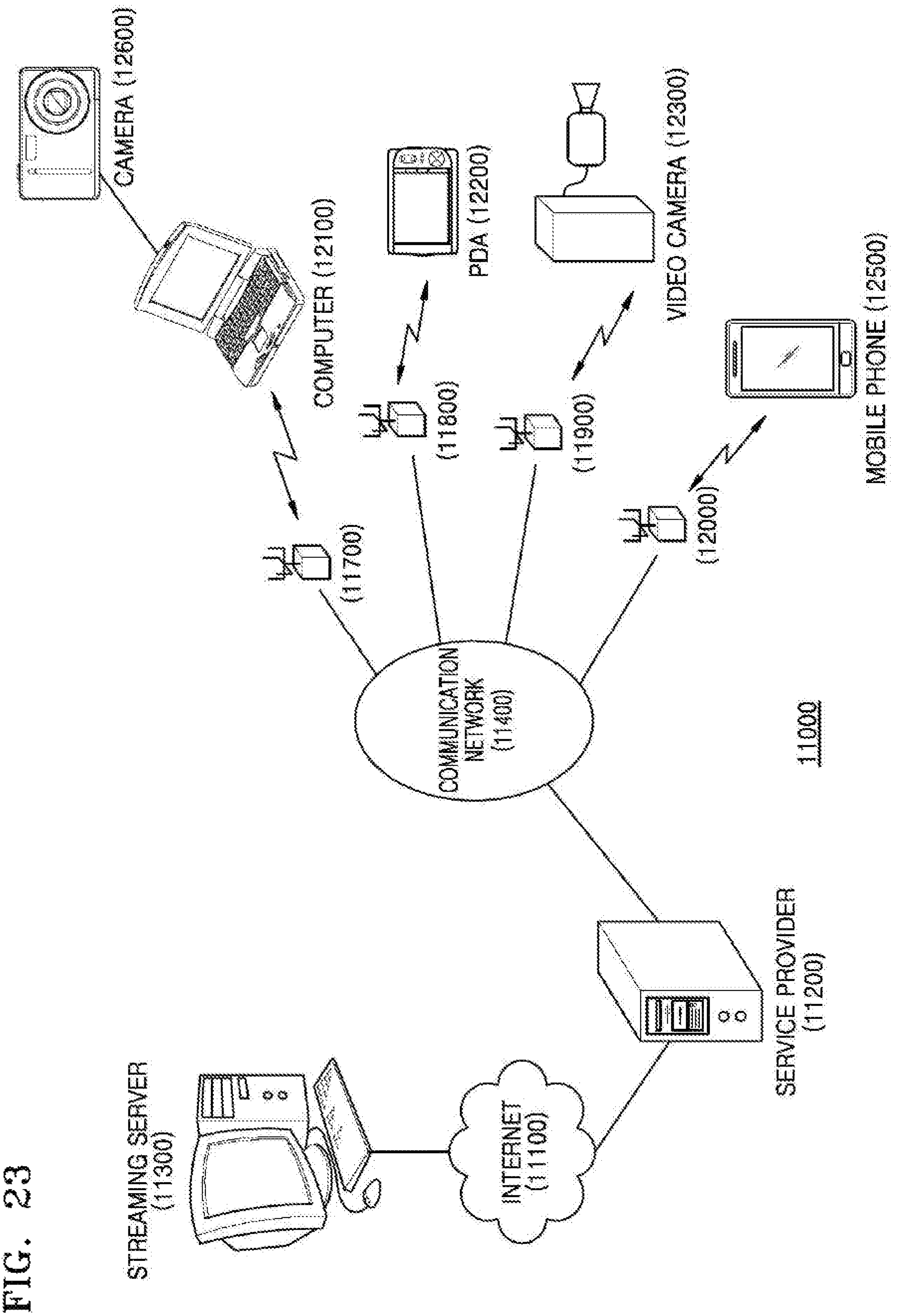
FIG. 23 illustrates an overall structure of a content supply system 11000 for providing a content distribution service.

FIG. 23 illustrates an overall structure of a content supply system 11000 for providing a content distribution service. A service area of a communication system is divided into predetermined-sized cells, and wireless base stations 11700, 11800, 11900, and 12000 are installed in these cells, respectively.

The content supply system 11000 includes a plurality of independent devices. For example, the plurality of independent devices, such as a computer 12100, a personal digital assistant (PDA) 12200, a video camera 12300, and a mobile phone 12500, are connected to the Internet 11100 via an internet service provider 11200, a communication network 11400, and the wireless base stations 11700, 11800, 11900, and 12000.

However, the content supply system 11000 is not limited to as illustrated in FIG. 23, and devices may be selectively connected thereto. The plurality of independent devices may be directly connected to the communication network 11400, not via the wireless base stations 11700, 11800, 11900, and 12000.

The video camera 12300 is an imaging device, e.g., a digital video camera, which is capable of capturing video images. The mobile phone 12500 may employ at least one communication method from among various protocols, e.g., Personal Digital Communications (PDC), Code Division Multiple Access (CDMA), Wideband-Code Division Multiple Access (W-CDMA), Global System for Mobile Communications (GSM), and Personal Handyphone System (PHS).

The video camera 12300 may be connected to a streaming server 11300 via the wireless base station 11900 and the communication network 11400. The streaming server 11300 allows content received from a user via the video camera 12300 to be streamed via a real-time broadcast. The content received from the video camera 12300 may be encoded by the video camera 12300 or the streaming server 11300. Video data captured by the video camera 12300 may be transmitted to the streaming server 11300 via the computer 12100.

Video data captured by a camera 12600 may also be transmitted to the streaming server 11300 via the computer 12100. The camera 12600 is an imaging device capable of capturing both still images and video images, similar to a digital camera. The video data captured by the camera 12600 may be encoded using the camera 12600 or the computer 12100. Software that performs encoding and decoding video may be stored in a computer-readable recording medium, e.g., a CD-ROM disc, a floppy disc, a hard disc drive, an SSD, or a memory card, which may be accessed by the computer 12100.

If video data is captured by a camera built in the mobile phone 12500, the video data may be received from the mobile phone 12500.

The video data may, be encoded by a large scale integrated circuit (LSI) system installed in the video camera 12300, the mobile phone 12500, or the camera 12600.

The content supply system 11000 may encode content data recorded by a user using the video camera 12300, the camera 12600, the mobile phone 12500, or another imaging device, e.g., content recorded during a concert, and may transmit the encoded content data to the streaming server 11300. The streaming server 11300 may transmit the encoded content data in a type of a streaming content to other clients that request the content data.

The clients are devices capable of decoding the encoded content data, e.g., the computer 12100, the PDA 12200, the video camera 12300, or the mobile phone 12500. Thus, the content supply system 11000 allows the clients to receive and reproduce the encoded content data. Also, the content supply system 11000 allows the clients to receive the encoded content data and decode and reproduce the encoded content data in real time, thereby enabling personal broadcasting.

Encoding and decoding operations of the plurality of independent devices included in the content supply system 11000 may be similar to those of the video encoding apparatus and the video decoding apparatus of the present disclosure.

Figure 24:
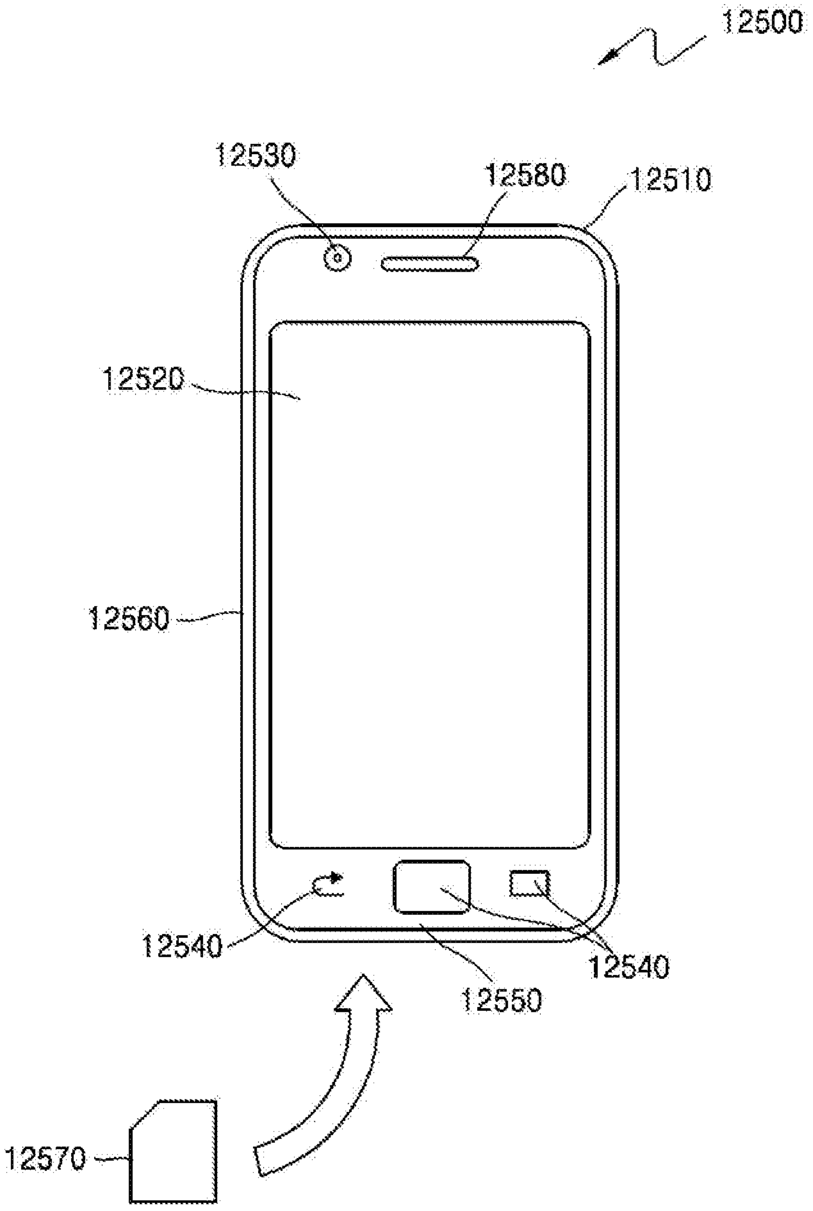
FIG. 24 illustrates an external structure of a mobile phone 12500 to which a video encoding method and a video decoding method of the present disclosure are applied, according to an embodiment.
Figure 25:
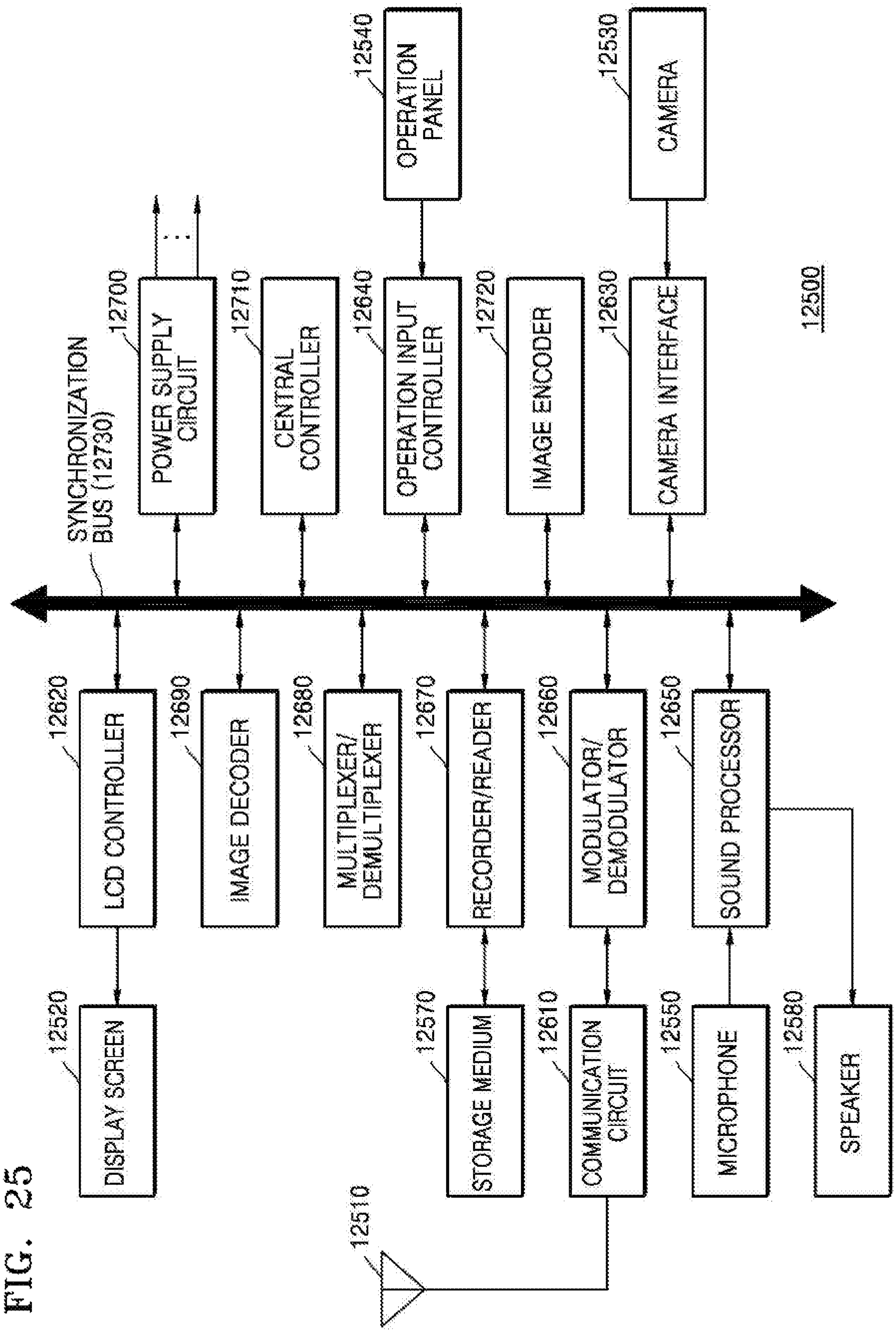
FIG. 25 illustrates an internal structure of the mobile phone 12500.

With reference to FIGS. 24 and 25, the mobile phone 12500 included in the content supply system 11000 according to an embodiment will now be described in detail.

FIG. 24 illustrates an external structure of the mobile phone 12500 to which a video encoding method and a video decoding method are applied, according to an embodiment. The mobile phone 12500 may be a smart phone, the functions of which are not limited and a large number of the functions of which may be changed or expanded.

The mobile phone 12500 includes an internal antenna 12510 via which a radio-frequency (RF) signal may be exchanged with the wireless base station 12000, and includes a display screen 12520 for displaying images captured by a camera 12530 or images that are received via the antenna 12510 and decoded, e.g., a liquid crystal display (LCD) or an organic light-emitting diode (OLED) screen. The mobile phone 12500 includes an operation panel 12540 including a control button and a touch panel. If the display screen 12520 is a touch screen, the operation panel 12540 further includes a touch sensing panel of the display screen 12520. The mobile phone 12500 includes a speaker 12580 for outputting voice and sound or another type of a sound output unit, and a microphone 12550 for inputting voice and sound or another type of a sound input unit. The mobile phone 12500 further includes the camera 12530, such as a charge-coupled device (CCD) camera, to capture video and still images. The mobile phone 12500 may further include a storage medium 12570 for storing encoded/decoded data, e.g., video or still images captured by the camera 12530, received via email, or obtained according to various ways; and a slot 12560 via which the storage medium 12570 is loaded into the mobile phone 12500. The storage medium 12570 may be a flash memory, e.g., a secure digital (SD) card or an electrically erasable and programmable read only memory (EEPROM) included in a plastic case.

FIG. 25 illustrates an internal structure of the mobile phone 12500. In order to systemically control parts of the mobile phone 12500 including the display screen 12520 and the operation panel 12540, a power supply circuit 12700, an operation input controller 12640, an image encoder 12720, a camera interface 12630, an LCD controller 12620, an image decoder 12690, a multiplexer/demultiplexer 12680, a recording/reading unit 12670, a modulation/demodulation unit 12660, and a sound processor 12650 are connected to a central controller 12710 via a synchronization bus 12730.

If a user operates a power button and sets from a ‘power off’ state to a ‘power on’ state, the power supply circuit 12700 supplies power to all the parts of the mobile phone 12500 from a battery pack, thereby setting the mobile phone 12500 to an operation mode.

The central controller 12710 includes a CPU, a read-only memory (ROM), and a random access memory (RAM).

While the mobile phone 12500 transmits communication data to the outside, a digital signal is generated by the mobile phone 12500 under control of the central controller 12710. For example, the sound processor 12650 may generate a digital sound signal, the video encoder 12720 may generate a digital image signal, and text data of a message may be generated via the operation panel 12540 and the operation input controller 12640. When a digital signal is transmitted to the modulation/demodulation unit 12660 by control of the central controller 12710, the modulation/demodulation unit 12660 modulates a frequency band of the digital signal, and a communication circuit 12610 performs digital-to-analog conversion (DAC) and frequency conversion on the frequency band-modulated digital sound signal. A transmission signal output from the communication circuit 12610 may be transmitted to a voice communication base station or the wireless base station 12000 via the antenna 12510.

For example, when the mobile phone 12500 is in a conversation mode, a sound signal obtained via the microphone 12550 is transformed into a digital sound signal by the sound processor 12650, by control of the central controller 12710. The digital sound signal may be transformed into a transformation signal via the modulation/demodulation unit 12660 and the communication circuit 12610, and may be transmitted via the antenna 12510.

When a text message, e.g., email, is transmitted during a data communication mode, text data of the text message is input via the operation panel 12540 and is transmitted to the central controller 12610 via the operation input controller 12640. By control of the central controller 12610, the text data is transformed into a transmission signal via the modulation/demodulation unit 12660 and the communication circuit 12610 and is transmitted to the wireless base station 12000 via the antenna 12510.

In order to transmit image data during the data communication mode, image data captured by the camera 12530 is provided to the image encoder 12720 via the camera interface 12630. The captured image data may be directly displayed on the display screen 12520 via the camera interface 12630 and the LCD controller 12620.

A structure of the image encoder 12720 may correspond to that of the video encoding apparatus 100 described above. The image encoder 12720 may transform the image data received from the camera 12530 into compressed and encoded image data according to the aforementioned video encoding method, and then output the encoded image data to the multiplexer/demultiplexer 12680. During a recording operation of the camera 12530, a sound signal obtained by the microphone 12550 of the mobile phone 12500 may be transformed into digital sound data via the sound processor 12650, and the digital sound data may be transmitted to the multiplexer/demultiplexer 12680.

The multiplexer/demultiplexer 12680 multiplexes the encoded image data received from the image encoder 12720, together with the sound data received from the sound processor 12650. A result of multiplexing the data may be transformed into a transmission signal via the modulation/demodulation unit 12660 and the communication circuit 12610, and may then be transmitted via the antenna 12510.

While the mobile phone 12500 receives communication data from the outside, frequency recovery and analog-to-digital conversion (ADC) are performed on a signal received via the antenna 12510 to transform the signal into a digital signal. The modulation/demodulation unit 12660 modulates a frequency band of the digital signal. The frequency-band modulated digital signal is transmitted to the video decoder 12690, the sound processor 12650, or the LCD controller 12620, according to the type of the digital signal.

During the conversation mode, the mobile phone 12500 amplifies a signal received via the antenna 12510, and obtains a digital sound signal by performing frequency conversion and ADC on the amplified signal. A received digital sound signal is transformed into an analog sound signal via the modulation/demodulation unit 12660 and the sound processor 12650, and the analog sound signal is output via the speaker 12580, by control of the central controller 12710.

When during the data communication mode, data of a video file accessed at an Internet website is received, a signal received from the wireless base station 12000 via the antenna 12510 is output as multiplexed data via the modulation/demodulation unit 12660, and the multiplexed data is transmitted to the multiplexer/demultiplexer 12680.

In order to decode the multiplexed data received via the antenna 12510, the multiplexer/demultiplexer 12680 demultiplexes the multiplexed data into an encoded video data stream and an encoded audio data stream. Via the synchronization bus 12730, the encoded video data stream and the encoded audio data stream are provided to the video decoder 12690 and the sound processor 12650, respectively.

A structure of the image decoder 12690 may correspond to that of the video decoding apparatus described above. The image decoder 12690 may decode the encoded video data to obtain reconstructed video data and provide the reconstructed video data to the display screen 12520 via the LCD controller 12620, by using the aforementioned video decoding method of the present disclosure.

Thus, the data of the video file accessed at the Internet website may be displayed on the display screen 12520. At the same time, the sound processor 12650 may transform audio data into an analog sound signal, and provide the analog sound signal to the speaker 12580. Thus, audio data contained in the video file accessed at the Internet website may also be reproduced via the speaker 12580.

The mobile phone 12500 or another type of communication terminal may be a transceiving terminal including both the video encoding apparatus and the video decoding apparatus of the present invention, may be a transmitting terminal including only the video encoding apparatus of the present invention, or may be a receiving terminal including only the video decoding apparatus of the present invention.

A communication system according to an embodiment is not limited to the communication system described above with reference to FIG. 23. For example, FIG. 26 illustrates a digital broadcasting system employing a communication system, according to an embodiment.

Figure 26:
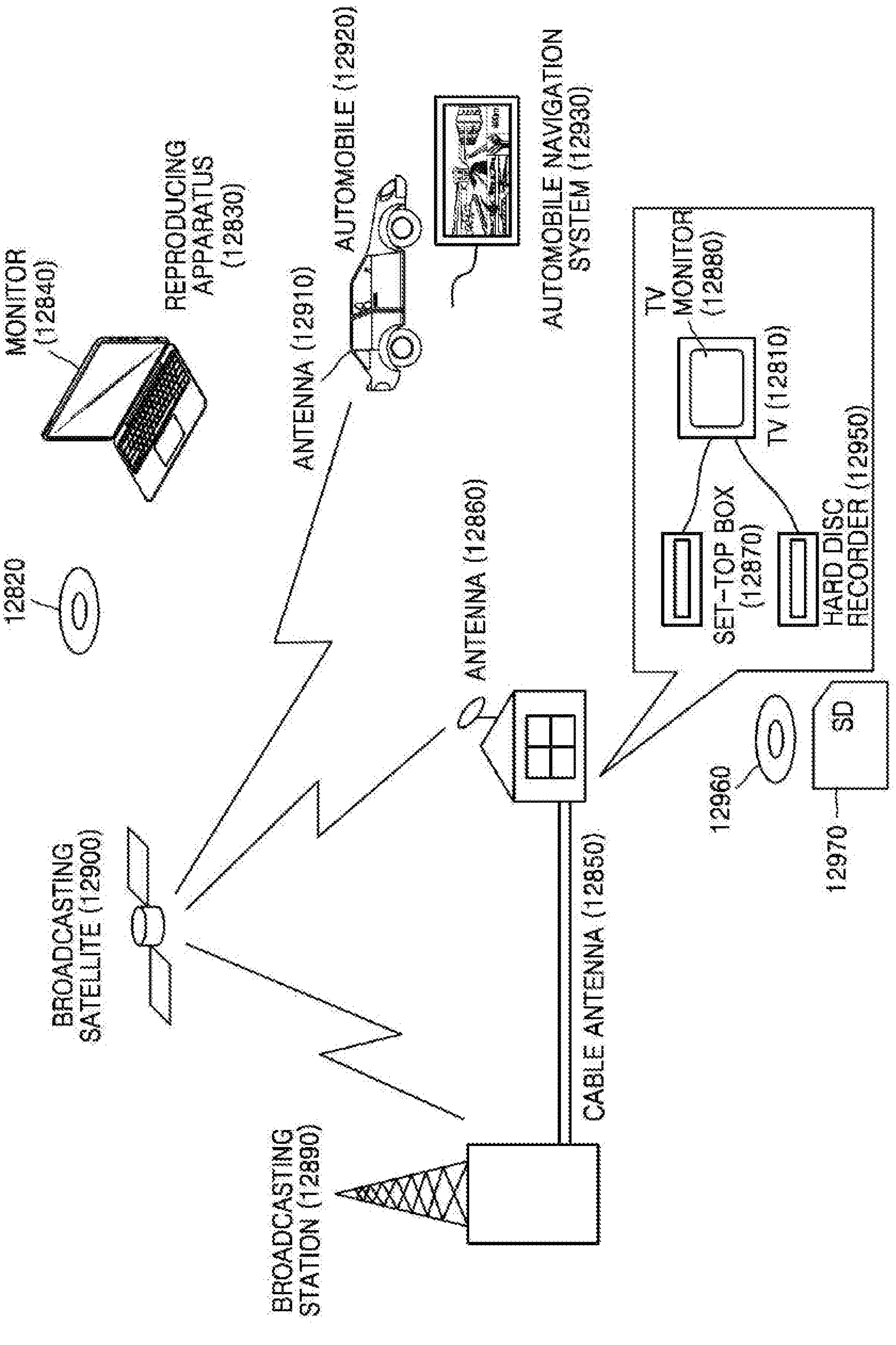
FIG. 26 illustrates a digital broadcasting system employing a communication system, according to an embodiment.

The digital broadcasting system of FIG. 26 may receive a digital broadcast transmitted via a satellite or a terrestrial network by using the video encoding apparatus and the video decoding apparatus according to the embodiments.

In more detail, a broadcasting station 12890 transmits a video data stream to a communication satellite or a broadcasting satellite 12900 by using radio waves. The broadcasting satellite 12900 transmits a broadcast signal, and the broadcast signal is transmitted to a satellite broadcast receiver via a household antenna 12860. In every house, an encoded video stream may be decoded and reproduced by a TV receiver 12810, a set-top box 12870, or another device.

When the video decoding apparatus of the present disclosure is implemented in a reproducing apparatus 12830, the reproducing apparatus 12830 may parse and decode an encoded video stream recorded on a storage medium 12820, such as a disc or a memory card to reconstruct digital signals. Thus, the reconstructed video signal may be reproduced, for example, on a monitor 12840.

In the set-top box 12870 connected to the antenna 12860 for a satellite/terrestrial broadcast or a cable antenna 12850 for receiving a cable television (TV) broadcast, the video decoding apparatus of the present disclosure may be installed. Data output from the set-top box 12870 may also be reproduced on a TV monitor 12880.

As another example, the video decoding apparatus of the present disclosure may be installed in the TV receiver 12810 instead of the set-top box 12870.

An automobile 12920 that has an appropriate antenna 12910 may receive a signal transmitted from the satellite 12900 or the wireless base station 11700. A decoded video may be reproduced on a display screen of an automobile navigation system 12930 installed in the automobile 12920.

A video signal may be encoded by the video encoding apparatus of the present disclosure and may then be recorded to and stored in a storage medium. In more detail, an image signal may be stored in a DVD disc 12960 by a DVD recorder or may be stored in a hard disc by a hard disc recorder 12950. As another example, the video signal may be stored in an SD card 12970. If the hard disc recorder 12950 includes the video decoding apparatus according to the exemplary embodiment, a video signal recorded on the DVD disc 12960, the SD card 12970, or another storage medium may be reproduced on the TV monitor 12880.

The automobile navigation system 12930 may not include the camera 12530, the camera interface 12630, and the video encoder 12720 of FIG. 26. For example, the computer 12100 and the TV receiver 12810 may not include the camera 12530, the camera interface 12630, and the video encoder 12720 of FIG. 26.

Figure 27:
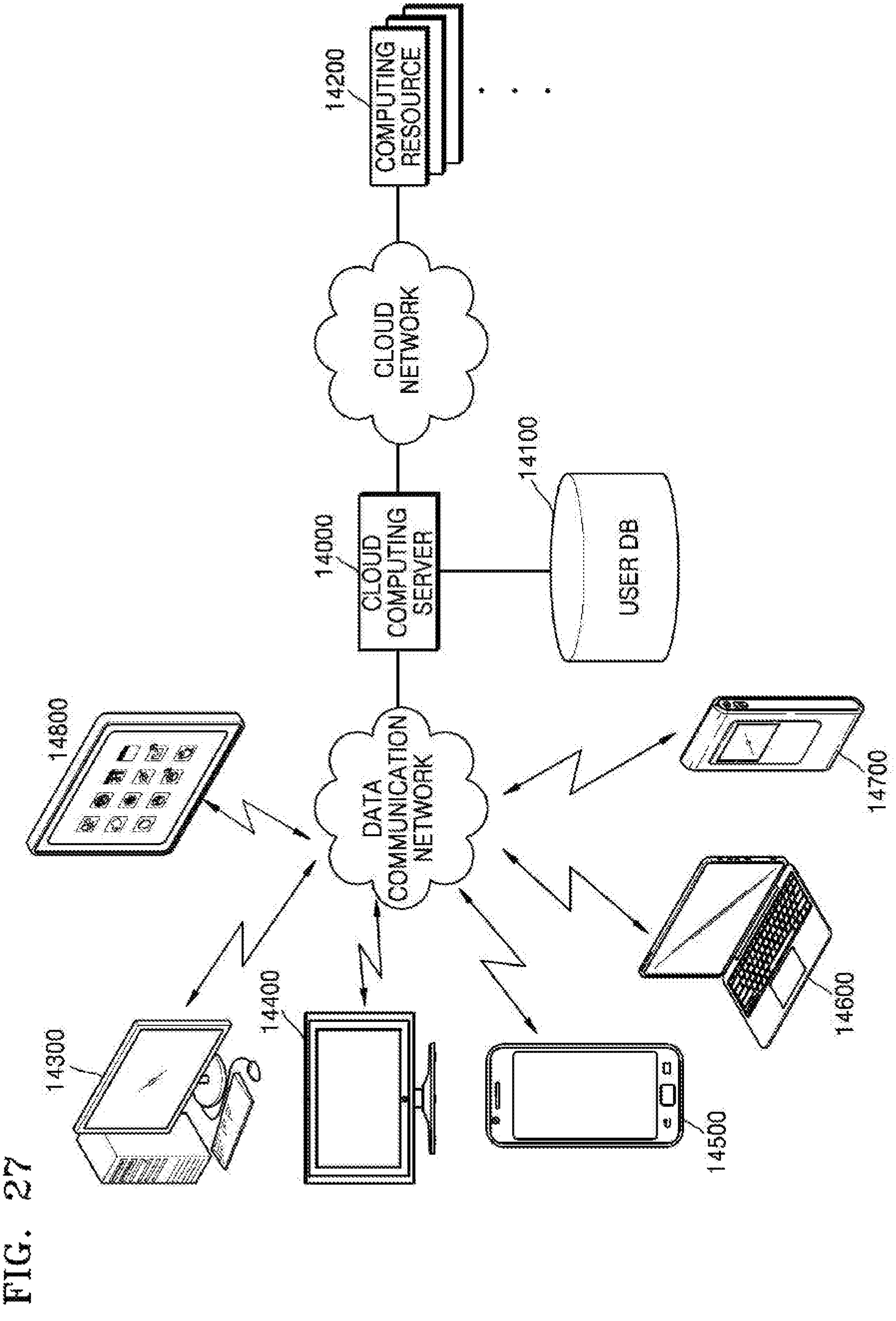
FIG. 27 illustrates a network structure of a cloud computing system using a video encoding apparatus and a video decoding apparatus, according to an embodiment.

FIG. 27 illustrates a network structure of a cloud computing system using a video encoding apparatus and a video decoding apparatus, according to an embodiment.

The cloud computing system may include a cloud computing server 14100, a user database (DB) 14100, a plurality of computing resources 14200, and a user terminal.

The cloud computing system provides an on-demand outsourcing service of the plurality of computing resources 14200 via a data communication network, e.g., the Internet, in response to a request from the user terminal. Under a cloud computing environment, a service provider provides users with desired services by combining computing resources at data centers located at physically different locations by using virtualization technology. A service user does not have to install computing resources, e.g., an application, a storage, an operating system (OS), and security software, into his/her own terminal in order to use them, but may select and use desired services from among services in a virtual space generated through the virtualization technology, at a desired point in time.

A user terminal of a specified service user is connected to the cloud computing server 14000 via a data communication network including the Internet and a mobile telecommunication network. User terminals may be provided cloud computing services, and particularly video reproduction services, from the cloud computing server 14000. The user terminals may be various types of electronic devices capable of being connected to the Internet, e.g., a desktop PC 14300, a smart TV 14400, a smart phone 14500, a notebook computer 14600, a portable multimedia player (PMP) 14700, a tablet PC 14800, and the like.

The cloud computing server 14100 may combine the plurality of computing resources 14200 distributed in a cloud network and provide user terminals with a result of combining. The plurality of computing resources 14200 may include various data services, and may include data uploaded from user terminals. As described above, the cloud computing server 14100 may provide user terminals with desired services by combining video database distributed in different regions according to the virtualization technology.

User information about users who have subscribed for a cloud computing service is stored in the user DB 14100. The user information may include logging information, addresses, names, and personal credit information of the users. The user information may further include indexes of videos. Here, the indexes may include a list of videos that have already been reproduced, a list of videos that are being reproduced, a pausing point of a video that was being reproduced, and the like.

Information about a video stored in the user DB 14100 may be shared between user devices. For example, when a video service is provided to the notebook computer 14600 in response to a request from the notebook computer 14600, a reproduction history of the video service is stored in the user DB 14100. When a request to reproduce the video service is received from the smart phone 14500, the cloud computing server 14000 searches for and reproduces the video service, based on the user DB 14100. When the smart phone 14500 receives a video data stream from the cloud computing server 14000, a process of reproducing video by decoding the video data stream is similar to an operation of the mobile phone 12500 described above with reference to FIG. 24.

The cloud computing server 14000 may refer to a reproduction history of a desired video service, stored in the user DB 14100. For example, the cloud computing server 14000 receives a request to reproduce a video stored in the user DB 14100, from a user terminal. If this video was being reproduced, then a method of streaming this video, performed by the cloud computing server 14000, may vary according to the request from the user terminal, i.e., according to whether the video will be reproduced, starting from a start thereof or a pausing point thereof. For example, if the user terminal requests to reproduce the video, starting from the start thereof, the cloud computing server 14000 transmits streaming data of the video starting from a first frame thereof to the user terminal. On the other hand, if the user terminal requests to reproduce the video, starting from the pausing point thereof the cloud computing server 14000 transmits streaming data of the video starting from a frame corresponding to the pausing point, to the user terminal.

Here, the user terminal may include the video decoding apparatus as described above with reference to FIGS. 1A through 20. As another example, the user terminal may include the video encoding apparatus as described above with reference to FIGS. 1A through 20. Alternatively, the user terminal may include both the video encoding apparatus and the video decoding apparatus as described above with reference to FIGS. 1A through 20.

Various applications of the video encoding method, the video decoding method, the video encoding apparatus, and the video decoding apparatus described above with reference to FIGS. 1A through 20 are described above with reference to FIGS. 21 through 27. However, embodiments of methods of storing the video encoding method and the video decoding method in a storage medium or embodiments of methods of implementing the video encoding apparatus and the video decoding apparatus in a device described above with reference to FIGS. 1A through 20 are not limited to the embodiments of FIGS. 21 through 27.

The method, process, apparatus, product, and/or system according to the present disclosure are simple, cost-effective, various, and accurate. Furthermore, efficient and economical production, application, and utilization may be implemented by applying known components to the process, apparatus, product, and system according to the present disclosure. In addition, the present disclosure complies with current trends requiring cost reduction, system simplification, and performance enhancement. As such, the level of current technology may be enhanced.

While the present disclosure has been particularly shown and described with reference to specific embodiments thereof, it will be understood by one of ordinary skill in the art that various changes in form and details may be made therein without departing from the spirit and scope of the invention as defined by the following claims. The exemplary embodiments should be considered in a descriptive sense only and not for purposes of limitation. Therefore, the scope of the invention is defined not by the detailed description of the invention but by the following claims, and all differences within the scope will be construed as being included in the present disclosure.

The invention claimed is:

1. A video decoding method comprising:

obtaining at least two prediction units split from a coding unit of an image;

determining a filtering condition of a prediction unit boundary filter, and performing filtering by using the prediction unit boundary filter on a predicted value of a pixel adjacent to a boundary between the at least two prediction units based on the filtering condition; and reconstructing a value of the pixel by using the filtered predicted value, wherein the determining of the filtering condition of the prediction unit boundary filter comprises:

when a transformation coefficient does not exist in the coding unit, determining to perform a different type of the filtering from a type of the filtering performed when the transformation coefficient exists in the coding unit; and determining an intensity of the filtering by adjusting filtering coefficients and/or a number of filtering taps, based on information indicating whether a residual value exists in the coding unit or not, and wherein the filtering condition of the boundary filter is shared with a deblocking filter.

2. The video decoding method of claim 1, wherein the coding unit is split from the image based on coding unit split information obtained from a bitstream, wherein the at least two prediction units comprise a first prediction unit and a second prediction unit obtained by splitting at least one of a height and a width of the coding unit, based on a partition mode obtained from the bitstream, and wherein the boundary is a boundary between the first and second prediction units.

3. The video decoding method of claim 2, further comprising obtaining at least one transformation unit from the coding unit based on transformation unit split information obtained from the bitstream, wherein the first and second prediction units are comprised in the transformation unit.

4. The video decoding method of claim 2, wherein the pixel is comprised in the first prediction unit, and wherein the filtering is performed by using a predicted value of a neighboring pixel comprised in the second prediction unit and adjacent to the pixel.

5. The video decoding method of claim 1, wherein the determining of the filtering condition of the boundary filter further comprises obtaining a filtering flag indicating whether to filter the predicted value, from a bitstream.

6. The video decoding method of claim 5, wherein the filtering flag is obtained when the block is in an inter prediction mode or in an intra prediction mode.

7. The video decoding method of claim 1, wherein the boundary has a linear shape or a nonlinear shape.

8. The video decoding method of claim 1, wherein the determining of the filtering condition of the boundary filter further comprises determining at least one of intensity of the filtering and a size of the filtering based on at least one of a distance from the pixel to the boundary, the predicted value, the residual values, a predicted value of at least one neighboring pixel adjacent to the pixel, motion information of the partitions, and mode information of the partitions.

9. The video decoding method of claim 1, wherein the reconstructing of the value of the pixel comprises reconstructing the value of the pixel by using the filtered predicted value and the residual value of the pixel.

10. A video decoding apparatus comprising at least one processor configured to:

obtain at least two prediction units split from a coding unit of an image;

determine a filtering condition of a prediction unit boundary filter, and perform filtering by using the prediction unit boundary filter on a predicted value of a pixel adjacent to a boundary between the at least two prediction units based on the filtering condition; and reconstruct a value of the pixel by using the filtered predicted value, wherein the at least one processor is further configured to:

determine, when a transformation coefficient does not exist in the coding unit, to perform a different type of the filtering from a type of the filtering performed when the transformation coefficient exists in the coding unit, and determine an intensity of the filtering by adjusting filtering coefficients and/or a number of filtering taps, based on information indicating whether a residual value exists in the coding unit or not, and wherein the filtering condition of the boundary filter is shared with a deblocking filter.

11. A video encoding method comprising:

obtaining at least two prediction units split from a coding unit of an image;

determining a filtering condition of a prediction unit boundary filter, and performing filtering by using the prediction unit boundary filter on a predicted value of a pixel adjacent to a boundary between the at least two prediction units based on the filtering condition; and encoding the residual value by using the filtered predicted value and a value of the pixel if the predicted value is filtered, wherein the determining of the filtering condition of the prediction unit boundary filter comprises:

when a transformation coefficient does not exist in the coding unit, determining to perform a different type of the filtering from a type of the filtering performed when the transformation coefficient exists in the coding unit; and determining an intensity of the filtering by adjusting filtering coefficients and/or a number of filtering taps, based on information indicating whether a residual value exists in the coding unit or not, and wherein the filtering condition of the boundary filter is shared with a deblocking filter.

12. The video encoding method of claim 11, wherein the coding unit is split from the image based on coding unit split information, wherein the at least two prediction units comprise a first prediction unit and a second prediction unit obtained by splitting at least one of a height and a width of the coding unit, based on a partition mode, and wherein the boundary is a boundary between the first and second prediction units.

13. The video encoding method of claim 12, further comprising obtaining at least one transformation unit from the coding unit based on transformation unit split information, wherein the first and second prediction units are comprised in the transformation unit.

14. The video encoding method of claim 12, wherein the pixel is comprised in the first prediction unit, and wherein the filtering is performed by using a predicted value of a neighboring pixel comprised in the second prediction unit and adjacent to the pixel.

15. The video encoding method of claim 11, wherein the determining of the filtering condition of the boundary filter further comprises generating a filtering flag indicating whether to filter the predicted value.

16. The video encoding method of claim 15, wherein the filtering flag is generated when the block is in an inter prediction mode or in an intra prediction mode.

17. The video encoding method of claim 11, wherein the boundary has a linear shape or a nonlinear shape.

18. The video encoding method of claim 11, wherein the determining of the filtering condition of the boundary filter further comprises determining at least one of intensity of the filtering and a size of the filtering based on at least one of a distance from the pixel to the boundary, the predicted value, the residual values, a predicted value of at least one neighboring pixel adjacent to the pixel, motion information of the partitions, and mode information of the partitions.

* * * * *